(12) United States Patent
Kitazato et al.

(10) Patent No.: US 12,063,411 B2
(45) Date of Patent: Aug. 13, 2024

(54) RECEPTION APPARATUS, RECEPTION METHOD, PROGRAM, AND INFORMATION PROCESSING SYSTEM

(71) Applicant: Saturn Licensing LLC, New York, NY (US)

(72) Inventors: Naohisa Kitazato, Tokyo (JP); Yasuaki Yamagishi, Kanagawa (JP); Yoshiharu Dewa, Tokyo (JP); Mark Eyer, Woodinville, WA (US)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/845,990

(22) Filed: Apr. 10, 2020

(65) Prior Publication Data

US 2020/0245021 A1    Jul. 30, 2020

Related U.S. Application Data

(63) Continuation of application No. 14/551,299, filed on Nov. 24, 2014, now Pat. No. 10,652,609, which is a
(Continued)

(51) Int. Cl.
*H04N 21/435* (2011.01)
*H04N 21/236* (2011.01)
(Continued)

(52) U.S. Cl.
CPC ... *H04N 21/4351* (2013.01); *H04N 21/23614* (2013.01); *H04N 21/4348* (2013.01);
(Continued)

(58) Field of Classification Search
CPC .................................................. H04N 21/4351
See application file for complete search history.

(56) References Cited

U.S. PATENT DOCUMENTS 5,485,554 A * 1/1996 Lowitz ............... H04N 1/32133
358/1.17
6,637,032 B1  10/2003 Feinleib
(Continued)

FOREIGN PATENT DOCUMENTS

CN        1429452 A    7/2003
CN     101218819 A    7/2008
(Continued)

OTHER PUBLICATIONS

U.S. Appl. No. 13/216,375, filed Aug. 24, 2011, 2012-0063508, Hattori, et al.
(Continued)

*Primary Examiner* — Hsiungfei Peng
(74) *Attorney, Agent, or Firm* — Richard Laperuta

(57) ABSTRACT

Disclosed herein is a reception apparatus including: a reception portion configured to receive AV content; a trigger acquisition portion configured to acquire trigger information for operating an application program to be executed in interlocked relation to the AV content; a table acquisition portion configured to acquire a correspondence table associating a command for controlling the operation of the application program with a valid time of the command; and a control portion configured such that when the time acquired from the trigger information as indicative of the progress of the AV content satisfies a predetermined condition of validity in reference to the valid time of the command on the basis of the acquired correspondence table, the control portion controls the operation of the application program in accordance with the command being valid.

18 Claims, 37 Drawing Sheets

Related U.S. Application Data continuation of application No. 13/708,313, filed on Dec. 7, 2012, now Pat. No. 8,930,988.

(60) Provisional application No. 61/578,631, filed on Dec. 21, 2011.

(51) Int. Cl.
*H04N 21/434* (2011.01)
*H04N 21/462* (2011.01)
*H04N 21/81* (2011.01)
*H04N 21/8543* (2011.01)
*H04N 21/8545* (2011.01)
*H04N 21/8547* (2011.01)
*H04N 21/858* (2011.01)

(52) U.S. Cl.
CPC ....... *H04N 21/462* (2013.01); *H04N 21/8173* (2013.01); *H04N 21/8543* (2013.01); *H04N 21/8545* (2013.01); *H04N 21/8547* (2013.01); *H04N 21/8586* (2013.01)

(56) References Cited

U.S. PATENT DOCUMENTS

| | | | |
|---|---|---|---|
| 7,319,862 B1 * | 1/2008 | Lincoln | G06Q 30/02 455/526 |
| 7,584,491 B2 | 9/2009 | Bruckner et al. | |
| 8,595,783 B2 | 11/2013 | Dewa | |
| 8,705,933 B2 | 4/2014 | Eyer | |
| 8,839,338 B2 | 9/2014 | Eyer | |
| 8,842,974 B2 | 9/2014 | Kitazato | |
| 8,863,171 B2 | 10/2014 | Blanchard et al. | |
| 8,872,888 B2 | 10/2014 | Kitazato | |
| 8,875,169 B2 | 10/2014 | Yamagishi | |
| 8,875,204 B2 | 10/2014 | Kitazato | |
| 8,884,800 B1 | 11/2014 | Fay | |
| 8,886,009 B2 | 11/2014 | Eyer | |
| 8,892,636 B2 | 11/2014 | Yamagishi | |
| 8,893,210 B2 | 11/2014 | Eyer | |
| 2003/0051252 A1 | 3/2003 | Miyaouku et al. | |
| 2004/0010771 A1 | 1/2004 | Wallace et al. | |
| 2004/0010792 A1 | 1/2004 | Wallace et al. | |
| 2004/0010793 A1 | 1/2004 | Wallace et al. | |
| 2004/0010794 A1 | 1/2004 | Acott et al. | |
| 2004/0031058 A1 | 2/2004 | Reisman | |
| 2005/0005303 A1 | 1/2005 | Barone, Jr. et al. | |
| 2006/0274214 A1 | 12/2006 | Carro | |
| 2007/0174624 A1 * | 7/2007 | Wolosewicz | H04N 21/45455 713/176 |
| 2008/0201738 A1 | 8/2008 | Song et al. | |
| 2009/0320064 A1 | 12/2009 | Soldan et al. | |
| 2009/0320066 A1 | 12/2009 | Soldan et al. | |
| 2010/0215340 A1 | 8/2010 | Pettit et al. | |
| 2011/0088075 A1 * | 4/2011 | Eyer | H04N 21/2353 348/739 |
| 2011/0161394 A1 * | 6/2011 | Chidel | H04N 21/4622 709/203 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0002111 A1 | 1/2012 | Sandoval et al. | |
| 2012/0044418 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054784 A1 | 3/2012 | Kitazato et al. | |
| 2012/0060197 A1 | 3/2012 | Kitahara et al. | |
| 2012/0063508 A1 | 3/2012 | Hattori et al. | |
| 2012/0072965 A1 | 3/2012 | Dewa | |
| 2012/0081607 A1 | 4/2012 | Kitazato | |
| 2012/0082266 A1 | 4/2012 | Kitazato et al. | |
| 2012/0084802 A1 | 4/2012 | Kitazato | |
| 2012/0084829 A1 | 4/2012 | Kitazato | |
| 2012/0185888 A1 | 7/2012 | Eyer et al. | |
| 2012/0189010 A1 | 7/2012 | Lee et al. | |
| 2012/0253826 A1 | 10/2012 | Kitazato et al. | |
| 2012/0274848 A1 | 11/2012 | Kitahara et al. | |
| 2012/0304224 A1 * | 11/2012 | Hines | H04N 21/8586 725/34 |
| 2013/0024894 A1 | 1/2013 | Eyer | |
| 2013/0024897 A1 | 1/2013 | Eyer | |
| 2013/0031569 A1 | 1/2013 | Eyer | |
| 2013/0036440 A1 | 2/2013 | Eyer | |
| 2013/0055313 A1 | 2/2013 | Eyer | |
| 2013/0103716 A1 | 4/2013 | Yamagishi | |
| 2013/0104180 A1 * | 4/2013 | Knightbridge | H04H 20/93 725/116 |
| 2013/0145414 A1 | 6/2013 | Yamagishi | |
| 2013/0167171 A1 | 6/2013 | Kitazato et al. | |
| 2013/0191860 A1 | 7/2013 | Kitazato et al. | |
| 2013/0198768 A1 | 8/2013 | Kitazato | |
| 2013/0201399 A1 | 8/2013 | Kitazato et al. | |
| 2013/0205327 A1 | 8/2013 | Eyer | |
| 2013/0212634 A1 | 8/2013 | Kitazato | |
| 2013/0215327 A1 | 8/2013 | Kitazato et al. | |
| 2013/0250173 A1 | 9/2013 | Eyer | |
| 2013/0254824 A1 | 9/2013 | Eyer | |
| 2013/0271653 A1 * | 10/2013 | Kim | H04N 21/437 348/473 |
| 2013/0282870 A1 | 10/2013 | Dewa et al. | |
| 2013/0283311 A1 | 10/2013 | Eyer | |
| 2013/0283328 A1 | 10/2013 | Kitazato | |
| 2013/0291022 A1 | 10/2013 | Eyer | |
| 2013/0291049 A1 | 10/2013 | Kitazato | |
| 2013/0340007 A1 | 12/2013 | Eyer | |
| 2014/0013347 A1 | 1/2014 | Yamagishi | |
| 2014/0013379 A1 | 1/2014 | Kitazato et al. | |
| 2014/0020038 A1 | 1/2014 | Dewa | |
| 2014/0020042 A1 | 1/2014 | Eyer | |
| 2014/0040965 A1 | 2/2014 | Kitazato et al. | |
| 2014/0040968 A1 | 2/2014 | Kitazato et al. | |
| 2014/0043540 A1 | 2/2014 | Kitazato et al. | |
| 2014/0053174 A1 | 2/2014 | Eyer et al. | |
| 2014/0067922 A1 | 3/2014 | Yamagishi et al. | |
| 2014/0099078 A1 | 4/2014 | Kitahara et al. | |
| 2014/0122528 A1 | 5/2014 | Yamagishi | |
| 2014/0137153 A1 | 5/2014 | Fay et al. | |
| 2014/0137165 A1 | 5/2014 | Yamagishi | |
| 2014/0150040 A1 | 5/2014 | Kitahara et al. | |
| 2014/0157304 A1 | 6/2014 | Fay et al. | |
| 2014/0173661 A1 | 6/2014 | Yamagishi | |
| 2014/0186008 A1 | 7/2014 | Eyer | |
| 2014/0201796 A1 | 7/2014 | Moon et al. | |
| 2014/0208375 A1 | 7/2014 | Fay et al. | |
| 2014/0208380 A1 | 7/2014 | Fay et al. | |
| 2014/0229580 A1 | 8/2014 | Yamagishi | |
| 2014/0229979 A1 | 8/2014 | Kitazato et al. | |
| 2014/0253683 A1 | 9/2014 | Eyer et al. | |
| 2014/0327825 A1 | 11/2014 | Eyer | |

FOREIGN PATENT DOCUMENTS

| | | |
|---|---|---|
| CN | 102118581 A | 7/2011 |
| EP | 1 045 581 A1 | 10/2000 |
| JP | 2006-245653 | 9/2006 |
| JP | 2007-116717 | 5/2007 |
| KR | 10-2006-0023169 A | 3/2006 |

OTHER PUBLICATIONS

U.S. Appl. No. 13/107,604, filed May 13, 2011, 2012-0072965, Dewa.

U.S. Appl. No. 13/238,080, filed Sep. 21, 2011, 2012-0082266, Kitazato, et al.

(56) References Cited

OTHER PUBLICATIONS

U.S. Appl. No. 13/212,972, filed Aug. 18, 2011, 2012-0050620, Kitazato.
U.S. Appl. No. 13/220,231, filed Aug. 29, 2011, 2012-0060197, Kitahara, et al.
U.S. Appl. No. 13/081,566, filed Apr. 7, 2011, 2012-0054784, Kitazato, et al.
U.S. Appl. No. 13/038,939, filed Mar. 2, 2011, 2011-0302599, Eyer.
U.S. Appl. No. 12/985,241, filed Jan. 5, 2011, 2011-0243536, Eyer.
U.S. Appl. No. 13/043,170, filed Mar. 8, 2011, 2012-0047531, Eyer.
U.S. Appl. No. 13/041,743, filed Mar. 7, 2011, 2012-0044418, Eyer.
U.S. Appl. No. 13/039,005, filed Mar. 2, 2011, 2011-0299827, Eyer.
U.S. Appl. No. 13/071,560, filed Mar. 25, 2011, 2012-0054268, Yamagishi.
U.S. Appl. No. 13/071,559, filed Mar. 25, 2011, 2012-0054267, Yamagishi, et al.
U.S. Appl. No. 13/075,440, filed Mar. 30, 2011, 2012-0054214, Yamagishi, et al.
U.S. Appl. No. 13/046,579, filed Mar. 11, 2011, 2011-0247028, Eyer.
U.S. Appl. No. 13/206,627, filed Aug. 10, 2011, 2012-0084802, Kitazato.
U.S. Appl. No. 13/238,065, filed Sep. 21, 2011, 2012-0081607, Kitazato.
U.S. Appl. No. 12/942,835, filed Nov. 9, 2010, 2011-0246488, Eyer.
U.S. Appl. No. 13/009,720, filed Jan. 19, 2011, 2012-0185888, Eyer, et al.
U.S. Appl. No. 13/080,866, filed Apr. 6, 2011, 2012-0054235, Kitazato, et al.
U.S. Appl. No. 13/071,551, filed Mar. 25, 2011, 2012-0050619, Kitazato, et al.
U.S. Appl. No. 13/238,138, filed Sep. 21, 2011, 2012-0084829, Kitazato.
U.S. Appl. No. 12/798,118, filed Mar. 30, 2010, 2011-0088075, Eyer.
U.S. Appl. No. 13/038,984, filed Mar. 2, 2011, 2011-0298981, Eyer.
U.S. Appl. No. 13/038,967, filed Mar. 2, 2011, 2011-0302611, Eyer.
U.S. Appl. No. 13/422,203, filed Mar. 16, 2012, 2012-0253826, Kitazato, et al.
U.S. Appl. No. 13/452,376, filed Apr. 20, 2012, 2012-0274848, Kitahara, et al.
U.S. Appl. No. 13/562,946, filed Jul. 31, 2012, 2013-0055313, Eyer.
U.S. Appl. No. 13/559,166, filed Jul. 26, 2012, 2013-0036440, Eyer.
U.S. Appl. No. 13/490,216, filed Jun. 6, 2012, 2013-0024894, Eyer.
U.S. Appl. No. 13/554,688, filed Jul. 20, 2012, 2013-0031569, Eyer.
U.S. Appl. No. 13/559,188, filed Jul. 26, 2012, 2013-0198768, Kitazato.
U.S. Appl. No. 13/527,435, filed Jun. 19, 2012, 2013-0024897, Eyer.
U.S. Appl. No. 13/587,975, filed Aug. 17, 2012, 2013-0212634, Kitazato.
U.S. Appl. No. 13/593,554, filed Aug. 24, 2012, 2013-0215327, Kitazato et al.
U.S. Appl. No. 13/648,753, filed Oct. 10, 2012, 2013-0103716, Yamagishi.
U.S. Appl. No. 13/679,624, filed Nov. 16, 2012, 2013-0145414, Yamagishi.
U.S. Appl. No. 13/708,313, filed Dec. 7, 2012, 2013-0167171, Kitazato et al.
U.S. Appl. No. 13/741,863, filed Jan. 15, 2013, 2013-0191860, Kitazato et al.
U.S. Appl. No. 13/753,591, filed Jan. 30, 2013, 2013-0201399, Kitazato et al.
U.S. Appl. No. 13/777,429, filed Feb. 26, 2013, 2013-0043540, Kitazato et al.
U.S. Appl. No. 13/777,693, filed Feb. 26, 2013, 2014-0040965, Kitazato et al.
U.S. Appl. No. 13/777,734, filed Feb. 26, 2013, 2014-0013379, Kitazato et al.
U.S. Appl. No. 13/782,694, filed Mar. 1, 2013, 2013-0254824, Eyer.
U.S. Appl. No. 13/782,730, filed Mar. 1, 2013, 2013-0283311, Eyer.
U.S. Appl. No. 13/800,818, filed Mar. 13, 2013, 2013-0250173, Eyer.
U.S. Appl. No. 13/841,343, filed Mar. 15, 2013, 2013-0205327, Eyer.
U.S. Appl. No. 13/846,282, filed Mar. 18, 2013, 2013-0282870, Dewa et al.
U.S. Appl. No. 13/846,247, filed Mar. 18, 2013, 2014-0040968, Kitazato et al.
U.S. Appl. No. 13/888,865, filed May 7, 2013, 2014-0099078, Kitahara et al.
U.S. Appl. No. 13/894,779, filed May 15, 2013, 2014-0122528, Yamagishi.
U.S. Appl. No. 13/905,721, filed May 30, 2013, 2014-0150040, Kitahara et al.
U.S. Appl. No. 13/915,664, filed Jun. 12, 2013, 2013-034007, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, 2013-0291022, Eyer.
U.S. Appl. No. 13/997,844, filed Jun. 25, 2013, 2013-0283328, Kitazato.
U.S. Appl. No. 13/927,667, filed Jun. 26, 2013, 2014-0229580, Yamagishi.
U.S. Appl. No. 13/934,581, filed Jul. 3, 2013, 2014-0020042, Eyer.
U.S. Appl. No. 13/934,549, filed Jul. 3, 2013, Fay et al.
U.S. Appl. No. 13/934,615, filed Jul. 3, 2013, Eyer.
U.S. Appl. No. 13/934,924, filed Jul. 3, 2013, 2014-0137165, Yamagishi.
U.S. Appl. No. 13/934,473, filed Jul. 3, 2013, 2014-0173661, Yamagishi.
U.S. appl. No. 13/963,138, filed Aug. 9, 2013, 2014-0157304, Fay et al.
U.S. Appl. No. 13/963,111, filed Aug. 9, 2013, 2014-0137153, Fay et al.
U.S. Appl. No. 13/968,035, filed Aug. 15, 2013, 2014-0053174, Eyer et al.
U.S. Appl. No. 14/025,310, filed Sep. 12, 2013, 2014-0020038, Dewa.
U.S. Appl. No. 14/026,551, filed Sep. 13, 2013, 2014-0013347, Yamagishi.
U.S. Appl. No. 13/976,257, filed Jun. 26, 2013, 2013-0291049, Kitazato.
U.S. Appl. No. 14/046,543, filed Oct. 4, 2013, 2014-0208380, Fay et al.
U.S. Appl. No. 14/046,566, filed Oct. 4, 2013, 2014-0208375, Fay et al.
U.S. Appl. No. 14/069,032, filed Oct. 31, 2013, 2014-0067922, Yamagishi et al.
U.S. Appl. No. 14/196,432, filed Mar. 4, 2014, 2014-0186008, Eyer.
U.S. Appl. No. 14/253,474, filed Apr. 15, 2014, 2014-0229979, Kitazato et al.
U.S. Appl. No. 14/275,231, filed May 12, 2014, 2014-0327825, Eyer.
U.S. Appl. No. 14/282,572, filed May 20, 2014, 2014-0253683, Eyer et al.
U.S. Appl. No. 14/295,695, filed Jun. 4, 2014, Eyer.
U.S. Appl. No. 14/457,290, filed Aug. 12, 2014, Eyer.
U.S. Appl. No. 14/458,310, filed Aug. 13, 2014, Eyer.
U.S. Appl. No. 14/490,263, filed Sep. 18, 2014, Blanchard et al.
U.S. Appl. No. 14/493,661, filed Sep. 23, 2014, Yamagishi.
U.S. Appl. No. 14/493,721, filed Sep. 23, 2014, Kitazato.
U.S. Appl. No. 14/504,455, filed Oct. 2, 2014, Fay.
U.S. Appl. No. 14/504,984, filed Oct. 2, 2014, Eyer.
U.S. Appl. No. 14/509,200, filed Oct. 8, 2014, Eyer.
U.S. Appl. No. 14/509,166, filed Oct. 8, 2014, Kitazato.
U.S. Appl. No. 14/512,761, filed Oct. 13, 2014, Fay.
U.S. Appl. No. 14/512,776, filed Oct. 13, 2014, Kitazato.
U.S. Appl. No. 14/521,034, filed Oct. 22, 2014, Eyer.
U.S. Appl. No. 14/529,440, filed Oct. 31, 2014, Kitazato et al.
U.S. Appl. No. 14/529,490, filed Oct. 31, 2014, Yamgishi et al.
U.S. Appl. No. 14/529,450, filed Oct. 31, 2014, Kitazato et al.
U.S. Appl. No. 14/529,421, filed Oct. 31, 2014, Kitazato et al.

(56) References Cited

OTHER PUBLICATIONS

U.S. Appl. No. 14/529,461, filed Oct. 31, 2014, Kitahara et al.
U.S. Appl. No. 14/538,311, filed Nov. 11, 2014, Eyer.
U.S. Appl. No. 14/538,083, filed Nov. 11, 2014, Yamagishi.
U.S. Appl. No. 14/543,231, filed Nov. 17, 2014, Kitazato.
International Search Report issued Mar. 19, 2013, in International Application No. PCT/JP2012/082305 (with English translation).
Digital Video Broadcasting (DVB); Globally Executable MHP (GEM), Specification 1.3 (including OTT and hybrid broadcast/broadband, DVB Document A153. Mar. 2011, p. 343 (with Cover page).
Summons to attend oral proceedings pursuant to Rule 115(1) EPC, issued Mar. 2, 2017 in European Patent Application No. 12858761.5.
Office Action issued Feb. 21, 2017 in Japanese Patent Application No. 2013-550245 (with English translation).
Office Action mailed Sep. 13, 2018, in corresponding European Patent Application No. 12 858 761.5.
"Advanced Television Enhancement Forum Specification (ATVEF)", XP002945609, Feb. 1999.
Combined Chinese Office Action and Search Report issued Jan. 25, 2017 in Chinese Patent Application No. 201280061520.2 (with English language translation).
Extended European Search Report issued Sep. 15, 2015 in Patent Application No. 12858761.5.

\* cited by examiner

TWO-DIMENSIONAL BARCODE
→TRIGGER INFORMATION

FIG. 7

| item | description |
|---|---|
| domain_name | The domain name of the provider's server (which TPT files are located) |
| program_id | The unique ID for the target program. Provider can define it freely. |
| media_time | The time stamp of the target time position of the program. |

FIG. 9

| Element/Attribute(with @) | Number to be permitted | Description & Value |
|---|---|---|
| tpt | | |
| @id | 1 | domain_name/Program_id |
| @type | 1 | "static","dynamic" |
| @version | 0..1 | TPT version number |
| @updating_time | 0..1 | Supposed TPT updating duration(only for type="dynamic") |
| @present_following | 0..1 | "present","following" |
| @end_mt | 0..1 | The end time for TPT time scope |
| @expire_date | 0..1 | Expire date for caching TPT document.(only for type="static") |
| command | 1..N | |
| @id | 1 | Equal to Trigger_id |
| @start_time | 0..1 | The start time of the command valid period |
| @end_time | 0..1 | The end time of the command valid period |
| @destination | 0..1 | Device type "receiver":receiver itself "external_1" external device type1 "external_2" external device type2 |
| @action | 1 | Action "execute" "register" "suspend" "terminate" "event" |
| application | 1 | Description for target App |
| @id | 1 | App ID |
| @type | 1 | App type |
| @url | 0..1 | App URL |
| @priority | 0..1 | Priority to Persist 1:High 0:Normal |
| @expire_date | 0..1 | Expire date for caching the application |
| event | 1 | Description for event |
| @id | 0..1 | Event ID |
| data | 1 | Embedded data |
| diffusion | 0..1 | Randomized diffusion of command execution timing |
| @rate | 1 | Timing number of diffusion |
| @range | 1 | Diffusion time range |
| @period | 1 | Period for applying command diffusion(from start_time) |

FIG. 10

```
<tpt id=xbc.com/1 type="static" expire_date="2011-01-21">
  <command id=1 start_time=0.end_time=600.destination="receiver" action="register">
    <application id="1" type="html" url="xxx.com/yyy1" expire_date="2011-01-21"/>
  </command>
  <command id=2 start_time=600.end_time=3500.destination="receiver" action="execute">
    <application id="1" type="html" url="xxx.com/yyy1" expire_date="2011-01-21"/>
    <diffusion rate=10 range=60 period=600/>
  </command>
  <command id=3 start_time=1800.end_time=2000.destination="receiver" action="event">
    <application id="1"/>
    <event id="event1">
      <data>zzzzzz・・・・・z</data>
    </event>
  </command>
  <command id=4 start_time=2400.end_time=2520.destination="receiver" action="suspend">
    <application id="1"/>
  </command>
  <command id=5 start_time=3500.end_time=3600.destination="receiver" action="terminate">
    <application id="1"/>
  </command>
  <command id=12 start_time=2400.end_time=2520.destination="receiver" action="execute">
    <application id="2" type="html" url="xxx.com/yyy2" expire_date="2011-01-22"/>
  </command>
  <command id=15 start_time=2520.end_time=3600.destination="receiver" action="terminate">
    <application id="2"/>
  </command>
</tpt>
```

F I G. 12
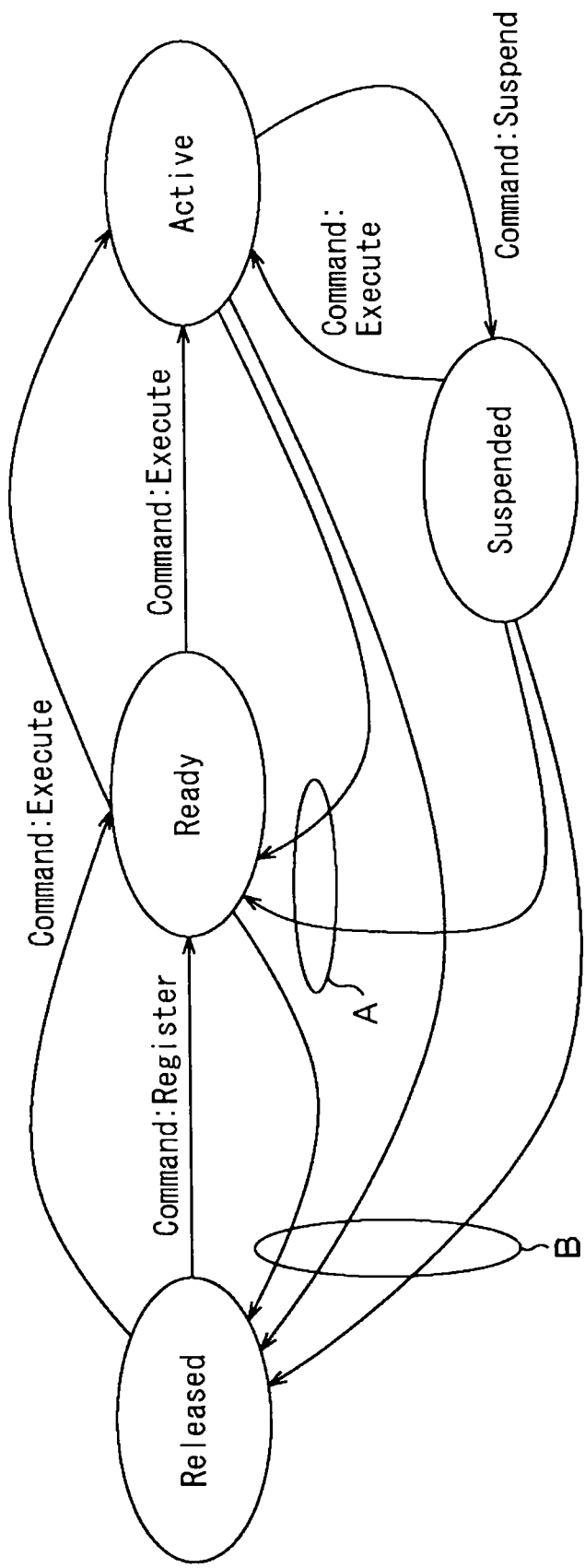

FIG. 15
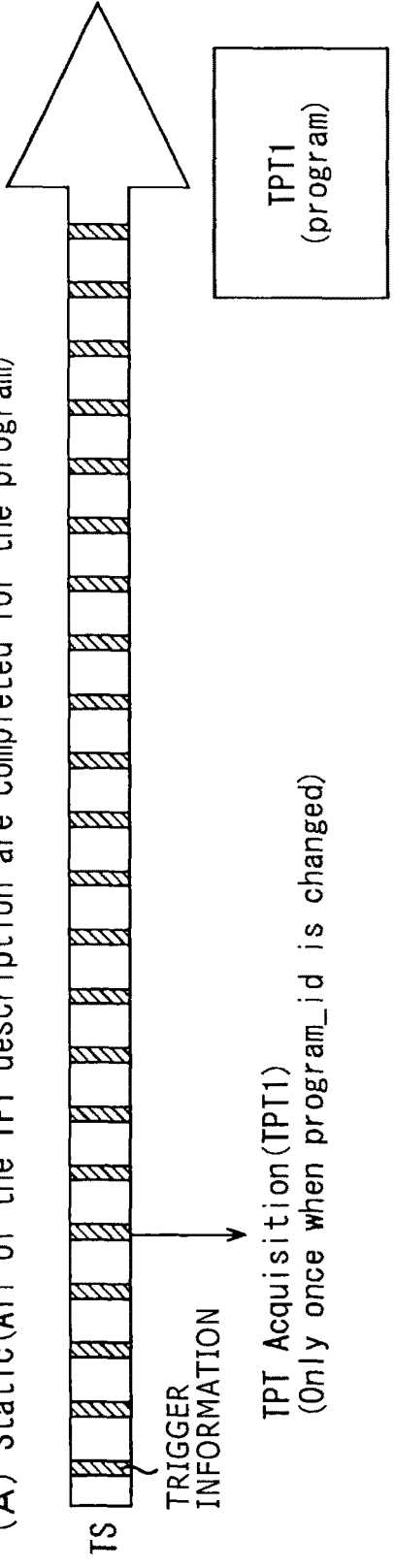
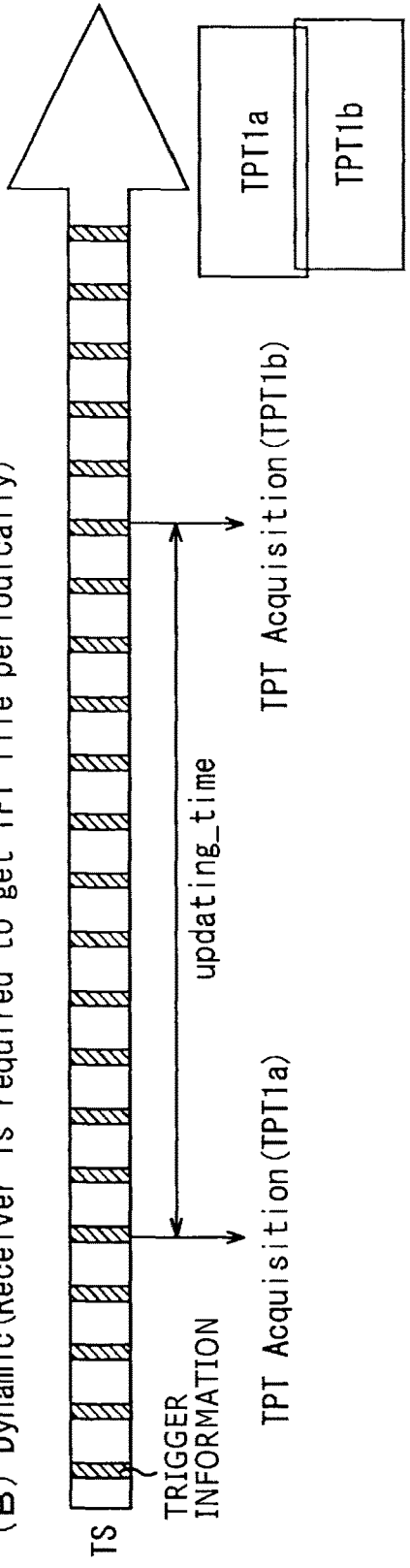

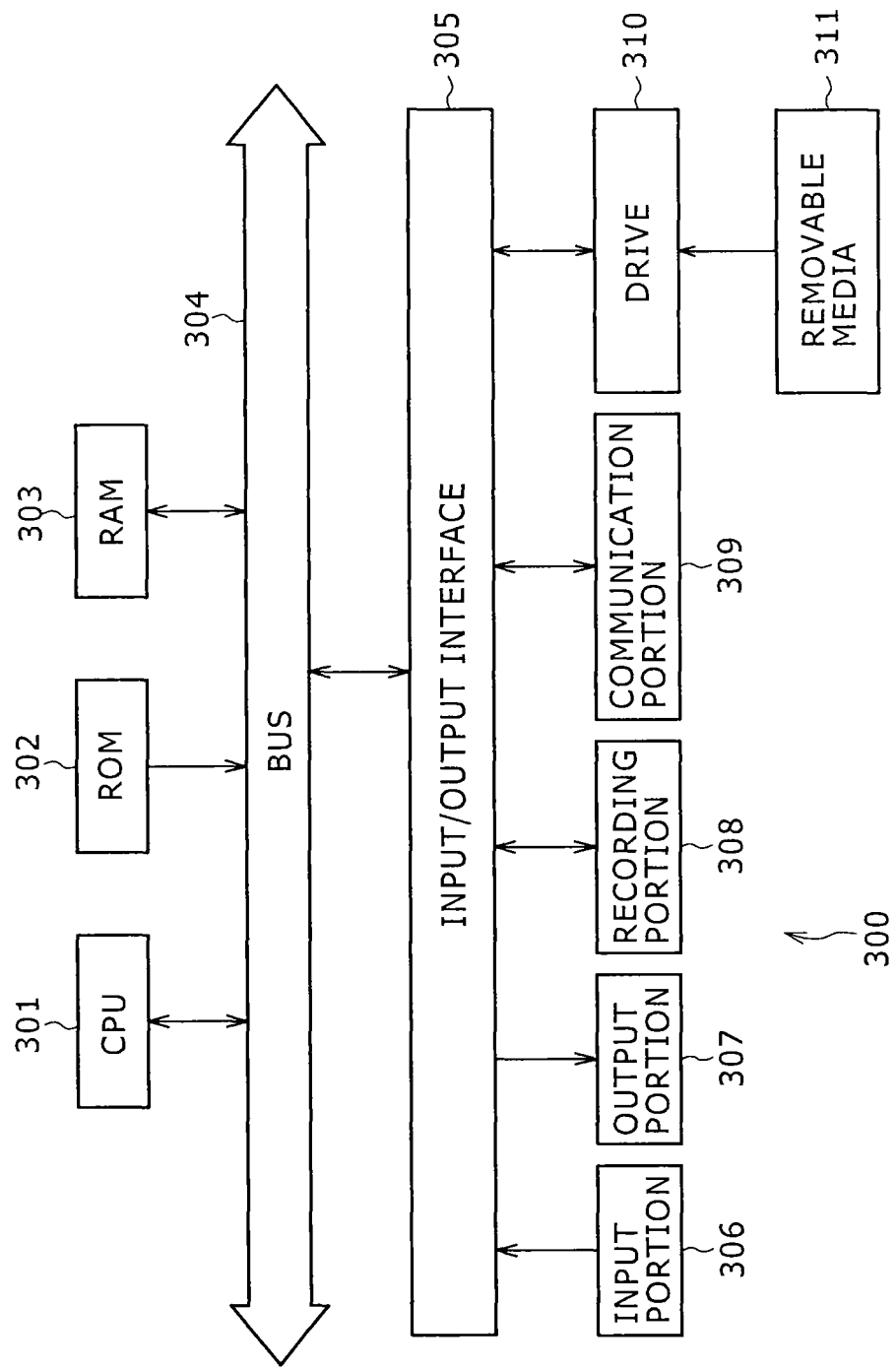

RECEPTION APPARATUS, RECEPTION METHOD, PROGRAM, AND INFORMATION PROCESSING SYSTEM

CROSS-REFERENCE TO RELATED APPLICATION

This application is a continuation application of U.S. patent application Ser. No. 14/551,299, filed Nov. 24, 2014, which is a continuation application of U.S. patent application Ser. No. 13/708,313 filed Dec. 7, 2012, which is now U.S. Pat. No. 8,930,988, issued Jan. 6, 2015, which claims the benefit of priority of Provisional Application Ser. No. 61/578,631, filed on Dec. 21, 2011. The benefit of priority is claimed to each of the foregoing applications, and the entire contents of each of the foregoing applications are incorporated herein by reference.

BACKGROUND

The present technology relates to a reception apparatus, a reception method, a program, and an information processing system. More particularly, the disclosure relates to a reception apparatus, a reception method, a program, and an information processing system for offering application programs that are executed in interlocked relation to AV content.

Predicted to come into general use from now on is a service that allows reception apparatuses receiving digital TV broadcasts to acquire application programs from servers on the Internet and to execute the acquired application programs in interlocked relation to TV programs. Studies are currently underway on techniques for implementing such a hybrid service that unifies broadcasting with communication (e.g., see Japanese Patent Laid-open No. 2006-245653).

SUMMARY

When a reception apparatus receives digital TV broadcast signals not directly but over such broadcast channels as CATV networks or satellite communication networks, it is necessary to notify the reception apparatus of information about the above-mentioned service via the broadcast channels and a dedicated terminal in order to implement the service permitting the execution of application programs in interlocked relation to TV programs.

In such a case, it ordinarily becomes necessary to refurbish the broadcast channel equipment and dedicated terminals as well as to get permission from broadcast business operators relaying TV programs. Thus the need has been recognized for arrangements which, without recourse to such laborious work, would permit provision of application programs for execution in interlocked relation to TV programs. However, there have yet to be established the techniques for offering application programs to be executed in interlocked relation to such AV content as TV programs and CM's.

The present technology has been made in view of the above circumstances and provides application programs for execution in interlocked relation to AV content.

According to a first embodiment of the present technology, there is provided a reception apparatus including: a reception portion configured to receive AV content; a trigger acquisition portion configured to acquire trigger information for operating an application program to be executed in interlocked relation to the AV content; a table acquisition portion configured to acquire a correspondence table associating a command for controlling the operation of the application program with a valid time of the command, and a control portion configured such that when the time acquired from the trigger information as indicative of the progress of the AV content satisfies a predetermined condition of validity in reference to the valid time of the command on the basis of the acquired correspondence table, the control portion controls the operation of the application program in accordance with the command being valid.

Preferably, the trigger information may be transmitted together with the AV content, and the trigger acquisition portion may extract the trigger information from the received AV content.

Preferably, the reception apparatus may further include a feature quantity extraction portion configured to extract a feature quantity from data of the received AV content, wherein the trigger acquisition portion may acquire the trigger information corresponding to a result from identifying the AV content by use of the extracted feature quantity.

Preferably, the trigger information may include time information indicative of the progress of the AV content, and when the time indicated by the time information included in the trigger information falls within a valid period defined by a valid start time and a valid end time of the command, the control portion may control the operation of the application program in accordance with the command being valid.

Preferably, the trigger information may include time information indicative of the progress of the AV content, and when the time indicated by the time information included in the trigger information either falls within a valid period defined by a valid start time and a valid end time of the command or has run past the valid start time of the command, the control portion may control the operation of the application program in accordance with the command being valid.

Preferably, the trigger information may include specific information specifying an information processing apparatus offering the correspondence table and identification information identifying the AV content, and when either or both of the specific information and the identification information included in the trigger information are changed, the table acquisition portion may acquire the correspondence table from the information processing apparatus in accordance with the specific information and the identification information.

Preferably, the table acquisition portion may acquire beforehand the correspondence table of the AV content having the changed identification information, and upon receipt of the AV content having the changed identification information, the control portion may control the operation of the application program based on the correspondence table acquired beforehand.

Preferably, the table acquisition portion may retain the correspondence table acquired beforehand for only a period designated beforehand.

Preferably, when currently received first AV content is to be switched to second AV content having the changed identification information, the table acquisition portion may acquire beforehand both the correspondence table of the first AV content and the correspondence table of the second AV content and retain the acquired correspondence tables, and when the first AV content is switched to the second AV content, the control portion may control the operation of the application program based on the correspondence table of the second AV content acquired beforehand.

Preferably, the trigger information may include time information indicative of the progress of the AV content; the correspondence table may describe the time at which the AV content is to be terminated; when the time counted on the basis of the time information included in the trigger information and indicative of the progress of the first AV content coincides with the time indicative of the termination of the first AV content described in the correspondence table of the first AV content, the control portion may start counting the time indicative of the progress of the second AV content; and when the time indicative of the progress of the second AV content and counted on the basis of the correspondence table of the second AV content acquired beforehand either falls within a valid period defined by the valid start time and valid end time of the command or has run past the valid start time of the command, the control portion may control the operation of the application program in accordance with the command being valid.

Preferably, the correspondence table may describe an updating duration thereof, and the table acquisition portion may update the correspondence table in accordance with the updating duration.

Preferably, the correspondence table may describe information indicative of a probability that the command becomes valid, and when the command becomes valid, the control portion may control the operation of the application program in accordance with the command.

Preferably, the command may designate registration, acquisition, or execution of the application program; or injection, suspension, or termination of an event; and in response to the command, the control portion may control the acquisition, registration, or execution of the application program; or the injection, suspension, or termination of an event in the currently executing application program.

The reception apparatus may be an independent apparatus or an internal block constituting part of one apparatus.

According to the first embodiment of the present technology, there are also provided a reception method and a program functionally corresponding to the above-outlined reception apparatus according to the first embodiment of this technology.

Where the above-mentioned reception apparatus, reception method, or program according to the first embodiment of the present technology is in use, AV content is first received; trigger information is acquired to operate an application program to be executed in interlocked relation to the AV content; a correspondence table is acquired which associates a command for controlling the operation of the application program with a valid time of the command; and when the time acquired from the trigger information as indicative of the progress of the AV content satisfies a predetermined condition of validity in reference to the valid time of the command on the basis of the acquired correspondence table, the operation of the application program is controlled in accordance with the command being valid.

According to a second embodiment of the present technology, there is provided a first information processing system including a reception apparatus, a first information processing apparatus, and a second information processing apparatus, the reception apparatus including: a reception portion configured to receive AV content; a trigger extraction portion configured to extract trigger information transmitted together with the AV content for operating an application program to be executed in interlocked relation to the received AV content; a table acquisition portion configured to acquire from the first information processing apparatus a correspondence table associating a command for controlling the operation of the application program with a valid time of the command, and a control portion configured such that when the time acquired from the extracted trigger information as indicative of the progress of the AV content satisfies a predetermined condition of validity in reference to the valid time of the command on the basis of the acquired correspondence table, the control portion controls the operation of the application program acquired from the second information processing apparatus in accordance with the command being valid; wherein the first information processing apparatus includes a first offering portion configured to offer the correspondence table in response to a query from the reception apparatus; and wherein the second information processing apparatus includes a second offering portion configured to offer the application program in response to a query from the reception apparatus.

Where the above-outlined first information processing system according to the second embodiment of the present technology is in use, AV content is received by the reception apparatus; trigger information transmitted together with the AV content is extracted to operate an application program to be executed in interlocked relation to the received AV content; from the first information processing apparatus, a correspondence table is acquired which associates a command for controlling the operation of the application program with a valid time of the command; when the time acquired from the extracted trigger information as indicative of the progress of the AV content satisfies a predetermined condition of validity in reference to the valid time of the command on the basis of the acquired correspondence table, the operation of the application program acquired from the second information processing apparatus is controlled in accordance with the command being valid; the correspondence table is offered by the first information processing apparatus in response to a query from the reception apparatus; and the application program is offered by the second information processing apparatus in response to a query from the reception apparatus.

According to a third embodiment of the present technology, there is provided a second information processing system including a reception apparatus, a first information processing apparatus, a second information processing apparatus, and a third information processing apparatus, the reception apparatus including: a reception portion configured to receive AV content; a feature quantity extraction portion configured to extract a feature quantity from data of the received AV content; a trigger acquisition portion configured to acquire trigger information for operating an application program to be executed in interlocked relation to the received AV content, the trigger information corresponding to a result of identification of the AV content by the first information processing apparatus using the feature quantity; a table acquisition portion configured to acquire from the second information processing apparatus a correspondence table associating a command for controlling the operation of the application program with a valid time of the command, and a control portion configured such that when the time acquired from the acquired trigger information as indicative of the progress of the AV content satisfies a predetermined condition of validity in reference to the valid time of the command on the basis of the acquired correspondence table, the control portion controls the operation of the application program acquired from the third information processing apparatus in accordance with the command being valid; wherein the first information processing apparatus includes a first offering portion configured to offer the trigger information corresponding to the result of the identification of the AV content using the feature quantity from the reception apparatus; wherein the second information processing apparatus includes a second offering portion configured to offer the correspondence table in response to a query from the reception apparatus, and wherein the third information processing apparatus includes a third offering portion configured to offer the application program in response to a query from the reception apparatus.

Where the above-outlined second information processing system according to the third embodiment of the present technology is in use, AV content is received by the reception apparatus; a feature quantity is extracted from data of the received AV content; trigger information is acquired to operate an application program to be executed in interlocked relation to the received AV content, the trigger information corresponding to a result of identification of the AV content by the first information processing apparatus using the feature quantity; from the second information processing apparatus, a correspondence table is acquired which associates a command for controlling the operation of the application program with a valid time of the command; when the time acquired from the acquired trigger information as indicative of the progress of the AV content satisfies a predetermined condition of validity in reference to the valid time of the command on the basis of the acquired correspondence table, the operation of the application program acquired from the third information processing apparatus is controlled in accordance with the command being valid; the first information processing apparatus offers the trigger information corresponding to the result of the identification of the AV content using the feature quantity from the reception apparatus; the second information processing apparatus offers the correspondence table in response to a query from the reception apparatus; and the third information processing apparatus offers the application program in response to a query from the reception apparatus.

According to the first through the third embodiments of the present technology, it is possible to offer the application program for execution in interlocked relation to AV content.

BRIEF DESCRIPTION OF THE DRAWINGS

FIG. 7 is a view showing typical items included in the trigger information;

FIG. 9 is a view showing typical detailed specifications of a TPT;

FIG. 10 is a s view showing a typical description of the TPT;

FIG. 12 is a state transition diagram of a data broadcast application;

FIG. 15 is views explanatory of a type attribute in a tpt element;

FIG. 37 is a view showing a typical structure of a computer.

DETAILED DESCRIPTION OF THE PREFERRED EMBODIMENTS

Some preferred embodiments of the present technology will now be described in reference to the accompanying drawings.

First Embodiment

[Typical Configuration of the Broadcasting System]

Figure 1:
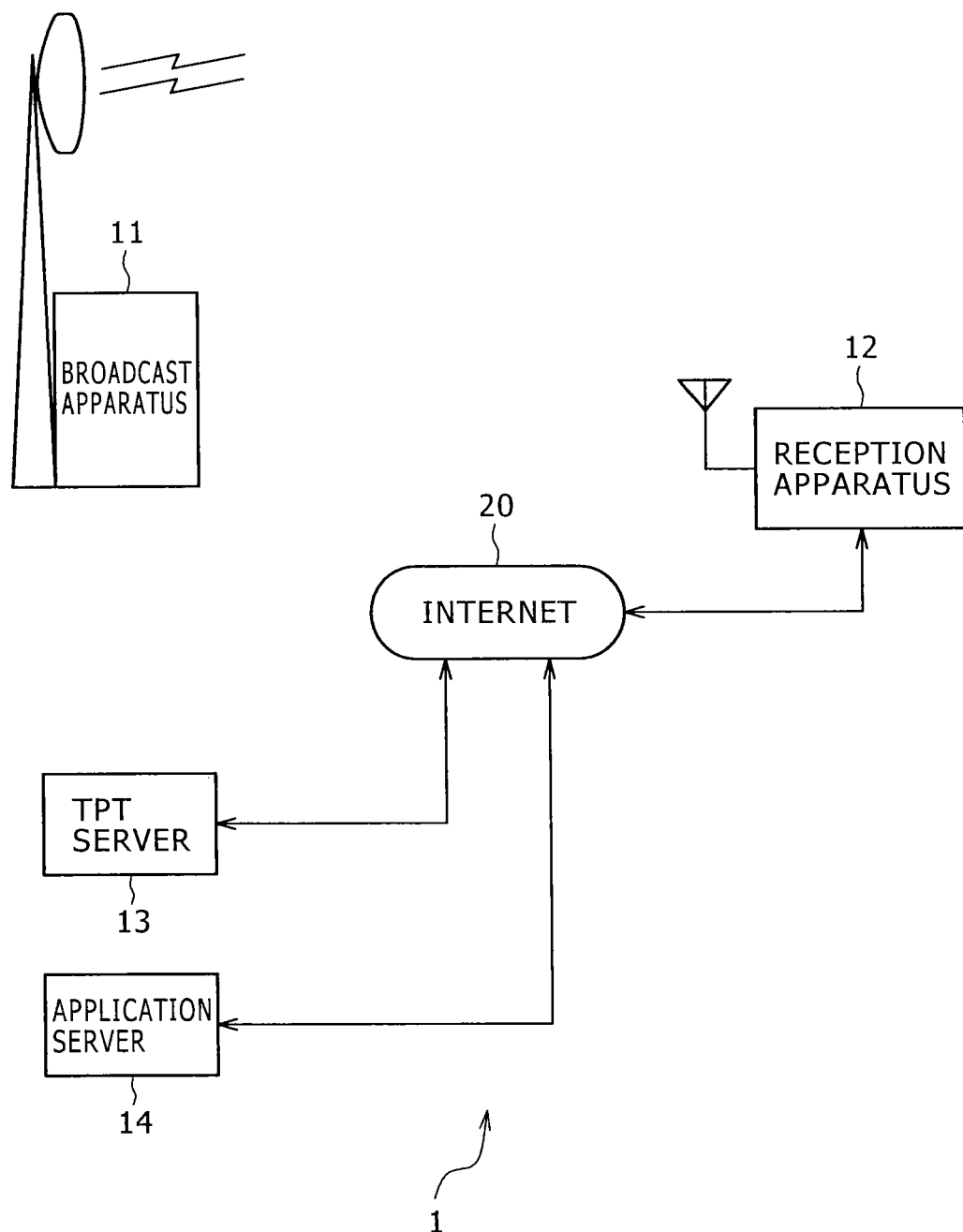
FIG. 1 is a view showing a typical configuration of a broadcasting system.

FIG. 1 shows a broadcasting system 1 as a first embodiment of the present technology. The broadcasting system 1 is made up of a broadcast apparatus 11, a reception apparatus 12, a TPT server 13, and an application server 14. The reception apparatus 12, TPT server 13, and application server 14 are interconnected via the Internet 20.

The broadcast apparatus 11 transmits digital TV broadcast signals (simply called the broadcast signal hereunder) of AV content such as TV programs and CM's.

As part of the broadcast signal, the broadcast apparatus 11 also transmits trigger information for operating at a predetermined time a data broadcast application to be executed in interlocked relation to AV content. The data broadcast application is an application program executed in interlocked relation to AV content for the purpose of broadcasting data.

The trigger information is transmitted in a manner inserted in the video or audio signal of AV content or placed in a transport stream (hereinafter referred to as TS) of the broadcast signal. The trigger information will be discussed later in detail with reference to FIGS. 4 through 8.

The reception apparatus 12 receives the broadcast signal transmitted from the broadcast apparatus 11 and acquires the images and sounds of AV content from the received signal. The reception apparatus 12 outputs the acquired images and sounds to a display device and speakers, respectively.

Incidentally, the reception apparatus 12 may exist as a stand-alone apparatus or an apparatus incorporated in the TV set, video recorder or the like. A detailed structure of the reception apparatus 12 will be discussed later in reference to FIG. 2.

Also, in response to trigger information coming from the broadcast apparatus 11, the reception apparatus 12 accesses the TPT server via the Internet 20 to acquire a TPT.

The TPT server 13 may be a server provided by, say, a broadcast business operator or the like broadcasting TV programs using the broadcast apparatus 11. As such, the TPT server 13 manages TPT's. In response to a query from the reception apparatus 12, the TPT server 13 offers the TPT under its management to the reception apparatus 12 via the Internet 20.

The TPT (trigger parameter table) is a correspondence table that associates a command for controlling the data broadcast application with the valid period and valid time of that command. The valid period and valid time of the command are determined in keeping with the progress of AV content.

When the time acquired from the trigger information from the broadcast apparatus 11 as indicative of the progress of AV content either falls within the valid period of the command or has run past a valid start time thereof on the basis of the TPT acquired from the TPT server 13, the reception apparatus 12 specifies the command being valid. And in accordance with the command thus specified, the reception apparatus 12 controls the operation of the data broadcast application. Also in keeping with the specified command, the reception apparatus 12 accesses the application server 14 via the Internet 20 to acquire the data broadcast application.

The application server 14 may be a server provided by, say, a broadcast business operator or the like broadcasting TV programs using the broadcast apparatus 11. As such, the application server 14 manages the data broadcast applications to be executed in interlocked relation to the AV content broadcast from the broadcast apparatus 11. In response to a query from the reception apparatus 12, the application server 14 offers the data broadcast application under its management to the reception apparatus 12 via the Internet 20.

The broadcasting system 1 is structured as described above.

[Typical Structure of the Reception Apparatus]

Figure 2:
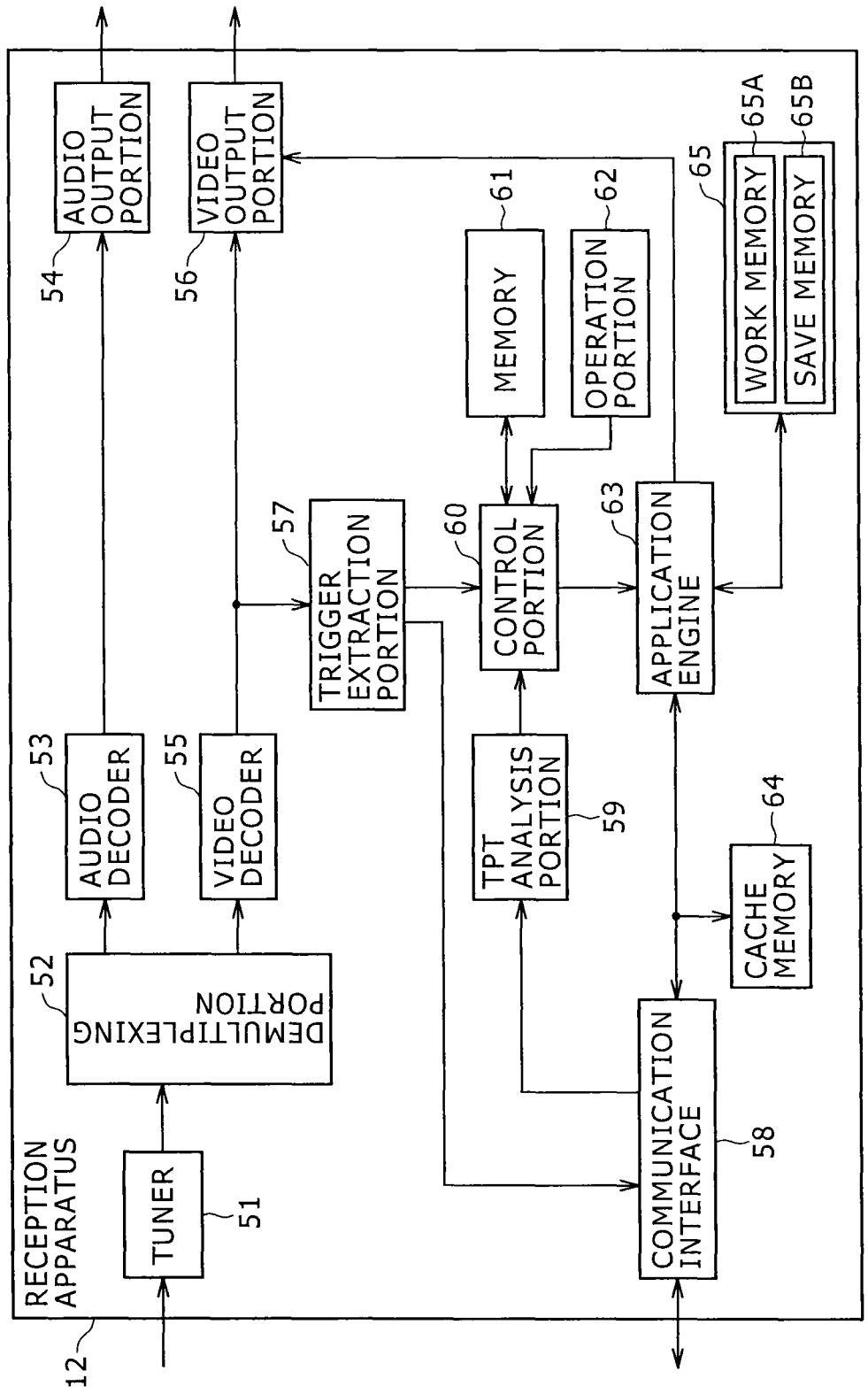
FIG. 2 is a view showing a typical structure of a reception apparatus.

FIG. 2 shows a typical structure of the reception apparatus 1 included in FIG. 1.

The reception apparatus 12 is made up of a tuner 51, a demultiplexing portion 52, an audio decoder 53, an audio output portion 54, a video decoder 55, a video output portion 56, a trigger extraction portion 57, a communication interface 58, a TPT analysis portion 59, a control portion 60, a memory 61, an operation portion 62, an application engine 63, a cache memory 64, and an application memory 65.

The tuner 51 receives and demodulates the broadcast signal corresponding to the channel selected by the user, and outputs the TS resulting from the received broadcast signal to the demultiplexing portion 52.

The demultiplexing portion 52 demultiplexes the TS input from the tuner 51 into an audio coded signal and a video coded signal, and outputs the audio coded signal and video coded signal to the audio decoder 53 and video decoder 55, respectively.

The audio decoder 53 decodes the input audio coded signal, and outputs the resulting audio signal to the audio output portion 54. The audio output portion 54 outputs the input audio signal to downstream speakers (not shown).

The video decoder 55 decodes the input video coded signal, and outputs the resulting video signal to the video output portion 56 and trigger extraction portion 57. The video output portion 56 outputs the video signal input from the video decoder 55 to a downstream display device (not shown).

The trigger extraction portion 57 continuously monitors the video signal input from the video decoder 55, extracts trigger information that may be embedded in the video signal, and outputs the extracted trigger information to the control portion 60.

Explained here is an example in which the trigger information is embedded in the video signal. Alternatively, if the trigger information is placed in the TS, the trigger extraction portion 57 extracts the trigger information from PCR packets which are input from the demultiplexing portion 52 and which include the trigger information. And if the trigger information is embedded in the audio signal, the trigger extraction portion 57 continuously monitors the audio signal input from the audio decoder 53, and extracts the trigger information that may be embedded in the audio signal.

In accordance with the extracted trigger information, the trigger extraction portion 57 controls the communication interface 58 to access the TPT server 13 via the Internet 20 so as to request a TPT. The communication interface 58 receives the TPT transmitted from the TPT server 13 via the Internet 20, and outputs the received TPT to the TPT analysis portion 59.

The TPT analysis portion 59 acquires the TPT coming from the communication interface 58. The TPT analysis portion 59 proceeds to analyze the acquired TPT and retain it in an internal memory (not shown). Also, in response to a request from the control portion 60, the TPT analysis portion 59 outputs the TPT from the memory where it is retained.

The control portion 60 controls the operation of the components making up the reception apparatus 12 by executing a control program stored beforehand in the memory 61. The memory 61 has the control program preinstalled therein for execution by the control portion 60. The control program may be updated as needed based on the update data acquired from the broadcast signal or over the Internet 20. The operation portion 62 receives various operations from the user, and notifies the control portion 60 of operation signals reflecting the user's operations.

Furthermore, when the time acquired from the time information included in the trigger information from the trigger extraction portion 57 as indicative of the progress of AV content either falls within the valid period of a command or has run past the valid start time of that command on the basis of the TPT from the TPT analysis portion 59, the control portion 60 specifies the command being valid. In accordance with the command thus specified, the control portion 60 controls the acquisition, registration, or execution of the data broadcast application; or the injection, suspension, or termination of an event in the currently executing data broadcast application.

Under control of the control portion 60, the application engine 63 controls the communication interface 58 to access the application server 14 via the Internet 20 so as to request the data broadcast application. The communication interface 58 receives the data broadcast application transmitted from the application server 14 over the Internet 20, and retains the received data broadcast application in the cache memory 64.

Under control of the control portion 60, the application engine 63 reads the data broadcast application from the cache memory 64 and executes the retrieved application. The video signal of the currently executing data broadcast application is output to the video output portion 56.

The video output portion 56 combines the video signal input from the application engine 63 with the video signal input from the video decoder 55, and outputs the composite signal to a display device located downstream.

The application memory 65 is made up of a work memory 65A and a save memory 65B. The application engine 63 records data about the currently executing data broadcast application (specifically, data including the layer of the displayed information) to the work memory 65A. When suspending the currently executing data broadcast application, the application engine 63 moves the data held in the work memory 65A to the save memory 65B in the application memory 65. When resuming the suspended data broadcast application, the application engine 63 moves the data held in the save memory 65B to the work memory 65A so as to restore the state in effect before the suspension.

The reception apparatus 12 is structured as described above.

[Operations of the Apparatuses Making Up the Broadcasting System]

Figure 3:
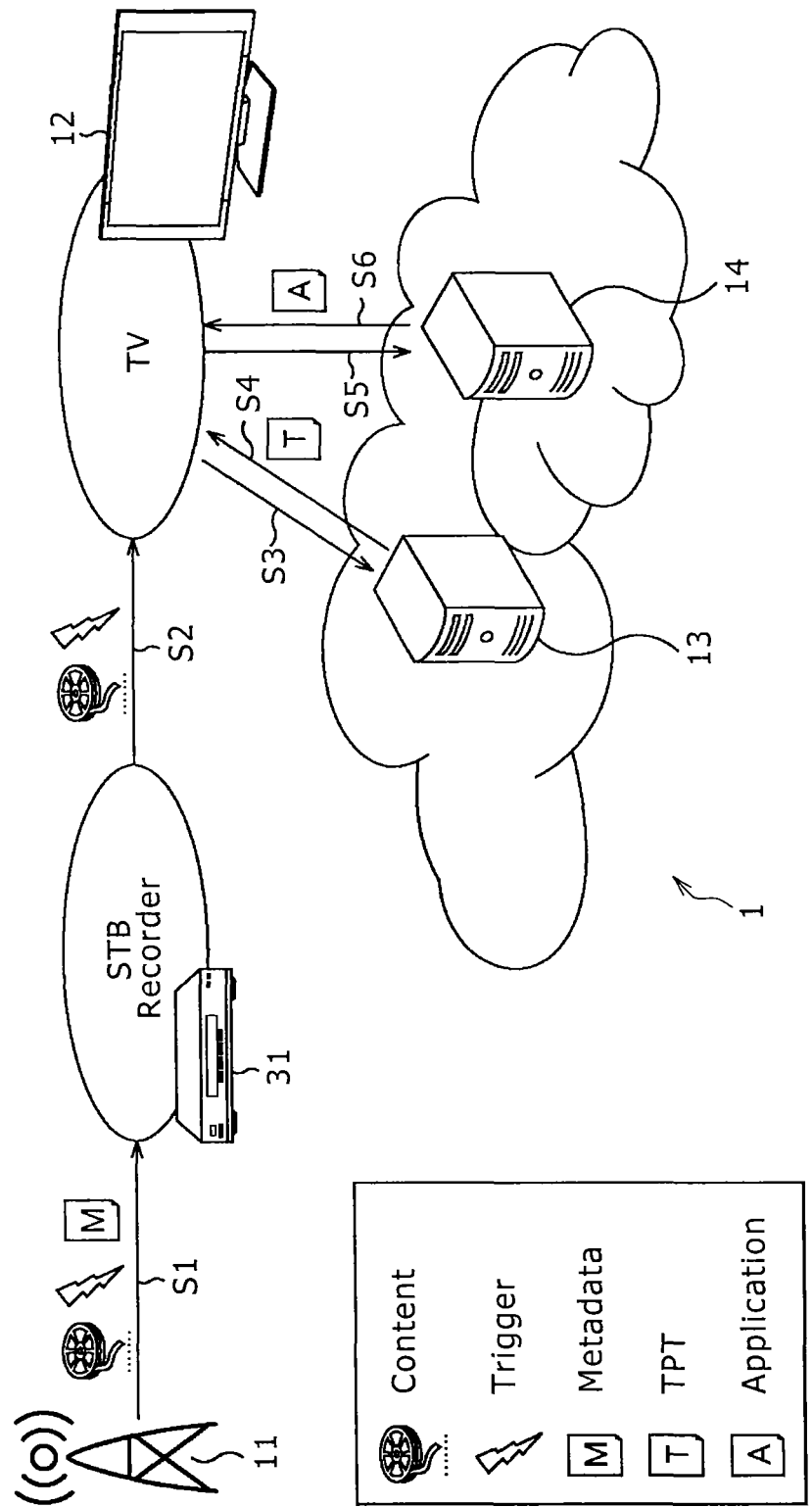
FIG. 3 is a view explanatory of the operations of apparatuses making up the broadcasting system.

Explained below in reference to FIG. 3 is an outline of the operations of the apparatuses making up the broadcasting system 1 shown in FIG. 1.

In the broadcasting system 1 of FIG. 3, the broadcast apparatus 11 transmits (S1) the broadcast signal of a TV program (indicated as "Content" in the figure) together with trigger information (indicated as "Trigger"). The broadcast signal also includes metadata about the TV program in question (indicated as "Metadata").

When receiving (S2) the broadcast signal from the broadcast apparatus 11 via a CATV network, a satellite communication network, etc., the reception apparatus 12 gets a dedicated terminal such as a set-top box 31 ("STB Recorder" in FIG. 3) to convert the incoming signal for reception via HDMI (High Definition Multimedia Interface). In this case, the output from the set-top box 31 consists of the TV program and trigger information only, so that the reception apparatus 12 cannot make use of metadata.

When receiving the broadcast signal either directly (S1) or by way of the set-top box 31 (S2), the reception apparatus 12 can extract trigger information that may be transmitted along with the broadcast signal. And the reception apparatus 12 determines whether or not to acquire a TPT based on the server specific information specifying the TPT server 13 and on the content identification information identifying the AV content.

As will be discussed later in detail, the server specific information and content identification information correspond to "domain_name" and "program_id" in FIG. 7, respectively.

If it is determined that the TPT is to be acquired, the reception apparatus 12 accesses the TPT server 13 via the Internet 20 and requests the TPT therefrom (S3).

In response to a query from the reception apparatus 12, the TPT server 13 specifies the TPT and transmits (S4) the specified TPT (indicated as "TPT" in FIG. 3) to the reception apparatus 12 over the Internet 20. The reception apparatus 12 receives the TPT from the TPT server 13 via the Internet 20, and retains the received TPT.

Specifically, the TPT server 13 may manage the TPT for each of individual TV programs, for example. The TPT server 13 specifies the TPT corresponding to the TV program typically identified by the content identification information included in the request for a TPT from the reception apparatus 12, and transmits the specified TPT to the reception apparatus 12. In this manner, the reception apparatus 12 acquires the TPT from the TPT server 13.

Upon extracting trigger information coming from the broadcast apparatus 11, the reception apparatus 12 references the retained TPT to determine whether the time indicated by time information included in the extracted trigger information either falls within the valid period of a command or has run past the valid start time of that command. If it is determined that the time falls within the valid period of a command or has run past the valid start time thereof, the reception apparatus 12 specifies that command being valid.

As will be discussed later in detail, the time information corresponds to "media_time" shown in FIG. 7, and the valid period corresponds to the period designated by a start_time attribute and an end time attribute in the command element of the TPT shown in FIG. 9. The valid start time corresponds to the time indicated by the start_time attribute.

In accordance with the command thus specified, the reception apparatus 12 accesses the application server 14 via the Internet 20, and requests (S5) the data broadcast application to be executed in interlocked relation to the currently selected TV program.

In response to a query from the reception apparatus 12, the application server 14 transmits (S6) the data broadcast application (indicated as "Application" in FIG. 3) to the reception apparatus 12 over the Internet 20. The reception apparatus 12 acquires the data broadcast application coming from the application server 14 via the Internet 20, and executes the acquired data broadcast application.

If trigger information is extracted by the reception apparatus 12 while the data broadcast application is being executed, the command corresponding to the time information included in the extracted trigger information is specified by the TPT. The data broadcast application then performs the operation such as injection, suspension, or termination of an event in accordance with the specified command.

In the broadcasting system 1, as described above, the reception apparatus 12 operates in concert with the TPT server 13 and application server 14 according to the trigger information from the broadcast apparatus 11. In so doing, the reception apparatus 12 acquires the data broadcast application to be executed in interlocked relation to the currently selected TV program, and executes the acquired data broadcast application. Because the trigger information from the broadcast apparatus 11 is also communicated to the reception apparatus 12 via the dedicated terminal such as the set-top box 31, the broadcasting system 1 can offer data broadcasting applications without refurbishing the broadcast channel equipment such as CATV networks and dedicated terminals and without getting permission from broadcast business operators relaying TV programs.

[Method for Transmitting the Trigger Information]

The method for transmitting trigger information is explained below.

Figure 4B:
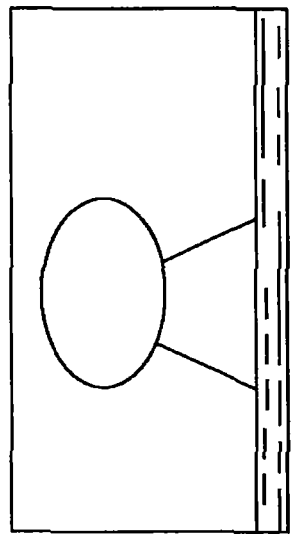
FIGS. 4A and 4B are views showing examples of trigger information being embedded in a video signal.
Figure 4A:
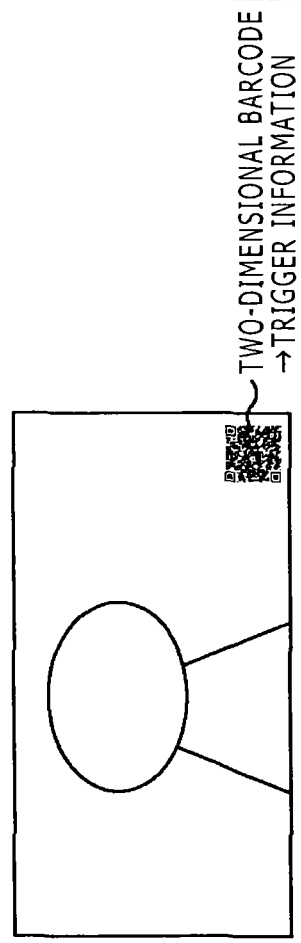

FIGS. 4A and 4B show two examples of trigger information being embedded in the video signal of a TV program.

FIG. 4A shows an example in which trigger information is converted to a two-dimensional barcode that is superposed on a predetermined location (bottom right corner in this case) of the video signal. FIG. 4B shows an example in which trigger information is converted to an image code that is superposed on several lines at the bottom of the video signal image. The trigger information shown in FIGS. 4A and 4B is extracted by the trigger extraction portion 57 of the reception apparatus 12.

In both examples shown in FIGS. 4A and 4B, the trigger information is superposed on images of the TV program. This makes it possible to communicate the trigger information to reception apparatuses that utilize CATV networks or satellite communication networks (e.g., reception apparatus 12 in FIG. 3), for example.

Also in both examples of FIGS. 4A and 4B, the trigger information superposed on the images can be visually recognized (as the two-dimensional barcode or image code) by the user of the reception apparatus 12. If that is not desired, the trigger information placed on the images may be masked using the same pixels as those surrounding the information before being displayed.

Whereas the examples in FIGS. 4A and 4B show the trigger information to be embedded in the video signal of the TV program, this is not limitative of how the trigger information is to be located or transmitted. Alternatively, the trigger information may be placed in PCR packets of the TS.

Figure 5:
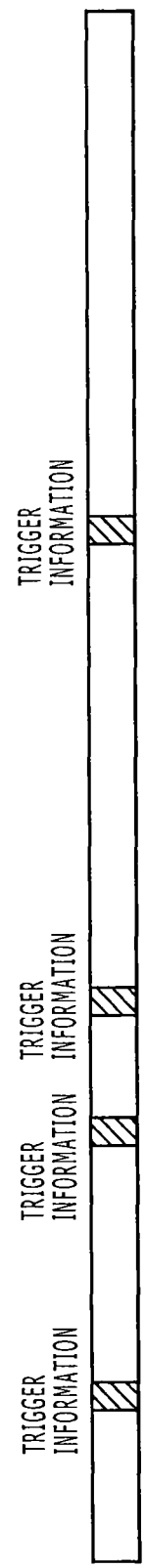
FIG. 5 is a view conceptually showing how trigger information is included in PCR packets of a TS.

FIG. 5 conceptually shows how trigger information is included in PCR packets of the TS of the broadcast signal.

As shown in FIG. 5, trigger information is placed not in all PCR packets but in some of them solely in a suitably timed manner permitting operations in interlocked relation to the TV program. Since PCR packets usually pass through the PID filter of CATV retransmission equipment, the trigger information can also be communicated to reception apparatuses that make use of CATV networks or satellite communication networks (e.g., reception apparatus 12 in FIG. 3). Alternatively, the trigger information may be placed in user data areas of a video coded stream or an audio coded stream.

In consideration of possible radio disturbance or data dropouts (reception error) at the reception apparatus 12, the same trigger information is transmitted a number of times in a row.

Figure 6:
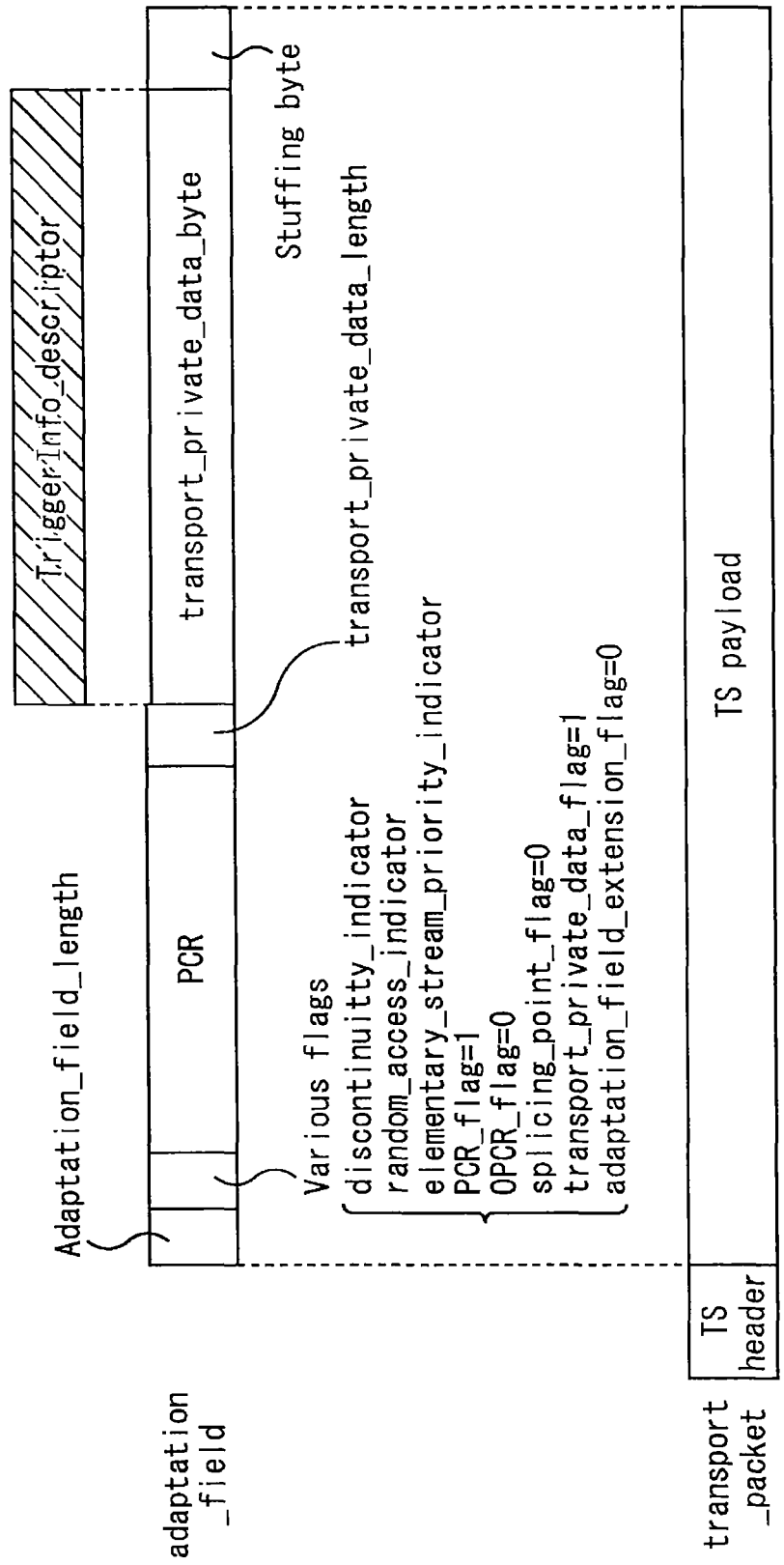
FIG. 6 is a view showing a specific location of the trigger information in a PCR packet.

FIG. 6 shows where trigger information is located in a PCR packet. The PCR packet is a TS packet with a PCR placed in "adaptation_field" of the packet. The trigger information (Trigger Info_descriptor) is placed in "transport_private_data_byte" following the PCR. When the trigger information is placed in this manner, "transport_private_data_flag" as part of "Various_flags" preceding the PCR is set to "1."

[Details of Trigger Information]

Trigger information is explained below in detail. FIG. 7 shows typical items of information included in the trigger information.

The item "domain_name" is information that specifies the TPT server 13. For example, information indicative of the domain name of the TPT server 13 is designated in this item. Since the TPT server 13 is provided by business entities such as broadcast business operators broadcasting TV programs, the item "domain_name" varies from one business operator to another.

The item "program_id" is information that identifies AV content. When the reception apparatus 12 communicates "program_id" as part of the trigger information to the TPT server 13, the TPT server 13 can identify the TV program or the like specifying the TPT on the basis of "program_id" from the reception apparatus 12.

The item "media_time" is information that indicates a specific point in time along the time axis of the progress of AV content. For example, designated in the item "media_time" is a point in time relative to a specific reference time such as the start time of the TV program on the time axis of the progress or the midnight (0:00). Also, the time is designated in "media_time" in seconds or in milliseconds, for example.

As mentioned above, the items "domain_name," "program_id," and "media_time" correspond to server specific information, content identification information, and time information, respectively.

[Typical Description of Trigger Information]

Figure 8:
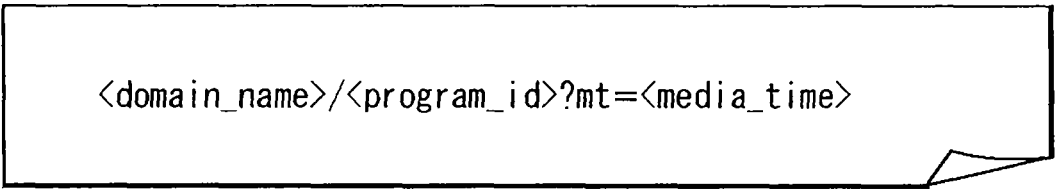
FIG. 8 is a view showing a typical description of the trigger information.

FIG. 8 shows a typical description of trigger information.

As shown in FIG. 8, trigger information is made up of a character string that contains the values designating "domain_name," "program_id," and "media_time" listed in FIG. 7 as well as predetermined characters such as "/" and "?mt=" being concatenated. For example, if "domain_name" is "xbc.com," "program_id" is "1," and "media_time" is "1000," then the character string constituting the trigger information is "xbc.com/1?mt=1000."

Prefixing "http://" to the above character string provides a character string "http://xbc.com/1?mt=1000" indicating a URL (Uniform Resource Locator) with which to access the TPT server 13. Because this URL is suffixed with a query character string "mt=<media_time>," the TPT server 13 can acquire the parameters involved using the GET method under HTTP (HyperText Transfer Protocol).

Any suitable method may be adopted for describing trigger information. The typical description shown in FIG. 8 is not limitative of the manner in which trigger information may be described.

The trigger information is structured as described above.

[Details of the TPT]

The TPT (trigger parameter table) is explained below in detail. FIG. 9 shows typical detailed specifications of the TPT.

As shown in FIG. 9, the TPT is composed of a tpt element, a command element, an application element, an event element, and a diffusion element.

In the tpt element, the information about the TPT is described. The tpt element includes an id attribute, a type attribute, a version attribute, an updating_time attribute, a present_following attribute, an end_mt attribute, and an expire_date attribute.

In the id attribute, the information identifying the TPT is designated. For example, a character string formed by concatenating "domain_name" with "program_id" is designated in the id attribute.

In the type attribute, "static" or "dynamic" is designated as the attribute value. The attribute value "static" is designated to update the TPT only if "program_id" included in the trigger information is changed. The attribute value "dynamic" is designated to update the TPT even if "program_id" included in the trigger information remains the same.

In the version attribute, the information indicative of the version of this TPT is designated.

In the updating_time attribute, the information indicative of the updating duration of the TPT is designated. The updating_time attribute is designated only if "dynamic" is designated in the type attribute.

In the present_following attribute, either "present" or "following" is designated as the attribute value. The attribute value "present" indicates that this TPT is intended for the present TV program, and the attribute value "following" indicates that this TPT is intended for the following TV program.

In the end_mt attribute, the information indicative of the time at which the "media_time" of the AV content corresponding to this TPT is to be terminated.

In the expire_date attribute, the information indicative of the expiration date of this TPT is designated. The expire_date attribute is designated only when "static" is designated in the type attribute.

In the command element, the information about the command is designated. The command element includes an id attribute, a start_time attribute, an end_time attribute, a destination attribute, and an action attribute.

In the id attribute, the information identifying the command is designated.

In the start_time attribute, the information indicative of the start time of the valid period of the command identified by the id attribute is designated. In the end_time attribute, the information indicative of the end time of the valid period of the command identified by the id attribute is designated.

That is, the valid period of the command is indicated by the start_time attribute and end_time attribute designating two points in time on the time axis of the progress of the corresponding AV content. When the timing of the progress of the AV content falls within the valid period, the command in question is considered valid. If the timing of the progress of the AV content has yet to reach the valid period or has run past that period, the command in question is considered invalid. The end_time attribute is not a mandatory item. If the start_time attribute alone is designated, then the command in question is considered valid when the timing of the progress of the AV content has run past the valid start time indicated by the start_time attribute.

In the destination attribute, the apparatus destined to be controlled by the data broadcast application using this command is designated. Here, the reception apparatus proper (i.e., reception apparatus 12) is designated in this attribute. Alternatively, if an external device (not shown) is connected to the reception apparatus 12, that external device is designated as the destination apparatus for the command. For example, if the destination apparatus for the command is the reception apparatus 12, then "receiver" may be designated, and if the destination apparatus for the command is an external device, then "external_1" or "external_2" may be designated. If the destination attribute is not designated, then "receiver" is assumed to be designated.

The action attribute is designated to indicate that this command is "execute," "register," "suspend," "terminate," or "event."

The execute command (execute) is a command that instructs the reception apparatus 12 to acquire or execute the data broadcast application.

The register command (register) is a command that instructs the reception apparatus 12 to acquire or register the data broadcast application. Here, registering the data broadcast application signifies that the priority and expiration date of the acquired data broadcast application are stored in association with that application. The data broadcast application is managed by the control portion 60 in accordance with the priority and expiration date of the application.

The suspend command (suspend) is a command that instructs the reception apparatus 12 to suspend the currently executing data broadcast application.

The terminate command (terminate) is a command that instructs the reception apparatus 12 to terminate the currently executing data broadcast application.

The event command (event) is a command that instructs the reception apparatus 12 to inject an event into the currently executing data broadcast application.

That is, in the action attribute, "execute" is designated when the data broadcast application is to be acquired or executed, and "register" is designated when the data broadcast application is to be acquired or registered. Also in the action attribute, "suspend" is designated when the data broadcast application is to be suspended; "terminate" is designated when the data broadcast application is to be terminated; and "event" is designated when an event is to be injected into the currently executing data broadcast application.

In the application element, the information about the data broadcast application is described. The application element includes an id attribute, a type attribute, a url attribute, a priority attribute, and an expire_date attribute.

In the id attribute, the application ID identifying this data broadcast application is designated. In the type attribute, the application type indicative of the information about file attributes of this data broadcast application is designated. In the url attribute, the application URL indicating the location from which to acquire this data broadcast application is designated provided the command in effect is the execute command or the register command. Thus the URL of the application server 14 is designated in the url attribute.

Designated in the priority attribute is the information indicative of the priority in effect when the data broadcast application corresponding to this command is to be acquired and retained. In the expire_date attribute, the information indicative of the expiration date of the data broadcast application is designated. When the data broadcast application is registered, the expiration date of the application and the priority regarding its retention are stored. The data broadcast application is managed in accordance with its expiration date and priority.

The url attribute and expire_date attribute are mandatory items when the command in effect is the execute command or the register command. In the priority attribute, "0" is usually designated; if a higher priority is desired, "1" is designated in this attribute.

In the event element, the information about the event command is described. The event element includes an id attribute and a data element.

Designated in the id attribute is the event ID identifying the event to be injected into the data broadcast application designated by the application ID provided the command in effect is the event command. In the data element, added event data is designated which is referenced when the event is injected provided the command in effect is the event command.

The event element is a mandatory item when "event" is designated in the action attribute.

Designated in the diffusion element is the information for stochastically diffusing the command execution timing at the reception apparatus 12. Setting this value makes it possible for a plurality of reception apparatuses 12 to acquire data broadcast applications from the application server 14 at diffused timings, thereby avoiding congestion. The diffusion element includes a rate attribute, a range attribute, and a period attribute. The number of timings is designated in the rate attribute; a maximum delay time is designated in the range attribute; and an applied command diffusion period is designated in the range attribute.

[Typical Description of the TPT]

FIG. 10 shows a typical description of the TPT.

In the example of FIG. 10, "xbc.com/1" is designated in the id attribute of the tpt element. This means, for example, that the TPT is destined for the TV program (program_id="1") broadcast by an xbc broadcasting station (domain_name="xbc.com").

Also in the tpt element, "static" is designated in the type attribute. Thus the TPT is updated only if "program_id" is changed. And because "2011-01-21" is designated in the expire_date attribute, the expiration date of this TPT is Jan. 21, 2011.

It should be noted that seven command elements are described in the tpt element, although not all of them are described here for reasons of simplification.

In the first command element, "1" is designated as the id attribute, "0" as the start_time attribute, "600" as the end_time attribute, "receiver" as the destination attribute, and "register" as the action attribute. That is, this command (id=1) is the register command destined for the reception apparatus 12 for execution within the valid period ranging from 0 to 600 seconds.

Between the start tag and the end tag of the command element, an application element is described. In the application element, "1" is designated as the id attribute, "html" as the type attribute, "xxx.com/yyy1" as the url attribute, and "2011-01-21" as the expire_date attribute. That is, this application element signifies that the data broadcast application (id=1) described in HTML (Hyper Text Markup Language) can be acquired from the application server 14 specified by the URL "xxx.com/yyy1." It is also indicated that the expiration date of this data broadcast application is Jan. 21, 2011.

Likewise, the second command element indicates that this command (id=2) is the execute command destined for the reception apparatus 12 for execution within the valid period ranging from 600 to 3500 seconds. It is further indicated that the data broadcast application (id=1) to be acquired in accordance with the execute command can be acquired from the application server 14 specified by the URL "xxx.com/yyy1." Because the diffusion element is described here, the reception apparatus 12 is to access the application server 14 at the timing determined by the values designated in the rate attribute, range attribute, and period attribute.

The third command element indicates that this command (id=3) is the event command destined for the data broadcast application (id=1) to be executed by the reception apparatus 12, the event command being executed within the valid period ranging from 1800 to 2000 seconds. Between the start tag and the end tag of this command element, an application element and an event element are described. In the application element, "1" is designated as the id attribute. In the event element, "event1" is designated as the id attribute, and "zzzzzzz . . . z" as the data element. That is, when the event is injected using this command, the data broadcast application makes use of the data "zzzzzzz . . . z."

The fourth command element indicates that this command (id=4) is the suspend command destined for the data broadcast application (id=1) to be executed by the reception apparatus 12, the suspend command being executed within the valid period ranging from 2400 to 2520 seconds. Also, the fifth command element indicates that this command (id=5) is the terminate command destined for the data broadcast application (id=1) to be execute by the reception apparatus 12, the terminate command being executed within the valid period ranging from 3500 to 3600 seconds.

The sixth command element indicates that this command (id=12) is the execute command destined for the reception apparatus 12 for execution within the valid period ranging from 2400 to 2520 seconds. In the application element between the start tag and the end tag of the command element, "2" is designated as the id attribute, "html" as the type attribute, "xxx.com/yyy2" as the url attribute, and "2011-01-22" as the expire_date attribute. It is thus indicated that the data broadcast application (id=2) to be acquired in accordance with the execute command can be acquired from the application server 14 specified by the URL "xxx.com/yyy2."

Likewise, the seventh element indicates that this command (id=15) is the terminate command destined for the data broadcast application (id=2) to be executed by the reception apparatus 12, the terminate command being executed within the valid period ranging from 2520 to 3600 seconds.

Any suitable method may be adopted for describing the TPT. The description example in FIG. 10 is not limitative of the manner in which the TPT may be described.

The TPT is structured as described above.

[Relations of Correspondence Between Trigger Information and Commands]

Figure 11:
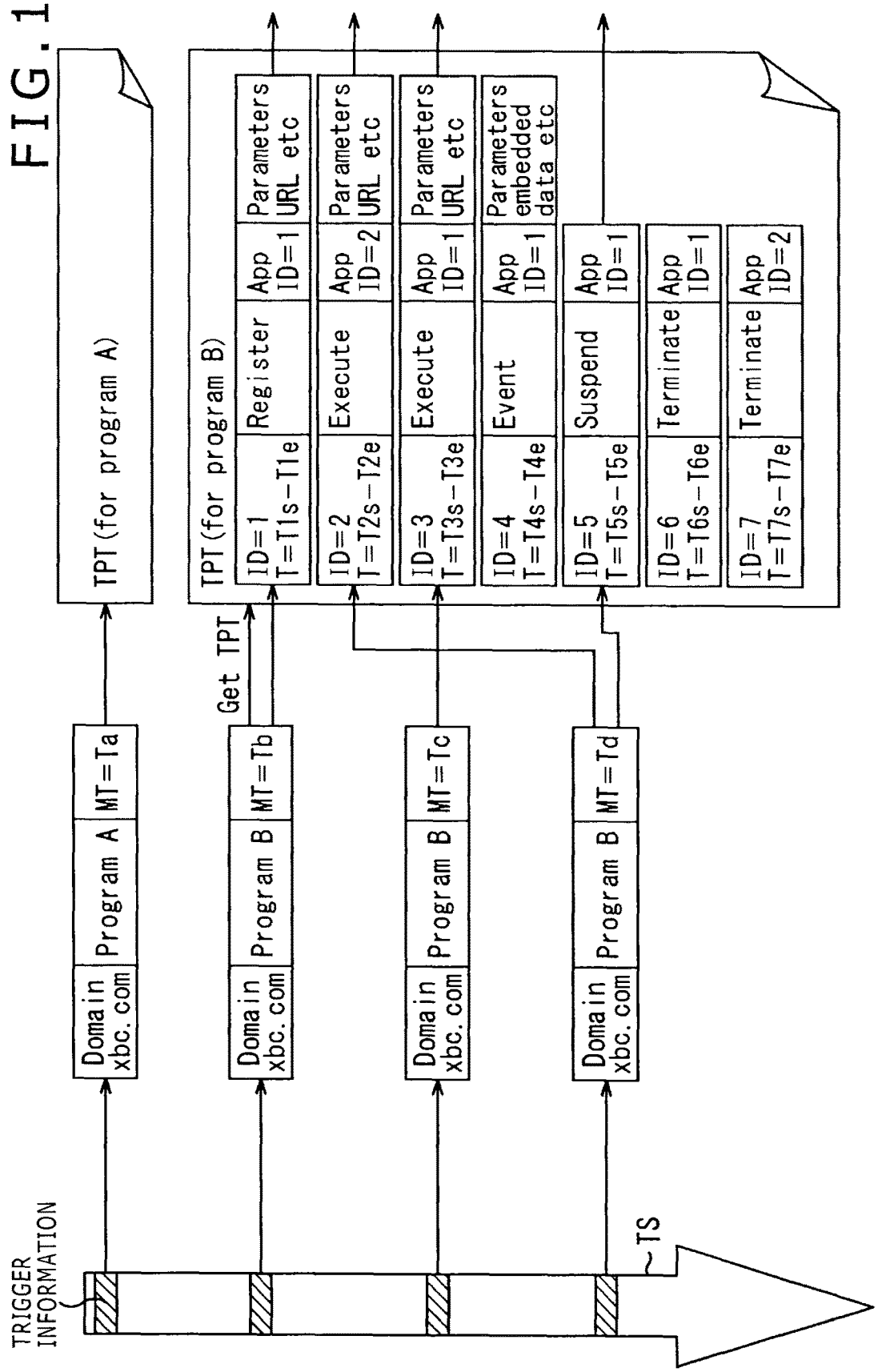
FIG. 11 is a view showing typical relations of correspondence between trigger information and commands.

Explained below is a processing example in which the commands associated with trigger information are specified by TPT's. FIG. 11 shows typical relations of correspondence between trigger information and commands.

As shown in FIG. 11, when trigger information is extracted from the video signal obtained from the TS, the reception apparatus 12 determines whether or not to acquire a TPT from the TPT server 13 based on "domain_name" and "program_id" included in the extracted trigger information. In the example of FIG. 11, it is assumed that "program_id" of program A is "10" and that of program B is "20" (e.g., the programs are TV programs, CM's, etc.).

For example, suppose that while retaining the TPT for program A (program_id="10") to be broadcast by the xbc broadcasting station (domain_name="xbc.com"), the reception apparatus 12 has extracted trigger information "xbc.com/20?mt=Tb" from the TS. In that case, the reception apparatus 12 makes the determination to acquire the TPT because the value of "program_id" is changed. The reception apparatus 12 then acquires the TPT by gaining access to the TPT server 13 specified by the URL ("http://xbc.com/20?mt=Tb") obtained by prefixing "http://" to the trigger information.

The operation above allows the reception apparatus 12 to retain the TPT (for program B) as shown in FIG. 11. Although the TPT shown in FIG. 11 corresponds to the above-described TPT in FIG. 10, what is shown in FIG. 11 are only limited parameters including the id attribute, start_time attribute, end_time attribute, and action attribute of the command element; as well as the id attribute and URL of the application element for reasons of simplification.

For example, if "media_time" included in the first trigger information ("xbc.com/20?mt=Tb") is "Tb," then Tb falls within the valid period ranging from T1$s$ to T1$e$, so that the reception apparatus 12 specifies the register command corresponding to the id attribute "1" based on the TPT. In accordance with the register command, the reception apparatus 12 acquires and registers the data broadcast application having the application ID "1."

Then if the second trigger information ("xbc.com/20?mt=Tc") is extracted, then "media_time" that is Tc falls within the valid period ranging from T3s to T3e, so that the reception apparatus 12 specifies the execute command corresponding to the id attribute "3" based on the TPT. In accordance with the execute command, the reception apparatus 12 executes the previously acquired data broadcast application.

Also, if the third trigger information ("xbc.com/20?mt=Td") is extracted, then "media_time" that is "Td" falls within the valid period ranging from T5s to T5e, so that the reception apparatus 12 specifies the suspend command corresponding to the id attribute "5" based on the TPT. In accordance with the suspend command, the reception apparatus 12 suspends the currently executing data broadcast application having the application ID "1."

Furthermore, because the "media_time" that is Td falls within the valid period ranging from T2s to T2e, the reception apparatus 12 specifies the execute command corresponding to the id attribute in the command element "2" based on the TPT. In accordance with the execute command, the reception apparatus 12 acquires and executes the data broadcast application having the application ID "2."

Thereafter, when "media_time" included in the extracted trigger information falls within a valid period (not shown in FIG. 11), the reception apparatus 12 controls the operation of the data broadcast application in accordance with the command being valid.

As explained above, upon extracting the trigger information coming from the broadcast apparatus 11, the reception apparatus 12 specifies the command corresponding to "media_time" included in the extracted trigger information on the basis of the TPT. In accordance with the specified command, the reception apparatus 12 controls the operation of the data broadcast application.

[State Transition of the Data Broadcast Application]

FIG. 12 is a state transition diagram of a data broadcast application run by the reception apparatus 12 in accordance with the register, execute, event, suspend, and terminate commands. As shown in FIG. 12, the data broadcast application is defined to be in one of four states: released state (Released), ready state (Ready), active state (Active), and suspended state (Suspended).

The released state is a state in which the data broadcast application has yet to be acquired by the reception apparatus 12. The ready state is a state in which the data broadcast application is registered, but not executed, by the reception apparatus 12. The active state is a state in which the data broadcast application has been executed and is currently active. The suspended state is a state in which the execution of the data broadcast application is suspended and the information indicative of the status in effect at the time of the suspension is retained in the save memory 65B.

If the register command is received while the data broadcast application is the released state (i.e., when the application has yet to be acquired by the reception apparatus 12), the data broadcast application is acquired (registered) in accordance with the register command. At this point, the data broadcast application transitions into the ready state.

If the execute command is received while the data broadcast application is in the ready state, the data broadcast application is executed in accordance with the execute command. At this point, the data broadcast application transitions into the active state.

If the execute command is received while the data broadcast application is in the released state (i.e., when the application has yet to be acquired by the reception apparatus 12), the data broadcast application is acquired and executed in accordance with the execute command. At this point, the data broadcast application transitions into the active state.

If the suspend command is received while the data broadcast application is in the active state, the currently executing data broadcast application is suspended. At this point, the data broadcast application transitions into the suspended state.

If the execute command is received while the data broadcast application is in the suspended state, the suspended data broadcast application is restarted in accordance with the execute command. At this point, the data broadcast application transitions into the active state.

If the terminate command is received while the data broadcast application is in the active state or in the suspended state, the currently executing data broadcast application is terminated in accordance with the terminate command. At this point, the data broadcast application transitions into the ready state (as indicated by reference character A in FIG. 12). Besides being effected by the terminate command, the transition into the ready state occurs when another data broadcast application is executed.

If the application valid period of the command expires while the data broadcast application is in the ready state, active state or suspended state, the data broadcast application transitions into the released state (as indicated by reference character B in FIG. 12).

[Operation Scenarios]

Figure 13:
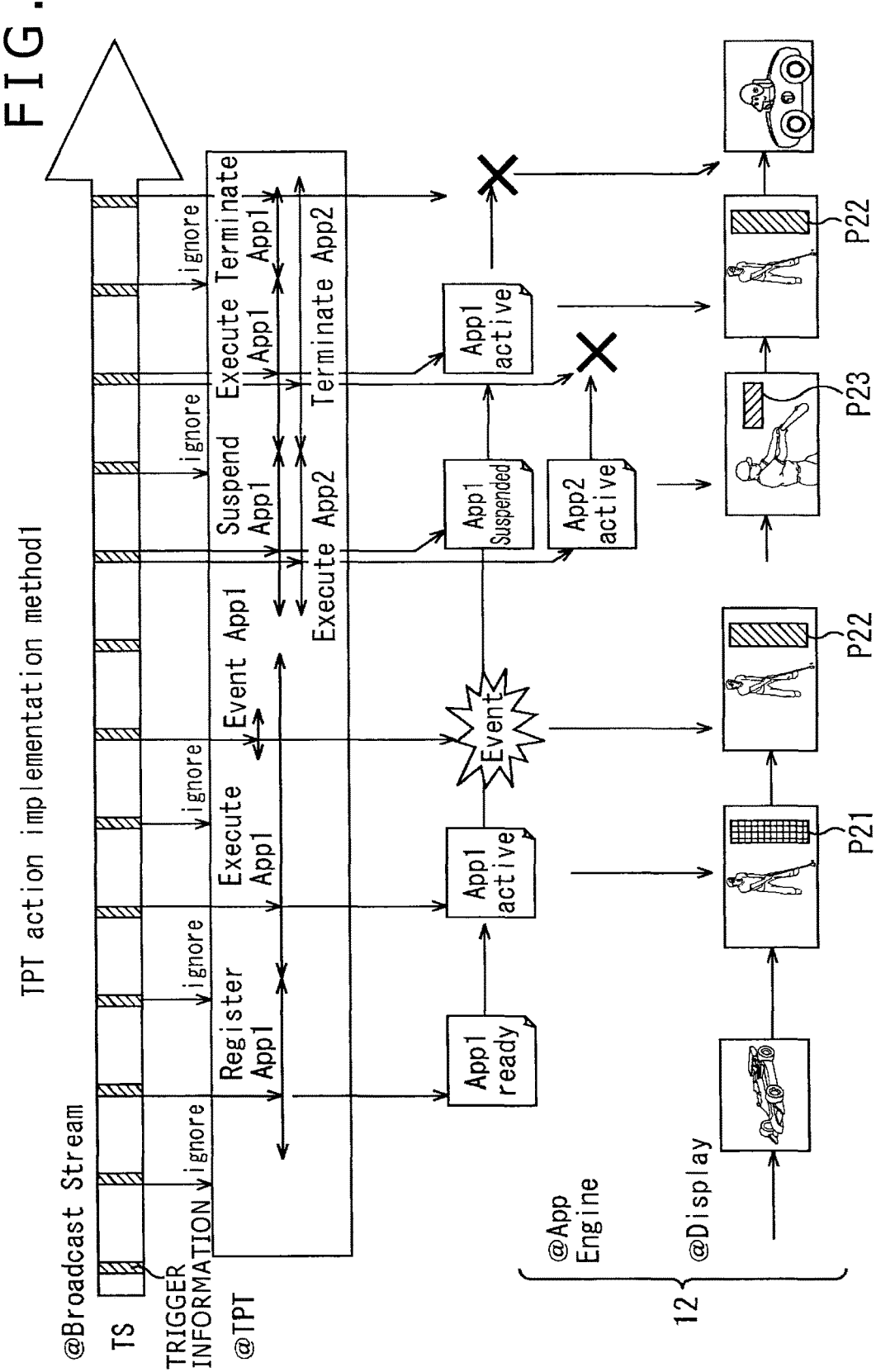
FIG. 13 is a view showing an operation scenario according to method 1.
Figure 14:
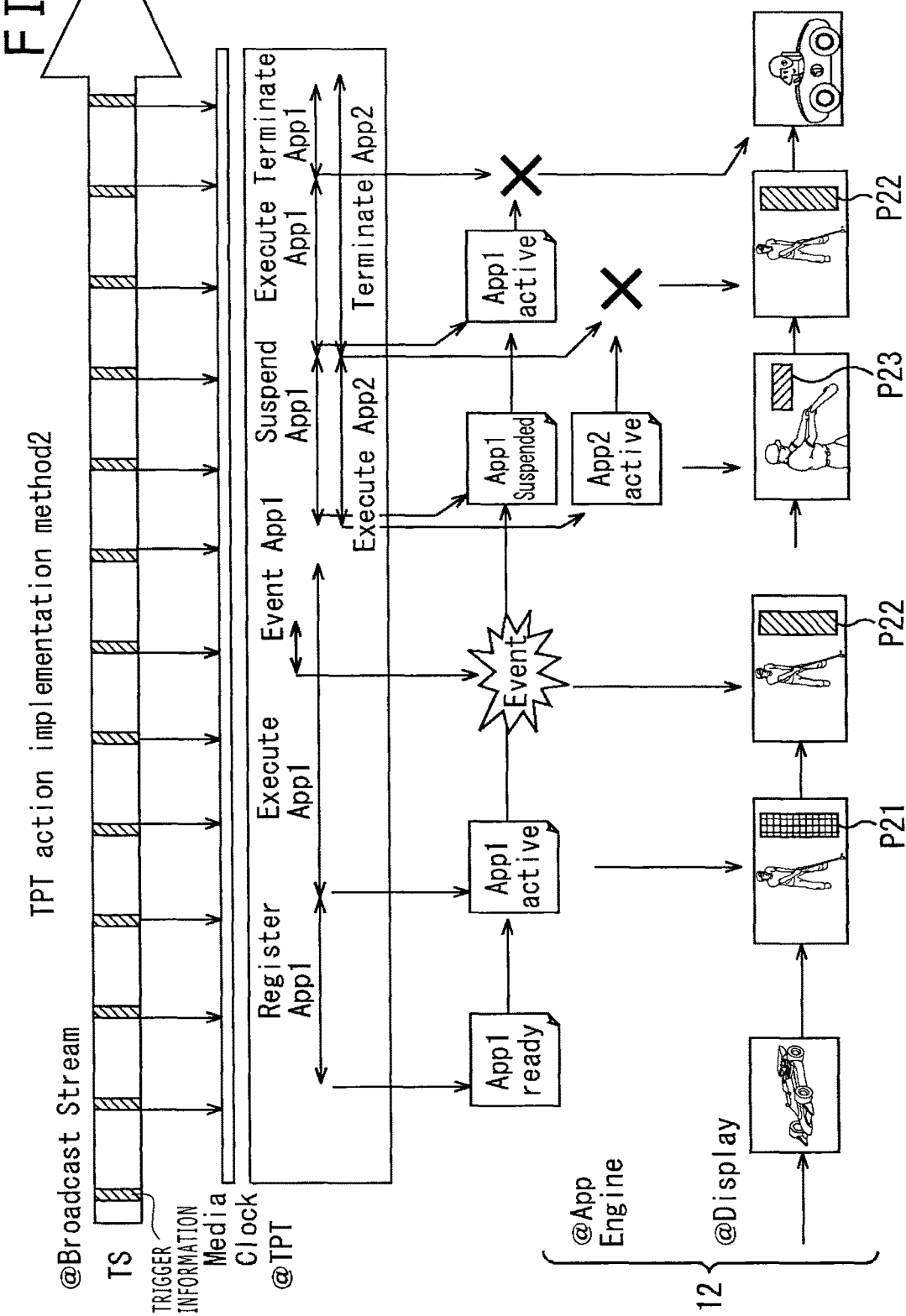
FIG. 14 is a view showing an operation scenario according to method 2.

By specifying the command corresponding to "media_time" included in the trigger information based on the TPT and by executing the specified command as discussed above, the reception apparatus 12 can operate the data broadcast application in a manner shown in FIG. 13 or 14, for example.

FIG. 13 shows an operation scenario according to method 1.

According to method 1, when the time indicated by "media_time" included in trigger information falls within the valid period defined by the start_time attribute and end_time attribute in the command element of the TPT, the valid command is specified, and the data broadcast application is operated accordingly.

Referring to FIG. 13, the reception apparatus 12 continuously extracts trigger information while displaying on a display device the TV program corresponding to the broadcast signal coming from the broadcast apparatus 11. When either or both of "domain_name" and "program_id" included in the trigger information are changed, the reception apparatus 12 queries the TPT server 13 about the TPT. The reception apparatus 12 can then acquire the TPT from the TPT server 13 and retain it.

Thereafter, the reception apparatus 12 continuously extracts trigger information. Whenever trigger information is extracted, the command corresponding to the media_time included in the extracted trigger information is specified on the basis of the TPT. The reception apparatus 12 does not always react to all the trigger information extracted. If the time indicated by media_time falls outside the valid period, the reception apparatus 12 ignores the trigger information in question (as indicated by "ignore" in FIG. 13).

For example, while retaining the TPT (for program B) shown in FIG. 11, the reception apparatus 12 may receive the trigger information containing "xbc.com/20?mt=Tb" and Tb may fall within the valid period ranging from T1s to T1e. In that case, the reception apparatus 12 specifies the register command destined for a data broadcast application App1 having the application ID "1." In accordance with the register command, the reception apparatus 12 acquires the data broadcast application App1 from the application server 14 and registers the acquired application. At this point, the data broadcast application App1 transitions into the ready state.

Thereafter, the reception apparatus 12 continuously extracts trigger information as well. If the trigger information containing "xbc.com/20?mt=Tc" is received and if Tc falls within the valid period ranging from T3s to T3e, the reception apparatus 12 specifies the execute command destined for the data broadcast application App1. In accordance with the execute command, the reception apparatus 12 executes the data broadcast application App1. At this point, the data broadcast application App1 transitions into the active state. As a result, the display device displays the image of the TV program superposed with a picture P21 of the data broadcast application App1.

The reception apparatus 12 also extracts trigger information continuously. If the trigger information containing "xbc.com/20?mt=Te" is received and if Te falls within the valid period ranging from T4s to T4e, the reception apparatus 12 specifies the event command destined for the data broadcast application App1. In accordance with the event command, the reception apparatus 12 injects an event into the currently executing data broadcast application App1. This operation initiates a predetermined process such as reading updated data and getting it reflected on the display. The display device then substitutes a picture P22 for the picture P21 of the data broadcast application App1 superposed on the image of the TV program.

The reception apparatus 12 further extracts trigger information continuously. If the trigger information containing "xbc.com/20?mt=Td" is received and if Td falls within the valid period ranging from T5s to T5e as well as from T2s to T2e, the reception apparatus 12 specifies both the suspend command destined for the data broadcast application App1 and the execute command for a data broadcast application App2 having the application ID "2." In accordance with the suspend command, the reception apparatus 12 suspends the data broadcast application App1. And in keeping with the execute command, the reception apparatus 12 executes the data broadcast application App2. At this point, the data broadcast application App1 transitions into the suspended state and the data broadcast application App2 into the active state.

Then if the reception apparatus 12 receives trigger information containing "xbc.com/20?mt=Tf and if Tf falls within the valid period ranging from T3s to T3e as well as from T7s to T7e, the reception apparatus 12 specifies both the execute command for the data broadcast application App1 and the terminate command for the data broadcast application App2. In accordance with the execute command, the reception apparatus 12 restarts the data broadcast application App1 from its suspended state. And in keeping with the terminate command, the reception apparatus 12 terminates the currently executing data broadcast application App2. At this point, the data broadcast application App1 transitions into the active state and the data broadcast application App2 into the ready state.

Suppose, for example, that a CM is inserted following the suspension of the ongoing TV program which is then restarted at the end of the CM. In such a case, the data broadcast application App1 may be regarded as the application for the TV program and the data broadcast application App2 as the application for the CM. That is, when the TV program is suspended, the data broadcast application App1 transitions into the suspended state. When the CM is started, the data broadcast application App2 is executed and transitions into the active state. When the CM is terminated, the data broadcast application App2 is terminated and transitions into the ready state. When the TV program is restarted, the data broadcast application App1 is restarted and transitions into the active state.

In that case, on the display screen, at the same time that the TV program is switched to the CM, the picture P22 of the data broadcast application App1 shown superposed on the image of the TV program is switched to a picture P23 of the data broadcast application App2 superposed on the image of the CM. When the CM is switched to the TV program, the picture P23 of the data broadcast application App shown superposed on the image of the CM is switched to the picture P22 of the data broadcast application App1 superposed on the image of the TV program on the display screen.

Thereafter, if the reception apparatus 12 receives trigger information containing "xbc.com/20?mt=Tg" and if Tg falls within the valid period ranging from T6s to T6e, the reception apparatus 12 specifies the terminate command for the data broadcast application App1. In accordance with the terminate command, the reception apparatus 12 terminates the data broadcast application App1. At this point, the data broadcast application App1 transitions into the ready state. Consequently, if one TV program is terminated and another TV program is started, for example, the picture P22 of the data broadcast application App1 shown superposed on the image of the terminated TV program is also terminated.

As described above, when the reception apparatus 12 retains the TPT in accordance with "domain_name" and "program_id" included in the trigger information from the broadcast apparatus 11 and when the time indicated by "media_time" included in the trigger information falls within a valid period, the reception apparatus 12 can specify the valid command. This makes it possible to implement the operation scenario shown in FIG. 13.

According to method 1, the command is specified at the time the trigger information is extracted. Thus the command can only be executed at the trigger information extraction timing. It follows that the longer the interval at which trigger information is extracted, the less likely it is the command will be executed at appropriate timings. For this reason, method 2 aims at causing the reception apparatus 12 to count the time indicative of the progress of AV content based on "media_time" included in the trigger information so that the command may be specified while the internally counted time falls within a valid period.

In the ensuing description, the internal clock capability of the reception apparatus 12 to count the time indicative of the progress of AV content will be called the media clock. That is, the reception apparatus 12 generates the medial clock using "media_time" included in the trigger information as reference information.

FIG. 14 shows an operation scenario according to method 2.

According to method 2, when the time indicated by the media clock and counted on the basis of "media_time" included in trigger information falls within the valid period of a command, that valid command is specified. This permits the data broadcast application to be operated.

Referring to FIG. 14, the reception apparatus 12 continuously extracts trigger information as with method 1. When either or both of "domain_name" and "program_id" are changed, the reception apparatus 12 queries the TPT server about a TPT. In this manner, the reception apparatus 12 can acquire the TPT from the TPT server 13 and retain the acquired TPT. Also, the reception apparatus 12 generates the media clock using "media_time" included in the extracted trigger information as reference information. That is, by retaining the media clock, the reception apparatus 12 can recognize the time indicative of the progress of TV programs and CM's independent of the time indicated by "media_time" included in the trigger information.

For example, if the reception apparatus 12 retains the TPT (for program B) shown in FIG. 11 and if the time indicated by the media clock is T1$s$, the reception apparatus 12 specifies the register command for the data broadcast application App1 corresponding to the valid period ranging from T1$s$ to T1$e$. In accordance with the register command, the reception apparatus 12 acquires the data broadcast application App1 from the application server 14 and registers the acquired application.

Next, when the time indicated by the media clock is T3$s$, the reception apparatus 12 specifies the execute command for the data broadcast application App1 corresponding to the valid period ranging from T3$s$ to T3$e$. In accordance with the execute command, the reception apparatus 12 executes the data broadcast application App1. As a result, on the display screen, the image of the TV program is shown superposed with the picture P21 of the data broadcast application App1.

Next, when the time indicated by the media clock is T4$s$, the reception apparatus 12 specifies the event command for the data broadcast application App1 corresponding to the valid period ranging from T4$s$ to T4$e$. In accordance with the event command, the reception apparatus 12 injects an event into the currently executing data broadcast application App1. Consequently, on the display screen, the picture P21 of the data broadcast application App1 shown superposed on the image of the TV program is switched to the picture P22.

Next, when the time indicated by the media clock is T2$s$, the reception apparatus 12 specifies the execute command for the data broadcast application App2 corresponding to the valid period ranging from T2$s$ to T2$e$. Also, when the time indicated by the media clock is T5$s$, the reception apparatus 12 specifies the suspend command for the data broadcast application App1 corresponding to the valid period ranging from T5$s$ to T5$e$. As shown in FIG. 14, T2$s$ and T5$s$ are approximately the same point in time.

Then in accordance with the execute command, the reception apparatus 12 executes the data broadcast application App2. And in keeping with the suspend command, the reception apparatus 12 suspends the data broadcast application App1.

Next, when the time indicated by the media clock is T7$s$, the reception apparatus 12 specifies the terminate command for the data broadcast application App2 corresponding to the valid period ranging from T7$s$ to T7$e$. When the time indicated by the media clock is T3$s$, the reception apparatus 12 specifies the execute command for the data broadcast application App1 corresponding to the valid period ranging from T3$s$ to T3$e$. As shown in FIG. 14, T3$s$ and T7$s$ are approximately the same point in time.

Then in accordance with the terminate command, the reception apparatus 12 terminates the data broadcast application App2. And in keeping with the execute command, the reception apparatus 12 restarts the data broadcast application App1.

Suppose, for example, that the data broadcast application App1 is regarded as the application for the TV program and the data broadcast application App2 as the application for the CM as with method 1. In that case, on the display screen, at the same time that the TV program is switched to the CM, the picture P22 of the data broadcast application App1 shown superposed on the image of the TV program is switched to the picture P23 of the data broadcast application App2 superposed on the image of the CM. And when the CM is switched to the TV program, the picture P23 of the data broadcast application App2 shown superposed on the image of the CM is switched to the picture P22 of the data broadcast application App1 superposed on the image of the TV program on the display screen.

Next, when the time indicated by the medial clock is T6$s$, the reception apparatus 12 specifies the terminate command for the data broadcast application App1 corresponding to the valid period ranging from T6$s$ to T6$e$. In accordance with the terminate command, the reception apparatus 12 terminates the data broadcast application App1. For example, if one TV program is terminated and switched to another TV program, the picture of the data broadcast application App1 shown superposed on the display screen is also terminated upon termination of the TV program.

As described above, where the reception apparatus 12 retains the TPT in accordance with "domain_name" and "program_id" included in the trigger information from the broadcast apparatus 11 and where the time indicated by the media clock counted on the basis of "media_time" included in the trigger information falls within a valid period, the reception apparatus 12 can specify the valid command. This makes it possible to implement the operation scenario shown in FIG. 14.

According to method 2, it is determined whether the time indicated by the media clock counted inside the reception apparatus 12 falls within the valid period. As a result, the target command can be specified the moment the start time (i.e., the value of the start_time attribute) of the valid period is reached. This makes it possible to execute the command at the most appropriate timing during the valid period designated by the TPT.

The example of FIG. 14 was shown to be one in which the valid command is specified by determining whether the time indicated by the media clock falls within the valid period defined by the valid start time (value of the start_time attribute) and the valid end time (value of the end_time attribute). Alternatively, the valid command may be specified by determining whether the time indicated by the media clock has run past the valid start time (value of the start_time attribute). For example, in the TPT (for program B) shown in FIG. 11, the commands may be associated only with valid start times such as T1$s$, T2$s$, T3$s$, T4$s$, T5$s$, T6$s$, T7$s$, etc. When the time indicated by the media clock has run past, say, T3$s$, the execute command for the data broadcast application App1 corresponding to the valid time T3$s$ can be specified. In this manner, when the time indicated by the media clock satisfies a predetermined condition in reference to the command valid time, the reception apparatus 12 can control the operation of the data broadcast application in accordance with the valid command.

Comparing method 1 with method 2 reveals that method 2 allows commands to be executed at more appropriate timings than the other method, as discussed above. However, since method 2 requires the reception apparatus 12 to perform various operations regarding the media clock, method 2 burdens the reception apparatus 12 more than method 1. Thus either of the two methods should preferably be selected depending on such conditions as the priority of command execution timings and the throughput of the reception apparatus 12. Irrespective of the method having been selected, the manner in which trigger information is received by the reception apparatus 12 is not affected. Thus from the standpoint of broadcast business operators offering the broadcast apparatus 11, it does not matter whether method 1 or method 2 has been selected by the reception apparatus 12.

SPECIFIC OPERATION EXAMPLES

Explained below in reference to FIG. 15 to FIG. 23 are operation examples that can be implemented by operating the reception apparatus 12 with typical values designated in the attributes of the tpt element in the TPT of FIG. 9.

FIG. 15 is views explanatory of the type attribute in the tpt element.

FIG. 15A shows the timing for updating the TPT where "static" is designated in the type attribute. For example, if the reception apparatus 12 retains a TPT1 corresponding to the trigger information extracted from the TS of a given TV program, the TPT1 describes all the information for controlling the operation of the data application program to be executed during the TV program in question.

For that reason, as long as "program_id" assigned to the TV program remains unchanged, there is no need to update the TPT1. If "program_id" is changed, the TPT corresponding to the new "program_id" is acquired as the updated TPT. Thus where "static" is designated in the type attribute, with "program_id" kept unchanged, the TPT is retained statically.

FIG. 15B shows the timing for updating the TPT where "dynamic" is designated in the type attribute. For example, if the reception apparatus 12 retains a TPT1a corresponding to the trigger information extracted from the TS of a given TV program, the TPT1a describes part of the information for controlling the operation of the data application program to be executed during the TV program in question.

For that reason, after acquiring and retaining the TPT1a, the reception apparatus 12 acquires from the TPT server 13 a TPT1b corresponding to the updating duration indicated by the updating_time attribute of the tpt element in the TPT1a and retains the TPT1b thus acquired. In this manner, even if "program_id" assigned to the TV program remains unchanged, the TPT is acquired and updated. In the example of FIG. 15, the value "1" in the notations TPT1a and TPT1b indicates "program_id" and the alphabetic character "a" or "b" indicates the version. That is, the TPT1a and TPT1b are TPT's of different versions having the same "program_id." The version is designated by the version attribute in the tpt element.

The TPT1a and TPT1b which are TPT's of different versions describe part of all the information for controlling the operation of the data broadcast application to be executed during a given TV program in keeping with the progress of the latter. Moreover, the descriptions of the TPT1a and TPT1b may be given in a manner partially overlapping with one another. For example, if the description in the TPT of FIG. 10 contains all the information for controlling the operation of the data broadcast application to be executed during a given TV program, then the TPT1a may give a description of the command element of which the id attribute is designated to range from 1 to 4 and the TPT1b may provide a description of the command element of which the id attribute is designated to range from 4 to 12. In this case, the command element of which the id attribute is designated to be 4 is described in both the TPT1a and TPT1b.

As explained above, where "dynamic" is designated in the type attribute, the TPT corresponding to the new version is acquired as the updated TPT even if "program_id" assigned to the TV program remains unchanged. That is, the TPT is retained dynamically regardless of the change in "program_id."

Conceivably, there may be a situation in which "dynamic" is designated in the type attribute where one "program_id" is assigned per channel, i.e., a situation in which each channel can be recognized individually but the TV programs broadcast on each channel cannot be distinguished one from the other.

What follows are explanations of specific operation examples in which "static" or "dynamic" is designated in the type attribute.

Figure 16:
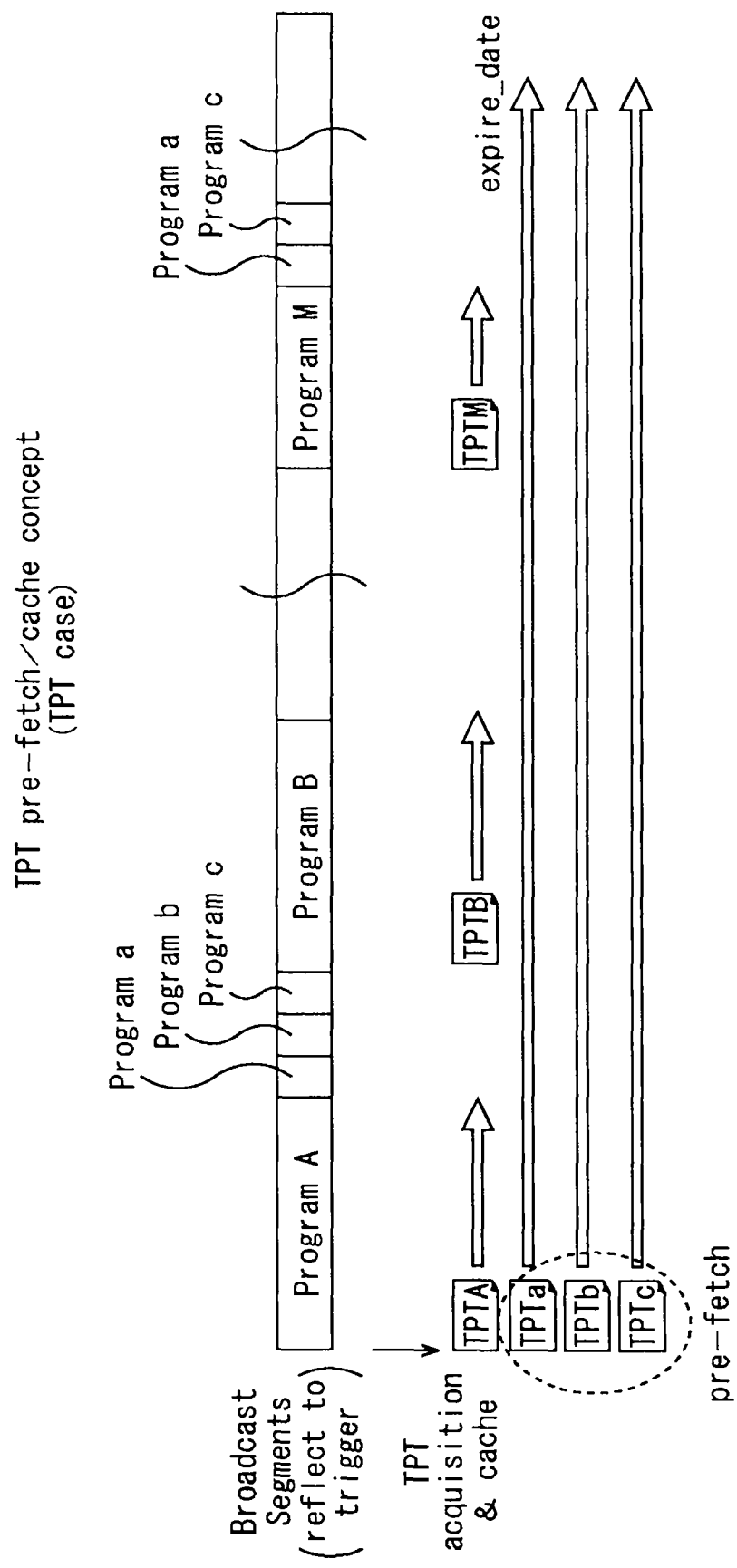
FIG. 16 is a view explanatory of an operation example in which "static" is designated as the type attribute.

FIG. 16 shows an operation example in which "static" is designated in the type attribute.

In the operation example of FIG. 16, where the broadcast business operator has finalized the time schedule of the TV programs and CM's to be broadcast as well as the TPT's required in conjunction therewith, the reception apparatus 12 is arranged to acquire the necessary TPT's collectively from the TPT server 13.

For example, as shown in FIG. 16, suppose that CM's composed of Program a, Program b, and Program c are inserted between Program A and Program B that are TV programs. Since CM's are usually broadcast in as short as 15 or 30 seconds each, if a TPT is acquired after the broadcast of a CM has started for example, it may not be possible to execute the data broadcast application in time. Thus upon acquiring TPTA for the TV program "Program A," the reception apparatus 12 obtains TPTa for the CM "Program a," TPTb for the CM "Program b" and TPTc for the CM "Program c" altogether, and retains these TPT's.

With the TPT's thus acquired, when the TV program "Program A" is switched to the CM "Program a," the reception apparatus 12 can specify the command corresponding to "media_time" included in the extracted trigger information based on TPTa retained beforehand. In accordance with the specified command, the reception apparatus 12 can proceed to control the operation of the data broadcast application.

CM's are typically broadcast repeatedly for a predetermined time period (e.g., one month). The time period may be designated in the expire_date attribute of the tpt element in TPTa, TPTb and TPTc. The reception apparatus 12 then retains TPTa, TPTb and TPTc only during the designated period. Consequently, if, say, the CM's "Program a" and "Program c" are inserted into a TV program "Program M," the reception apparatus 12 can specify the command corresponding to "media_time" included in the extracted trigger information based on the retained TPTa and TPTc provided the time period designated by the expire_date attribute remains valid.

The operation example of FIG. 16 is practicable regardless of which of the above-mentioned methods 1 and 2 has been adopted. However, in the operation example of FIG. 16, the switchover of TV programs and CM's can be recognized only at the time trigger information is extracted. For that reason, it may not be possible precisely to control the operation of the data broadcast application in a TV program immediately after the switchover. What follows is an explanation of an operation example in which, with method 2 assumed to be adopted, the operation of the data broadcast application is controlled more precisely upon switching of TV programs or CM's.

Figure 17:
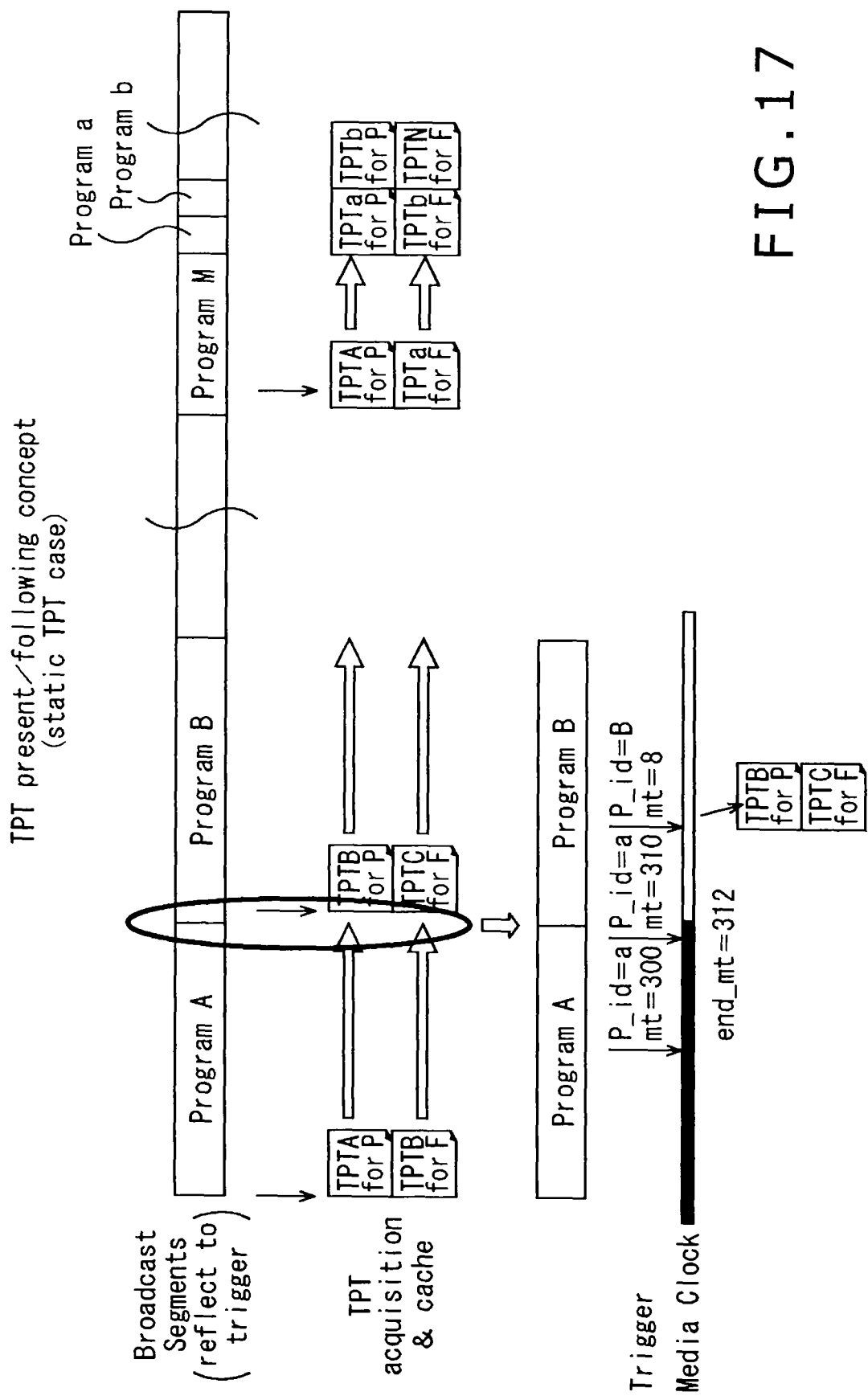
FIG. 17 is a view explanatory of another operation example in which "static" is designated as the type attribute.

FIG. 17 shows an operation example in which "static" is designated in the type attribute.

In the operation example of FIG. 17, where the broadcast business operator has finalized the time schedule of the TV programs and CM's to be broadcast as well as the TPT's required in conjunction therewith, the reception apparatus 12 is arranged to acquire a pair of TPT's, one for a given TV program and the other for the following TV program.

For example, as shown in the upper part of FIG. 17, suppose that the TV program "Program A" when broadcast is followed by the TV program "Program B" which in turn is followed by the TV program "Program C." In this case, upon acquiring TPTA for the TV program "Program A," the reception apparatus 12 also obtains TPTB for the following TV program "Program B" to be broadcast next.

The reception apparatus 12 retains TPTA for the present TV program and TPTB for the following TV program. These TPT's are distinguished one from the other by the present_following attribute in the tpt element. That is, "present" is designated as the present_following attribute in TPTA (TPTA for P the figure), and "following" is designated as the present_following attribute in TPTB (TPTB for F in the figure).

Also, upon receipt of the TV program "Program B," the reception apparatus 12 acquires and retains TPTC for the following TV program "Program C" to be broadcast next. At this point, "present" is designated as the present_following attribute in TPTB (TPTB for P in the figure), and "following" is designated as the present_following attribute in TPTC (TPTC for F in the figure).

The lower part of FIG. 17 shows detailed processing carried out when the TV program "Program A" is switched to the TV program "Program B."

In this example, from the TS of the TV program "Program A" immediately before the switchover, first trigger information (program_id=a, media_time=300 seconds) and second trigger information (program_id=a, media_time=310 seconds) are extracted successively as the trigger information. From the TS of the TV program "Program B" immediately after the switchover, third trigger information (program_id=b, media_time=8 seconds) is extracted as the trigger information. Since the TV programs "Program A" and "Program B" are provided by the same broadcast business operator, they have the same domain name and thus their descriptions are omitted.

As mentioned above, the reception apparatus 12 retains TPTA (TPTA for P in the figure) paired with TPTB (TPTB for F in the figure). The end_mt attribute of the tpt element in TPTA has 312 seconds designated therein, so that the TV program "Program A" is terminated in "media_time" of 312 seconds.

The reception apparatus 12 operates according to the above-mentioned method 2, counting the media clock for the TV program "Program A" on the basis of "media_time" included in the trigger information. Thus the reception apparatus 12 can recognize that the TV program "Program A" is to be terminated when the time indicated by the media clock for the TV program "Program A" has run past 312 seconds designated in the end_mt attribute. At this point, the reception apparatus 12 switches from TPTA of the present TV program to TPTB. Also, the reception apparatus 12 starts counting the medial clock for the TV program "Program B" from zero second. With these arrangements in place, when the time indicated by the media clock for the TV program "Program B" falls within the valid period for a command in TPTB immediately after the TV program switchover, the reception apparatus 12 specifies that valid command.

That is, if the present_following attribute and end_mt attribute are not designated, upon switchover from the TV program "Program A" to the TV program "Program B," the media clock for the TV program "Program A" is counted continuously until the third trigger information is extracted. During that time, the operation of the data broadcast application for the TV program "Program B" cannot be controlled. For example, in the case of FIG. 17, the media clock for the TV program "Program B" cannot be counted for the time period of eight seconds indicated by "media_time" included in the third trigger information following the switchover to the TV program "Program B." In order to avoid that eventuality, the typical processing shown in the lower part of FIG. 17 involves designating the end_mt attribute so that the counting of the media clock for the TV program may be started immediately after the TV program switchover. This makes it possible precisely to control the operation of the data broadcast application.

Whereas the explanation of the processing in the lower part of FIG. 17 was about the TV program switchover, the same applies to the switchover between a TV program and a CM. The upper part of FIG. 17 shows typical processing involving the switchover from the TV program "Program M" to the CM "Program a," followed by the switchover from the CM "Program a" to the CM "Program b." In this case, too, the present_following attribute and end_mt attribute are designated so that the counting of the media clock for the CM may be started immediately after the switchover to the CM, whereby the operation of the data broadcast application for the CM can be controlled precisely.

Figure 18:
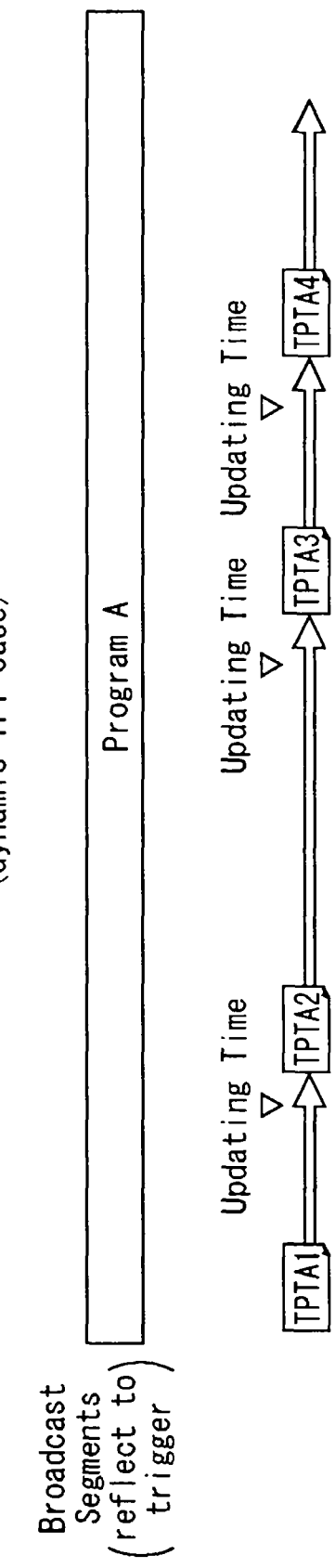
FIG. 18 is a view explanatory of an operation example in which "dynamic" is designated as the type attribute.

FIG. 18 shows an operation example in which "dynamic" is designated in the type attribute.

In the operation example of FIG. 18, with one "program_id" assigned to each channel, TPT's are updated by designating the updating_time attribute in the tpt element.

During a live broadcast program or the like, it is impossible to predict the data broadcast application to be operated next. In such a case, the broadcast business operator may be expected to get the reception apparatus 12 to acquire a TPT with its description ranging from a given point in time to one minute later and then another TPT with its description extending up to one minute later and so on, for example.

As shown in FIG. 18, when a live broadcast program "Program A" is selected, the reception apparatus 12 acquires TPTA1 from the TPT server 13 and retains it. In TPTA1, the updating_time attribute of the tpt element is designated. In accordance with the time indicated by the updating_time attribute, the reception apparatus 12 acquires TPTA2 from the TPT server 13 and retains it. In this manner, even if "program_id" remains unchanged, the reception apparatus 12 acquires and updates TPT's in keeping with the updating duration designated by the updating_time attribute.

Likewise, the reception apparatus 12 acquires TPTA3 from the TPT3 server 13 and retains it in accordance with the time indicated by the updating_time attribute in TPTA2 that is retained. Furthermore, the reception apparatus 12 acquires TPTA4 from the TPT server 13 and retains it in accordance with the time indicated by "updating_attribute" in TPTA3 that is retained.

In this manner, even during the live program or the like where what will happen next is unpredictable, it is possible to run the operation whereby TPT's are updated as needed in keeping with the progress of the program.

In the example above, the alphabetic character A in the notations TPTA1, TPTA2, TPTA3 and TPTA4 represents "program_id" and the numbers 1, 2, 3 and 4 denote their versions. The TPT's are managed by the version in this manner. Thus if the reception apparatus 12 attempts but fails to acquire from the TPT server 13 the TPT of the next version in accordance with the time indicated by the updating_time attribute, for example, the reception apparatus 12 can attempt to obtain the next-version TPT at the time the next trigger information is extracted. Conceivably, one reason the TPT of the next version cannot be acquired may be that the TPT server 13 is not ready to offer the TPT in question.

Figure 19:
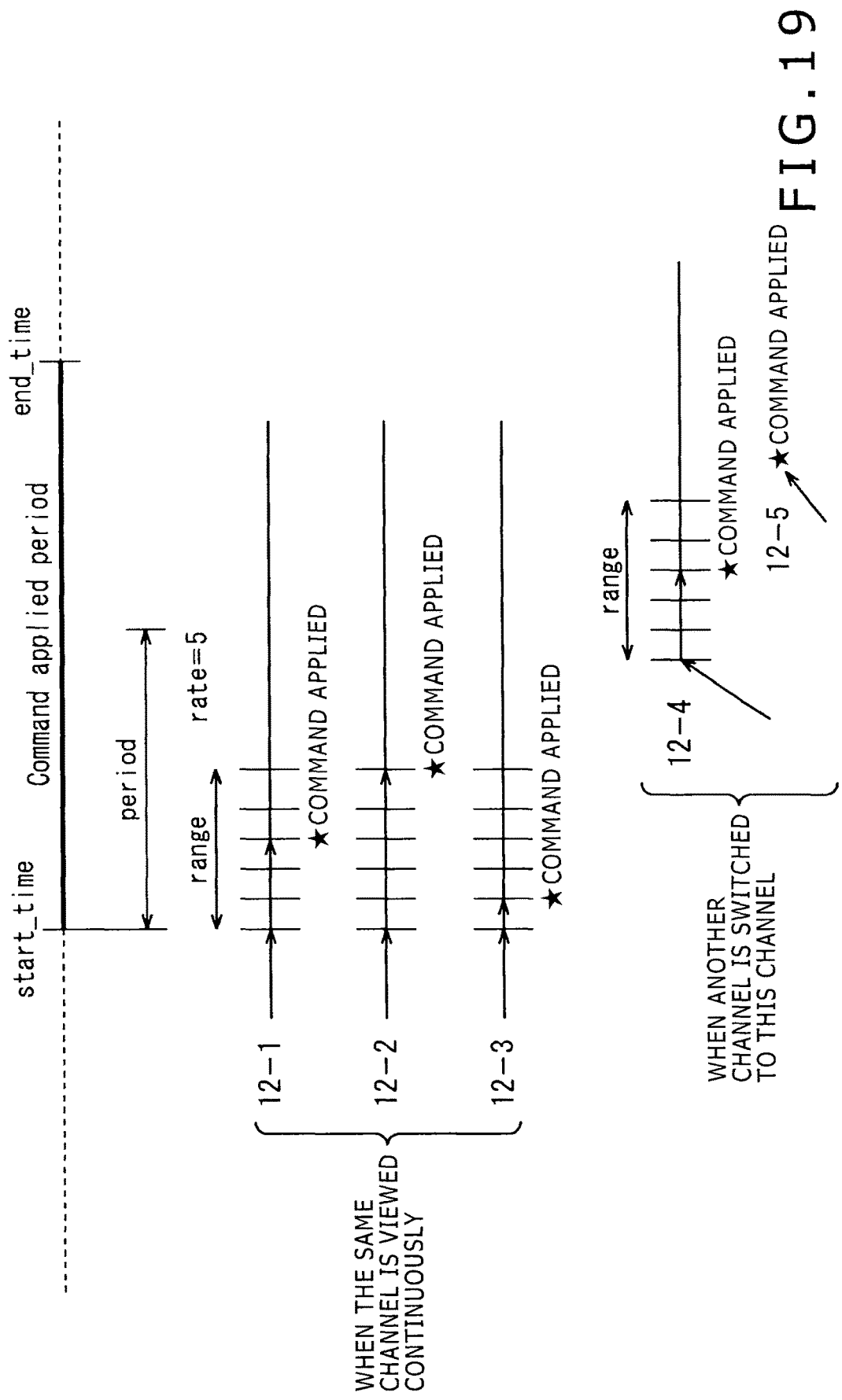
FIG. 19 is a view explanatory of an operation example involving applied command diffusion.

FIG. 19 shows an operation example involving applied command diffusion.

As discussed above, designating the diffusion element makes it possible to implement the diffusion of command application.

For example, it might happen that reception apparatuses 12-1 through 12-3 receiving the broadcast signal of the same TV program attempt to acquire the data broadcast application from the application server 14 in accordance with the register command or execute command. In such a case, the attempts to access the application server 14 at the same time may put an overload on the application server 14. That eventuality can be avoided by designating the rate attribute, range attribute, and period attribute of the diffusion element in such a manner as to diffuse over time the attempts by a plurality of reception apparatuses 12 to access the application server 14 for acquiring the data broadcast application from the latter.

For example, each of the reception apparatuses 12-1 through 12-3 may generate a random number N for calculating an expression "(N−1)×range/rate" that gives a time period by which to stagger the point in time at which to execute a command. This allows the reception apparatuses 12 involved to stagger the times at which to access the application server 14. The example of FIG. 19 is in effect when "rate=5." It is also possible for a reception apparatus 12-4 having switched from another TV program to this TV program to stagger the time for command execution in like manner. In the case of a reception apparatus 12-5 executing a command outside such an applied command diffusion period, the command is immediately executed with no delay in the command execution time.

Because the timings for the reception apparatuses 12 to access the application server 14 can be adjusted as explained above, it is possible to diffuse the attempts to access the application server 14, whereby the load on the server can be alleviated during the operation.

Explained below in reference to FIGS. 20 through 23 are some options of the unit in which "program_id" is handled in connection with the operation examples discussed above.

Figure 20:
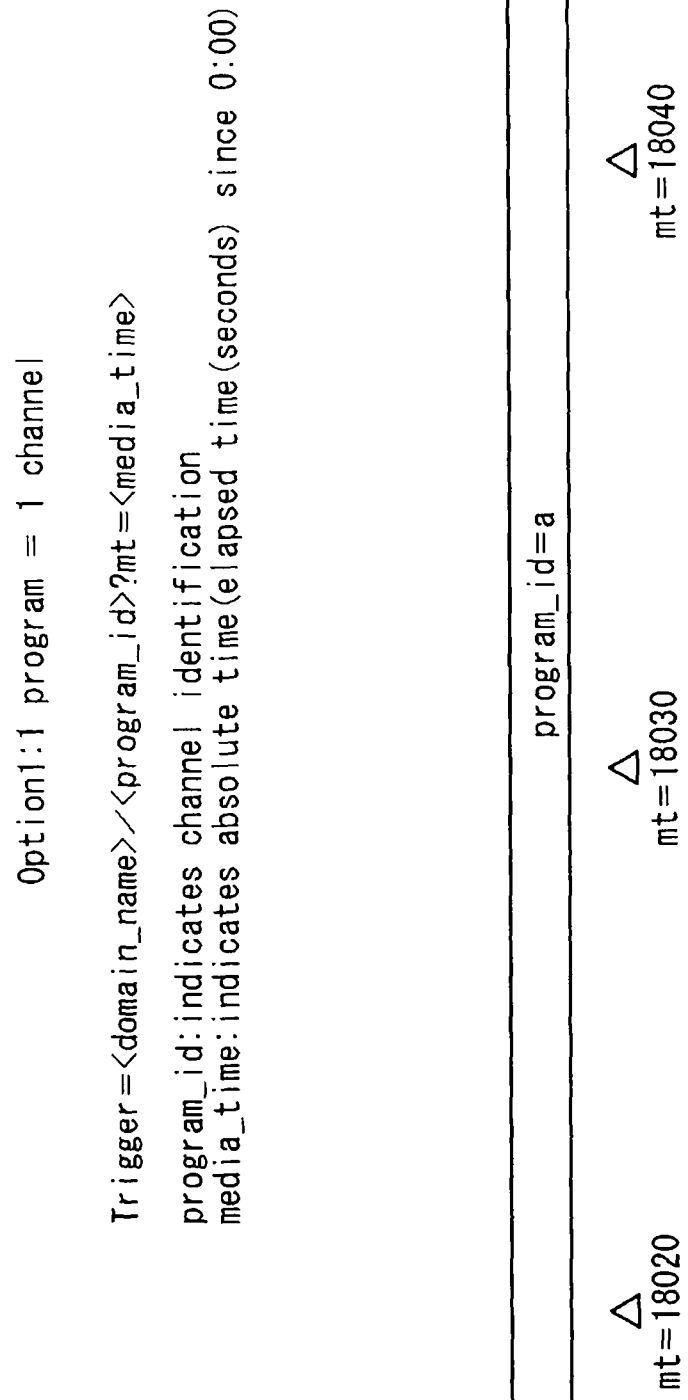
FIG. 20 is a view explanatory of an operation example in which option 1 is selected.

FIG. 20 shows an operation example in which option 1 is selected.

In option 1, one "program_id" is handled as one channel. In this case, the selected channel is given the same "program_id" so that, say, "media_time" is assigned a specific point in time such as midnight (0:00) as the point of reference. Thus the time position along the time axis of the progress of a given channel (program_id=a) is counted relative to the reference time (e.g., midnight), such as media_time=18020, 18030, 18040, etc.

If option 1 is selected, it is necessary to update the TPT even for the same "program_id." Thus "dynamic" is designated in the type attribute.

Figure 21:
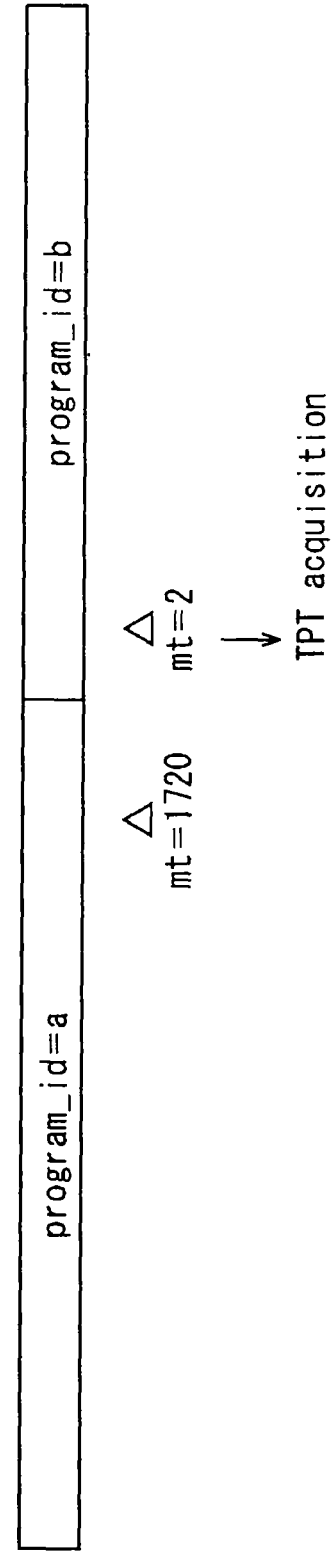
FIG. 21 is a view explanatory of an operation example in which option 2 is selected.

FIG. 21 shows an operation example in which option 2 is selected.

In option 2, one "program_id" is handled as one broadcast event. The broadcast event includes not only a TV program but also CM's or the like to be inserted halfway into the TV program. In this case, a different "program_id" is assigned to each broadcast event. It follows that the time position along the time axis of the progress of a first broadcast event (program_id=a) is counted relative to the start time of the event (e.g., media_time=1720). The time position along the time axis of the progress of a second broadcast event (program_id=b) is counted relative to the start time of the event (e.g., media_time=2).

If option 2 is selected, the TPT is updated whenever "program_id" is changed. Thus "static" is designated in the type attribute.

Figure 22:
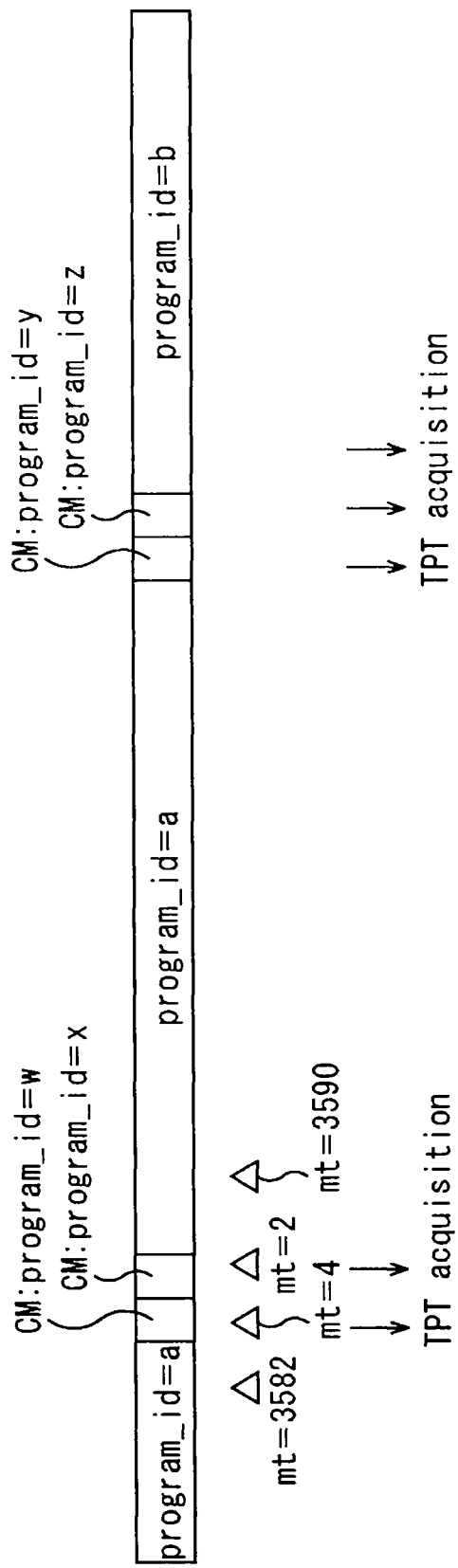
FIG. 22 is a view explanatory of an operation example in which option 3 is selected.

FIG. 22 shows an operation example in which option 3 is selected.

In option 3, one "program_id" is handled as one AV content. In this case, a TV program and CM's to be inserted halfway into that program, for example, are given a different "program_id" each. It follows that the time position along the time axis of the progress of a first TV program (program_id=a) is counted relative to the start time of the first TV program, such as media_time=3582 before the insertion of a CM and media_time=3590 after the insertion of the CM. Also, the time position along the time axis of the progress of a first CM (program_id=w) is counted relative to the start time of the first CM, such as media_time=4. The time position along the time axis of the progress of a second CM (program_id=x) is counted relative to the start time of the second CM, such as media_time=2.

In the example of FIG. 22, the restarted first TV program is followed by a third CM (program_id=y), a fourth CM (program_id=z), and the second TV program (program_id=b), in that order. The time positions of these TV programs and CM's are counted likewise based on "media_time."

If option 3 is selected, the TPT is updated whenever "program_id" is changed. Thus "static" is designated in the type attribute.

Figure 23:
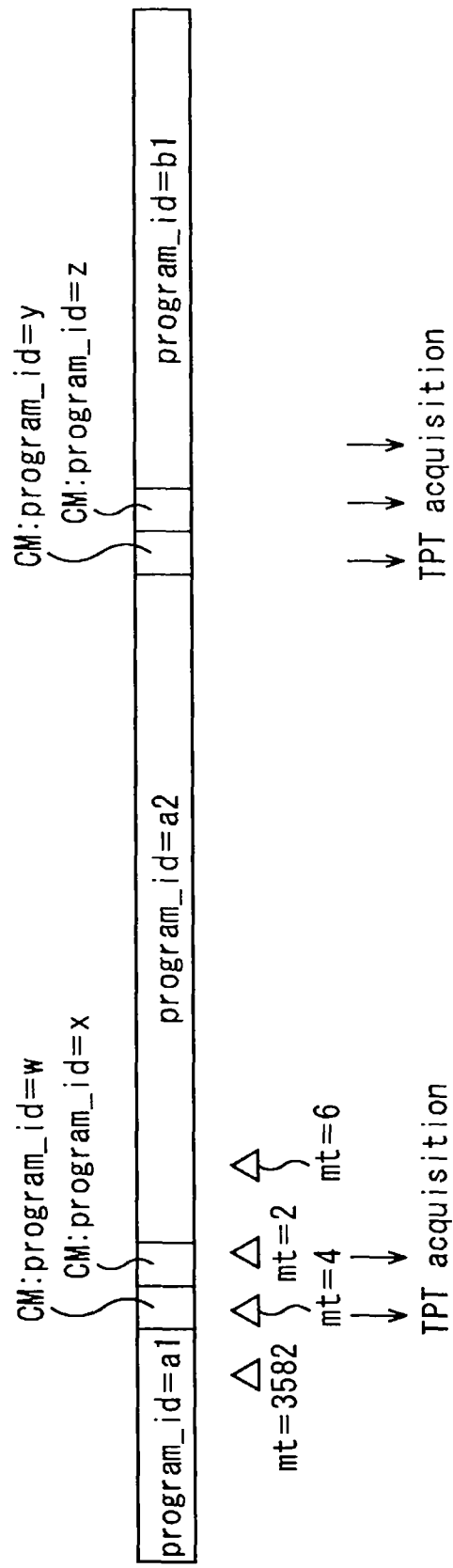
FIG. 23 is a view explanatory of an operation example in which option 4 is selected.

FIG. 23 shows an operation example in which option 4 is selected.

In option 4, one "program_id" is handled as one segment. In option 3 of FIG. 22, the inserted CM's were shown to have the same "program_id" each as long as the same TV program is maintained. In option 4, each "program_id" is handled as a segment, so that the TV program before the insertion of a CM and the TV program after the insertion of the CM are given a different "program_id" each.

Where one "program_id" corresponds to one segment, the value of "program_id" is designated in such a manner as to form a character string that combines "id" indicating a given TV program with "id" denoting the segment in that TV program. In the example FIG. 23, "program_id=a1" is designated for a first TV program before the insertion of a CM, and "program_id=a2" is designated for the first TV program after the insertion of the CM. In this case, the "id" representing the first TV program (e.g., "a") is common to the segments, and the "id" denoting the segment in the first TV program differs from one segment to another (e.g., "1" and "2").

In that case, the time position along the time axis of the progress of the first TV program before the insertion of the CM (program_id=a1) is counted relative to the start time of the first TV program, such as "media_time=3582." On the other hand, the time position along the time axis of the progress of the first TV program after the insertion of the CM (program_id=a2) is counted relative to the start time of the restarted first TV program i.e., relative to the start time of the segment, such as media_time=6.

If option 4 is selected, the TPT is updated whenever "program_id" is changed. Thus "static" is designated in the type attribute.

The preceding paragraph completes the explanation of some specific operation examples.

[Trigger Information Handling Process]

Explained below in reference to the flowcharts of FIGS. 24 through 27 is the trigger information handling process performed by the reception apparatus 12 upon receipt of trigger information.

(Trigger Information Handling Process According to Method 1)

Figure 24:
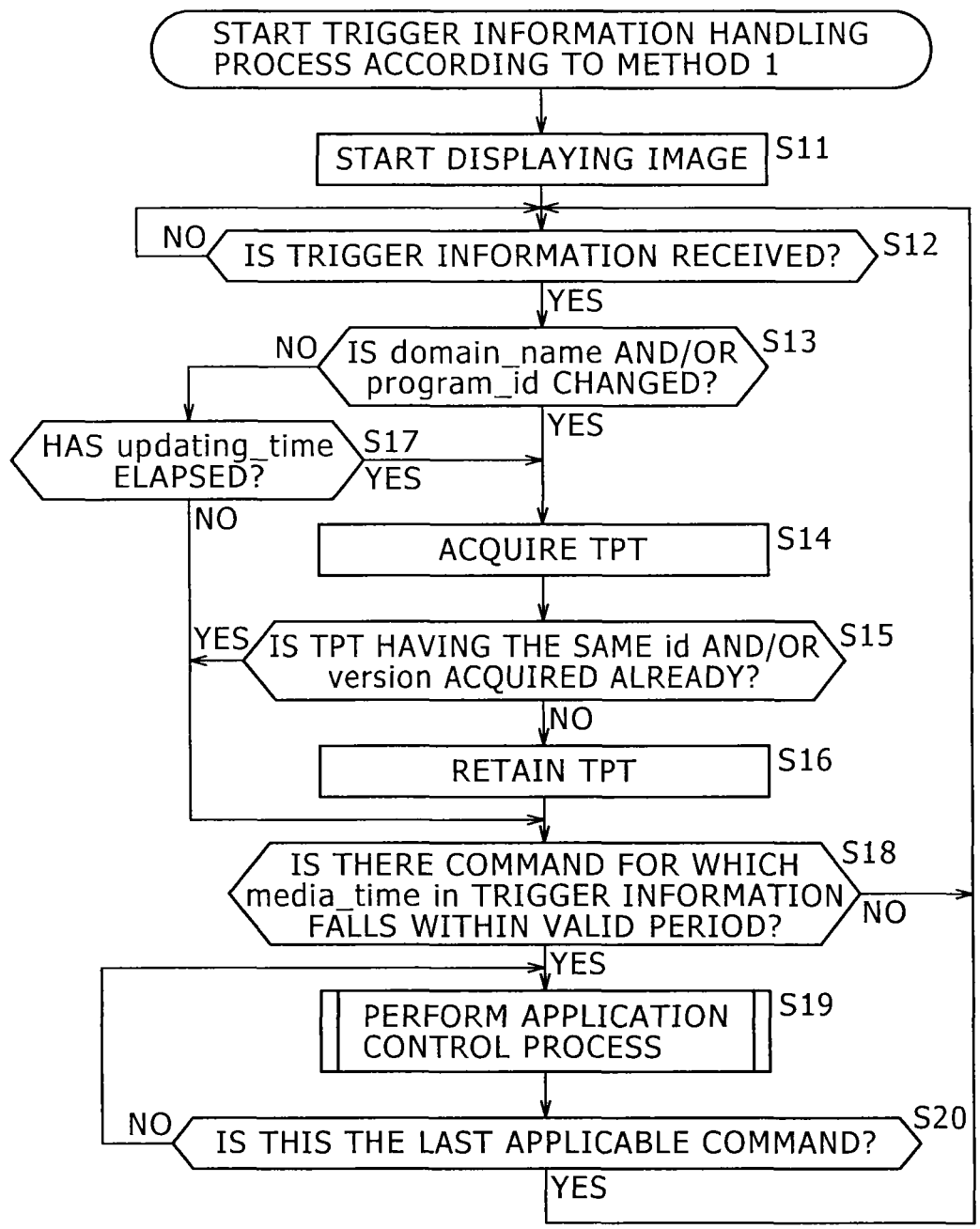
FIG. 24 is a flowchart explanatory of a trigger information handling process according to method 1.

The trigger information handling process according to method 1 is now explained in reference to the flowchart of FIG. 24. This trigger information handling process is carried out repeatedly while the user is viewing TV programs, i.e., while the reception apparatus 12 is receiving broadcast signals.

When a given channel is selected by the user's operations, the reception apparatus 12 start displaying the image of the TV program on the selected channel (step S11).

In step S12, the trigger extraction portion 57 waits to extract trigger information from the video signal coming from the video decoder 55. When the reception apparatus 12 receives the trigger information included in the broadcast signal and extracts the trigger information from the video signal, control is passed to step S13.

In step S13, the trigger extraction portion 57 analyzes the extracted trigger information to determine whether either or both of "domain_name" and "program_id" are changed. If it is determined in step S13 that either or both of "domain_name" and "program_id" are changed, control is passed to step S14.

In step S14, the trigger extraction portion 57 controls the communication interface 58 to request a TPT by accessing the TPT server 13 specified by the URL obtained by prefixing "http://" to the trigger information (e.g., http://xbc.com/1?mt=1000). The TPT analysis portion 59 then controls the communication interface 58 to acquire the TPT from the TPT server 13.

In step S15, the TPT analysis portion 59 analyzes the acquired TPT to determine whether any TPT having the same "id" and/or "version" was acquired already. Incidentally, "id" and "version" are designated in the id attribute and version attribute of the tpt element, for example. If it is determined in step S15 that any TPT having the same "id" and/or "version" is not one acquired already, control is passed to step S16.

In step S16, the TPT analysis portion 59 retains the acquired TPT (e.g., TPT in FIG. 10). Control is passed to step S18.

If it is determined in step S13 that either or both of "domain_name" and "program_id" have yet to be changed, control is passed to step S17.

In step S17, the TPT analysis portion 59 determines whether the updating duration indicated by the updating_time attribute described in the retained TPT has elapsed. If it is determined in step S17 that the updating duration has elapsed, control is passed to step S14. In step S14, the TPT analysis portion 59 acquires a new TPT from the TPT server 13. If any TPT having the same "id" and/or "version" as the newly acquired TPT is not one obtained already, the new TPT is retained.

If it is determined in step S15 that the TPT having the same "id" and/or "version" has already been acquired, or if it is determined in step S17 that the updating duration has yet to elapse, then control is passed to step S18.

In step S18, based on the TPT from the TPT analysis portion 59, the control portion 60 determines whether there exists any command for which "media_time" included in the trigger information from the trigger extraction portion 57 falls within the valid period. If it is determined in step S18 that there exists the command for which "media_time" falls within the valid period, control is passed to step S19.

In step S19, the control portion 60 controls the application engine 63 to perform an application control process. The application control process involves specifying the command for which "media_time" falls within the valid period, and controlling the acquisition, registration, or execution of the data broadcast application; or the injection, suspension, or termination of an event in accordance with the specified command.

Figure 25:
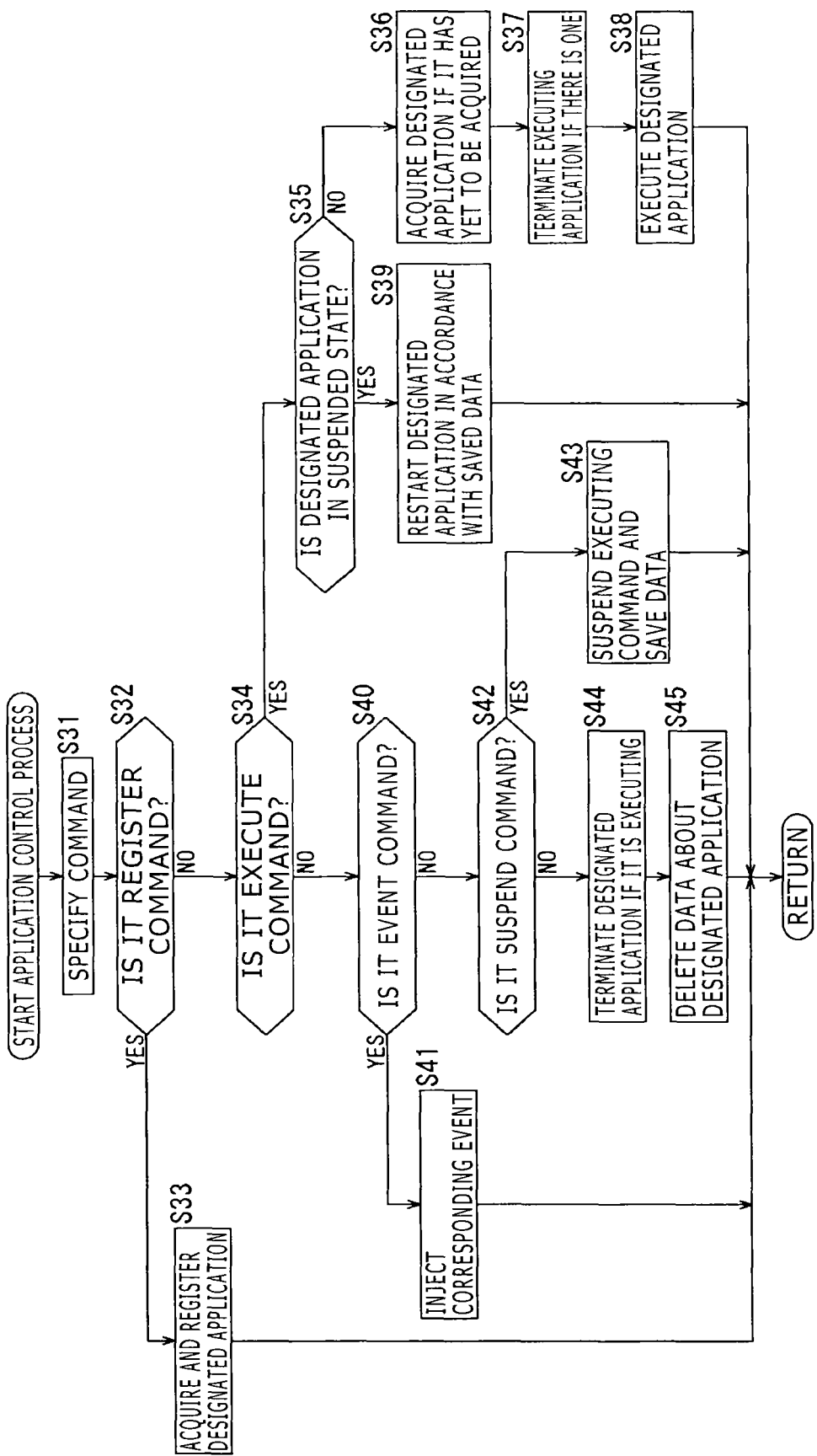
FIG. 25 is a flowchart explanatory of an application control process.

The application control program will be discussed later in detail with reference to the flowchart of FIG. 25.

In step S20, the control portion 60 determines whether the target valid command is the last applicable command to fall within the valid period. If it is determined in step S20 that the command is not the last applicable command, control is returned to step S19 and the subsequent processing is repeated. That is, steps S19 and S20 are repeated until the execution of all valid commands is terminated.

If it is determined in step S20 that the command is the last applicable command, or if it is determined in step S18 that there is no command for which "media_time" falls within the valid period, then control is returned to step S12, and the subsequent processing is repeated.

The preceding paragraph completes the explanation of the trigger information handling process according to method 1.

(Application Control Process)

The application control process corresponding to step S19 in FIG. 24 is explained below in detail with reference to the flowchart of FIG. 25.

In step S31, based on the TPT from the TPT analysis portion 59, the control portion 60 specifies which one of the register, execute, terminate, event, and suspend commands for which "media_time" included in the trigger information extracted by the trigger extraction portion 57 falls within the valid period.

Specifically, based on the TPT in FIG. 10 for example, the control portion 60 specifies, as the command corresponding to the trigger information, the register command if "media_time" in the trigger information falls within a valid period of 0 through 600 seconds, or the execute command if "media_time" falls within a valid period of 600 through 3500 seconds. Also based on the TPT in FIG. 10, the control portion 60 specifies the event command if "media_time" falls within a valid period of 1800 through 2000 seconds, the suspend command if "media_time" falls within a valid period 2400 through 2520 seconds, or the terminate command if "media_time" falls within a valid period of 3500 through 3600 seconds. That is, the TPT serves as a dictionary for use in specifying commands based on "media_time" included in trigger information.

Upon specifying a command, the control portion 60 compares the values of "domain_name" and "program_id" included in the trigger information extracted by the trigger extraction portion 57 with the values in the id attribute of the tpt element in the TPT from the TPT analysis portion 59. Only in the event of a match between these values, does the control portion 60 specify the command corresponding to the trigger information. In the case of a mismatch between these values, the TPT analysis portion 59 under control of the control portion 60 again accesses the TPT server 13 to acquire the TPT corresponding to the currently selected TV program. In this manner, even if the appropriate TPT is not being retained due to radio interference or other disturbance, the reception apparatus 12 can reliably specify the intended commands.

In step S32, the control portion 60 determines whether the command specified in step S31 is the register command. If it is determined that the specified command is the register command, control is passed to step S33.

In step S33, the control portion 60 controls the communication interface 58 to acquire the data broadcast application specified by the application ID by accessing the application server 14 corresponding to the application URL specified by the TPT. The data broadcast application acquired through the communication interface 58 is retained in the cache memory 64. Also, the control portion 60 stores into the memory 61 the valid period of the application and the priority of retaining the application in association with the acquired data broadcast application. Then the data broadcast application retained in the cache memory 64 is managed by the control portion 60 in accordance with the valid period and retention priority of the application.

Thereafter, control is returned to step S19 in FIG. 24, and the subsequent processing is repeated.

If it is determined in step S32 that the command specified in step S31 is not the register command, control is passed to step S34. In step S34, the control portion 60 determines whether the command specified in step S31 is the execute command. If it is determined that the specified command is the execute command, control is passed to step S35.

In step S35, the application engine 63 under control of the control portion 60 determines whether the data broadcast application specified by the application ID in the TPT is in the suspended state. Specifically, it is determined that the data broadcast application is in the suspended state if the data indicative of the status of suspension is saved in the save memory 65B.

If it is determined in step S35 that the data broadcast application specified by the application ID is not in the suspended state, control is passed to step S36. In step S36, the application engine 63 under control of the control portion 60 acquires the data broadcast application specified by the application ID if the application is not one acquired already (i.e., not found in the cache memory 64).

In step S37, the application engine 63 under control of the control portion 60 terminates the currently executing data broadcast application if there is one. In step S38, the application engine 63 under control of the control portion 60 executes the data broadcast application specified by the application ID.

If it is determined in step S35 that the data broadcast application specified by the application ID is in the suspended state, control is passed to step S39.

In step S39, the application engine 63 under control of the control portion 60 moves the data held in the save memory 65B to the work memory 65A and executes the data broadcast application specified by the application ID. This causes the data broadcast application specified by the application ID to be restarted from its suspended state. Thereafter, control is returned to step S19 in FIG. 24 and the subsequent processing is repeated.

If it is determined in step S34 that the command specified in step S31 is not the execute command, control is passed to step S40. In step S40, the control portion 60 determines whether the command specified in step S31 is the event command. If it is determined that the specified command is the event command, control is passed to step S41.

In step S41, only in the event of a match between the application ID specified by the TPT and the application ID of the currently executing data broadcast application, does the control portion 60 control the application engine 63 to inject (i.e., execute) the event corresponding to the event ID of the command into the currently executing data broadcast application. Thereafter, control is returned to step S19 in FIG. 24 and the subsequent processing is repeated.

If it is determined in step S40 that the command specified in step S31 is not the event command, control is passed to step S42. In step S42, the control portion 60 determines whether the command specified in step S31 is the suspend command. If it is determined that the specified command is the suspend command, control is passed to step S43.

In step S43, the application engine 63 under control of the control portion 60 saves into the save memory 65B the data indicative of the status of the currently executing data broadcast application (i.e., the data currently written in the work memory 65A, including information about the layer of the currently displayed information if the information to be displayed has a hierarchical structure). Thereafter, control is returned to step S19 in FIG. 24 and the subsequent processing is repeated.

If it is determined in step S42 that the command specified in step S31 is not the suspend command, that means the command specified in step S31 is the terminate command. In this case, control is passed to step S44.

In step S44, the application engine 63 under control of the control portion 60 terminates the data broadcast application specified by the application ID if the application is currently executing. In step S45, the application engine 63 under control of the control portion 60 deletes from the work memory 65A and save memory 65B the data about the data broadcast application specified by the application ID, and erases the data broadcast application from the cache memory 64. Thereafter, control is returned to step S19 in FIG. 24 and the subsequent processing is repeated.

The preceding paragraph completes the explanation of the application control process. The application control process makes it possible to execute the data broadcast application in interlocked relation to TV programs and CM's or to inject and terminate events. Furthermore, with a given data broadcast application held in its active state, the process makes it possible to execute and terminate another data broadcast application and then to restart the data broadcast application from its suspended state.

(Trigger Information Handling Process According to Method 2)

The trigger information handling process according to method 2 is explained below in reference to the flowchart of FIG. 26.

In steps S51 through S52, as in steps S11 through S17 in FIG. 24, a TPT is acquired from the TPT server 13 if "domain_name" and/or "program_id" included in the extracted trigger information is changed. If the acquired PTT is not one acquired already, it is retained.

In step S58, the control portion 60 establishes "media_time" included in the extracted trigger information as the media clock. This allows the media clock for the currently viewed TV program to be counted internally by the reception apparatus 12, for example.

In step S59, based on the TPT from the TPT analysis portion 59, the control portion 60 determines whether there exists any command for which the time indicated by the media clock falls within the valid period. If it is determined in step S59 that there exists a command for which the time indicated by the media clock falls within the valid period, control is passed to step S60. If no valid end time is designated in the TPT, the control portion 60 determines whether there exists any command for which the time indicated by the media clock has run past the valid start time, as discussed above.

In step S60, the control portion 60 controls the application engine 63 to perform the application control process. The application control process involves specifying the valid command for which the time indicated by the media clock falls within the valid period, and controlling the acquisition, registration, or execution of the data broadcast application; or the injection, suspension, or termination of an event in accordance with the specified command.

The application control process in step S60 is repeated until the execution of all valid commands is terminated (i.e., "Yes" in step S61). The application control process in step S60 is the same as the above-described application control process in FIG. 25 and thus will not be discussed further in detail.

The preceding paragraph completes the explanation of the trigger information handling process according to method 2.
(Trigger Information Handling Process According to Method 2 where "Following" is Designated)

Figure 27:
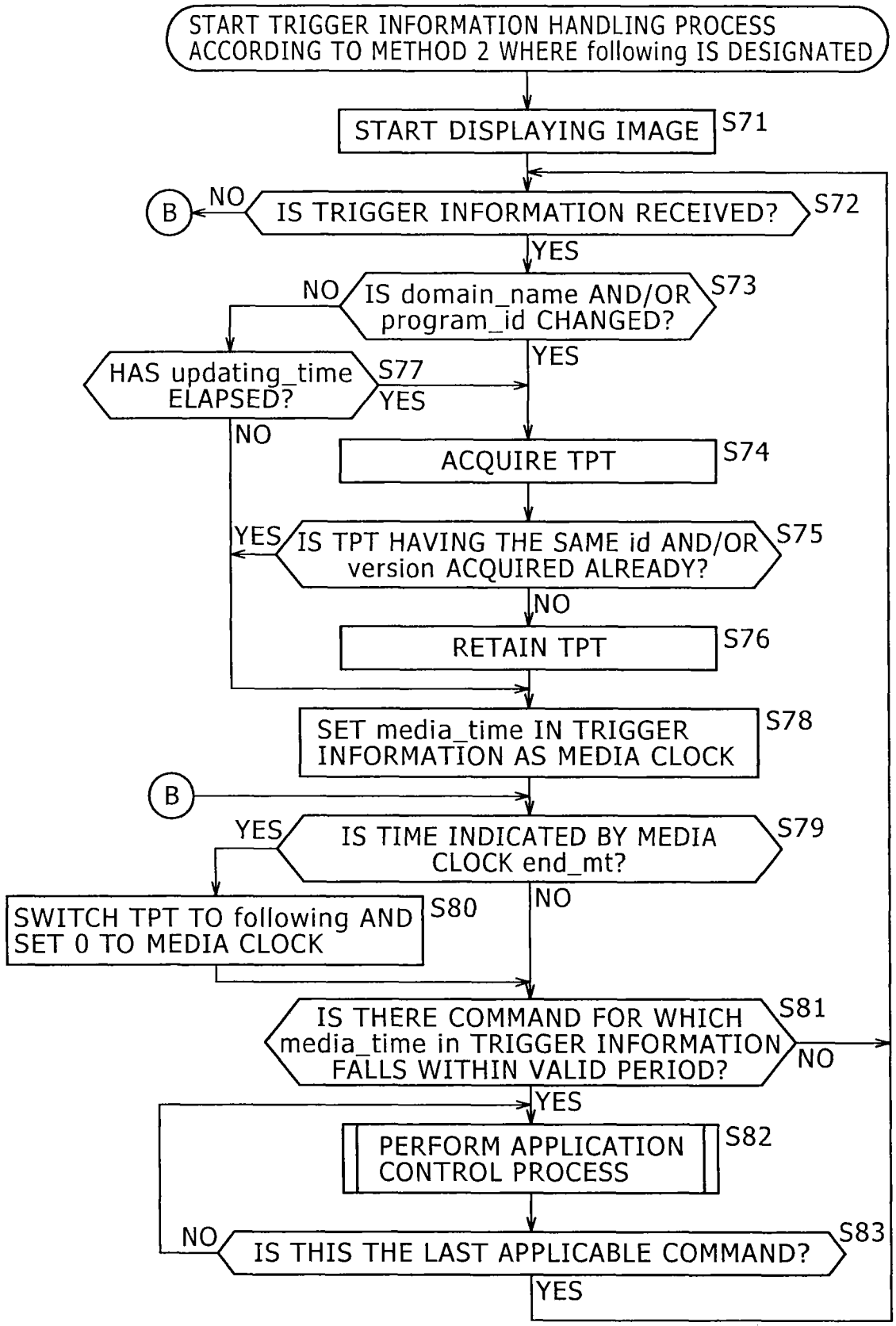
FIG. 27 is a flowchart explanatory of a trigger information handling process according to method 2 where "following" is designated.

Explained below in reference to the flowchart of FIG. 27 is the trigger information handling process according to method 2 where "following" is designated.

Figure 26:
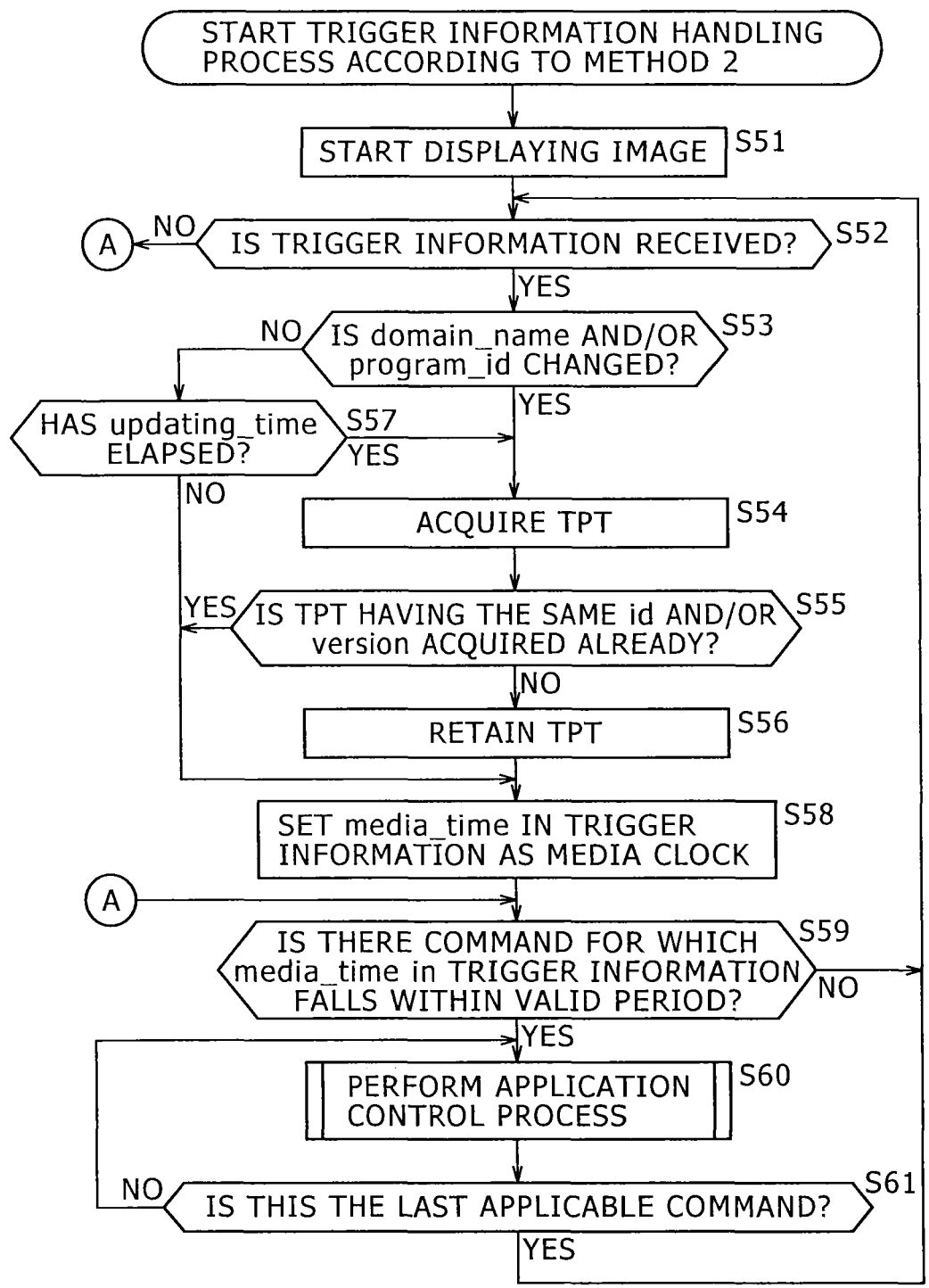
FIG. 26 is a flowchart explanatory of a trigger information handling process according to method 2.

In steps S71 through S78, as in steps S51 through S58 in FIG. 26, if "domain_name" and/or "program_id" included in the extracted trigger information is changed, a TPT is acquired from the TPT server 13 and is retained if the TPT is not one obtained already. In the example of FIG. 27, the present_following attribute in the tpt element is designated. For this reason, as discussed above in reference to FIG. 17, the TPT analysis portion 59 acquires the TPT for the present TV program as well as the TPT for the following TV program to be executed next, and retains the paired TPT's.

Also, the control portion 60 establishes "media_time" included in the trigger information as the media clock.

In step S79, based on the TPT from the TPT analysis portion 59, the control portion 60 determines whether the time indicated by the media clock is the end time indicated by the end_mt attribute in the tpt element. If it is determined in step S79 that the time indicated by the media clock is the end time, control is passed to step S80.

In step S80, based on the paired TPT's being retained, the TPT analysis portion 59 switches from the TPT of the present TV program to the TPT of the following TV program to be broadcast next, for example. Also, the control portion 60 resets the media clock for the present TV program and starts counting the media clock for the following TV program. Thereafter, control is passed to step S81.

If it is determined in step S79 that the time indicated by the media clock is not the end time, the present TV program is continuously broadcast, for example, so that step S80 is skipped. Control is then passed to step S81.

In steps S81 through S83, as in steps S59 through S61 in FIG. 26, the command for which the time indicated by the media clock falls within the valid period is specified. In accordance with the specified command, the acquisition, registration, or execution of the data broadcast application is controlled; or the injection, suspension, or termination of an event is controlled.

The preceding paragraph completes the explanation of the trigger information handling process according to method 2 where "following" is designated.

This completes the explanation of the first embodiment of the present technology.

Second Embodiment

[Typical Configuration of the Broadcasting System]

Figure 28:
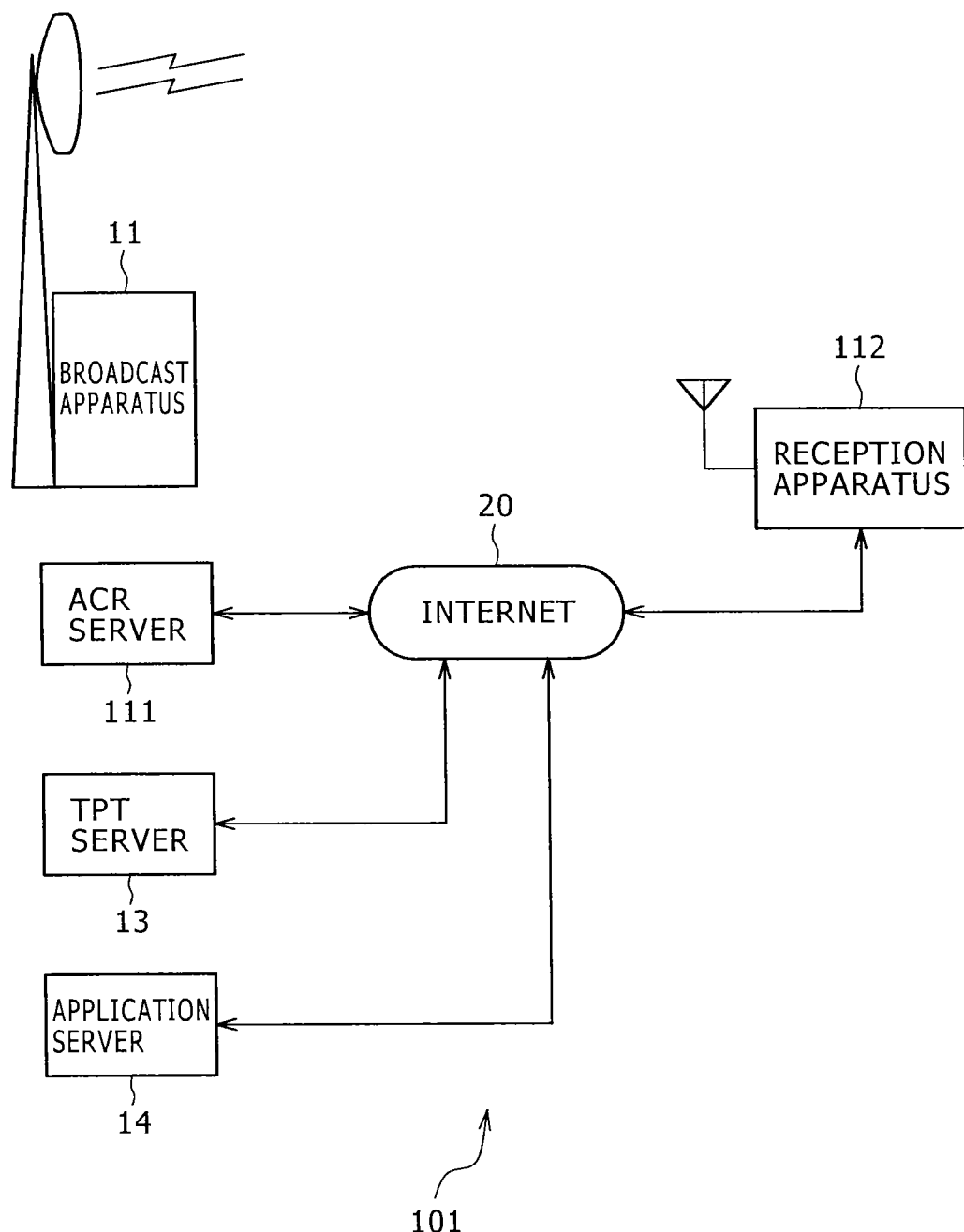
FIG. 28 is a view showing a typical configuration of another broadcasting system.

FIG. 28 shows a broadcasting system 101 as the second embodiment of the present technology. The broadcasting system 101 is made up of a broadcast apparatus 11, a TPT server 13, an application server 14, an ACR server 111, and a reception apparatus 112. The TPT server 13, application server 14, ACR server 111, and reception apparatus 112 are interconnected via the Internet 20.

Compared with the broadcasting system 1 in FIG. 1, the broadcasting system 101 in FIG. 28 includes the ACR server 111 anew and is furnished with the reception apparatus 112 replacing the reception apparatus 12. The other components are the same as those in FIG. 1 and thus their descriptions will be omitted hereunder where redundant.

The reception apparatus 112 accesses periodically the ACR server 111 via the Internet 20 to make queries about trigger information. At the time of a query, the reception apparatus 112 transmits to the ACR server 111 the feature quantity (also called the fingerprint information hereunder) extracted from either or both of the video signal and audio signal constituting AV content such as TV programs and CM's.

The ACR server 111 is a server provided by the broadcast business operators or other business operators broadcasting TV programs using the broadcast apparatus 11, for example. The ACR server 111 includes a database in which are registered the feature quantities extracted from the video and audio signal of AC content. In response to a query from a given reception apparatus 112 connected to the Internet 20, the ACR server 111 identifies the corresponding AV content using ACR (Automatic Content Recognition) technology.

Specifically, the ACR server 111 matches the fingerprint information from the reception apparatus 112 against the database to identify corresponding AV content and creates trigger information reflecting the result of the identification. The AV server 111 transmits the created trigger information to the reception apparatus 112 via the Internet 20.

In accordance with the trigger information received from the ACR server 111, the reception apparatus 112 accesses the TPT server 13 via the Internet 20 to acquire a TPT. On the basis of the TPT acquired from the TPT server 13, the reception apparatus 112 determines a valid command for which the time indicative of the progress of the AV content and obtained from the trigger information from the broadcast apparatus 11 either falls within the valid period or has run past the valid start time. In accordance with the command thus specified, the reception apparatus 112 controls the operation of the data broadcast application.

The broadcasting system 101 is configured as described above.

[Typical Structure of the Reception Apparatus]

Figure 29:
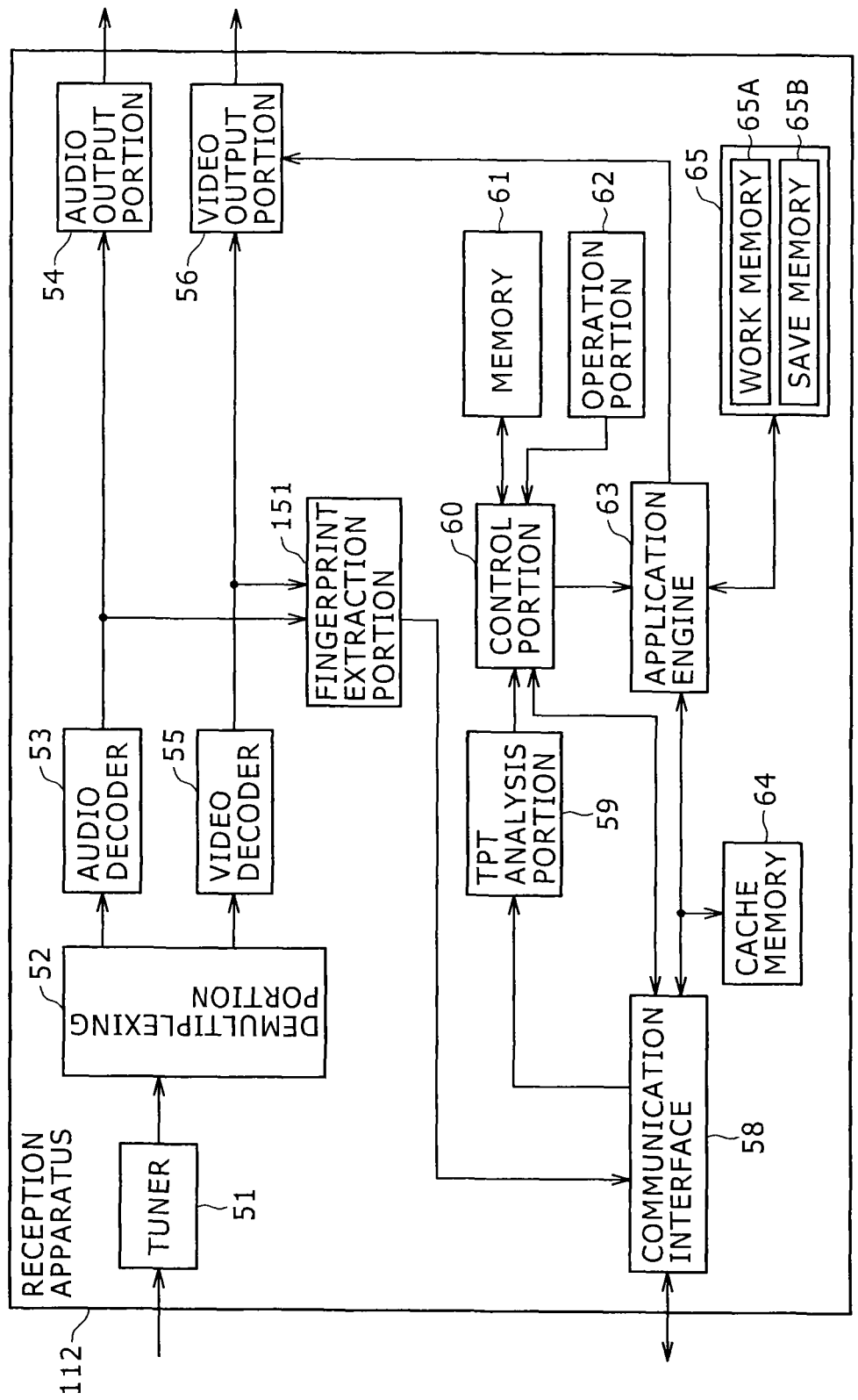
FIG. 29 is a view showing a typical structure of a reception apparatus.

FIG. 29 shows a typical structure of the reception apparatus 112 included in FIG. 28.

As with the reception apparatus 12 in FIG. 2, the reception apparatus 112 has the components ranging from the tuner 51 to the application memory 65. What makes the reception apparatus 112 different from the reception apparatus 12 in FIG. 2 is that a fingerprint extraction portion 151 is provided to replace the trigger extraction portion 57. In the reception apparatus 112, the same components as those of the reception apparatus 12 in FIG. 2 are given the same reference characters, and their descriptions will be omitted hereunder where redundant.

The audio decoder 53 and video decoder 55 output the audio signal and video signal, respectively, to the fingerprint extraction portion 151. The fingerprint extraction portion 151 extracts the feature quantity from either or both of the audio signal and video signal and forwards the extracted feature quantity as the fingerprint information to the communication interface 58.

The communication interface 58 transmits the fingerprint information coming from the fingerprint extraction portion 151 to the ACR server 111 via the Internet 20. Also, the communication interface 58 receives trigger information from the ACR server 111 and outputs the received trigger information to the control portion 60.

In accordance with the received trigger information, the control portion 60 controls the communication interface 58 to access the TPT server 13 via the Internet 20 so as to request a TPT. The communication interface 58 receives the TPT transmitted from the TPT server 13 over the Internet 20 and forwards the received TPT to the TPT analysis portion 59. In turn, the TPT analysis portion 59 retains the TPT in an internal memory (not shown) and outputs the TPT held in the memory in response to requests from the control portion 60.

Also, based on the TPT from the TPT analysis portion 59, the control portion 60 specifies any valid command for which the time indicative of the progress of the AV content and obtained from the time information (media_time) included in the trigger information from the communication interface 58 either falls within the valid period or has run past the valid start time. In accordance with the specified command, the control portion 60 controls the acquisition, registration, or execution of the data broadcast application; or the injection, suspension, or termination of an event.

The reception apparatus 112 is structured as described above.

[Operations of the Components Making Up the Broadcasting System]

An outline of the operations of the components making up the broadcasting system 101 in FIG. 28 is explained below in reference to FIG. 30.

Figure 30:
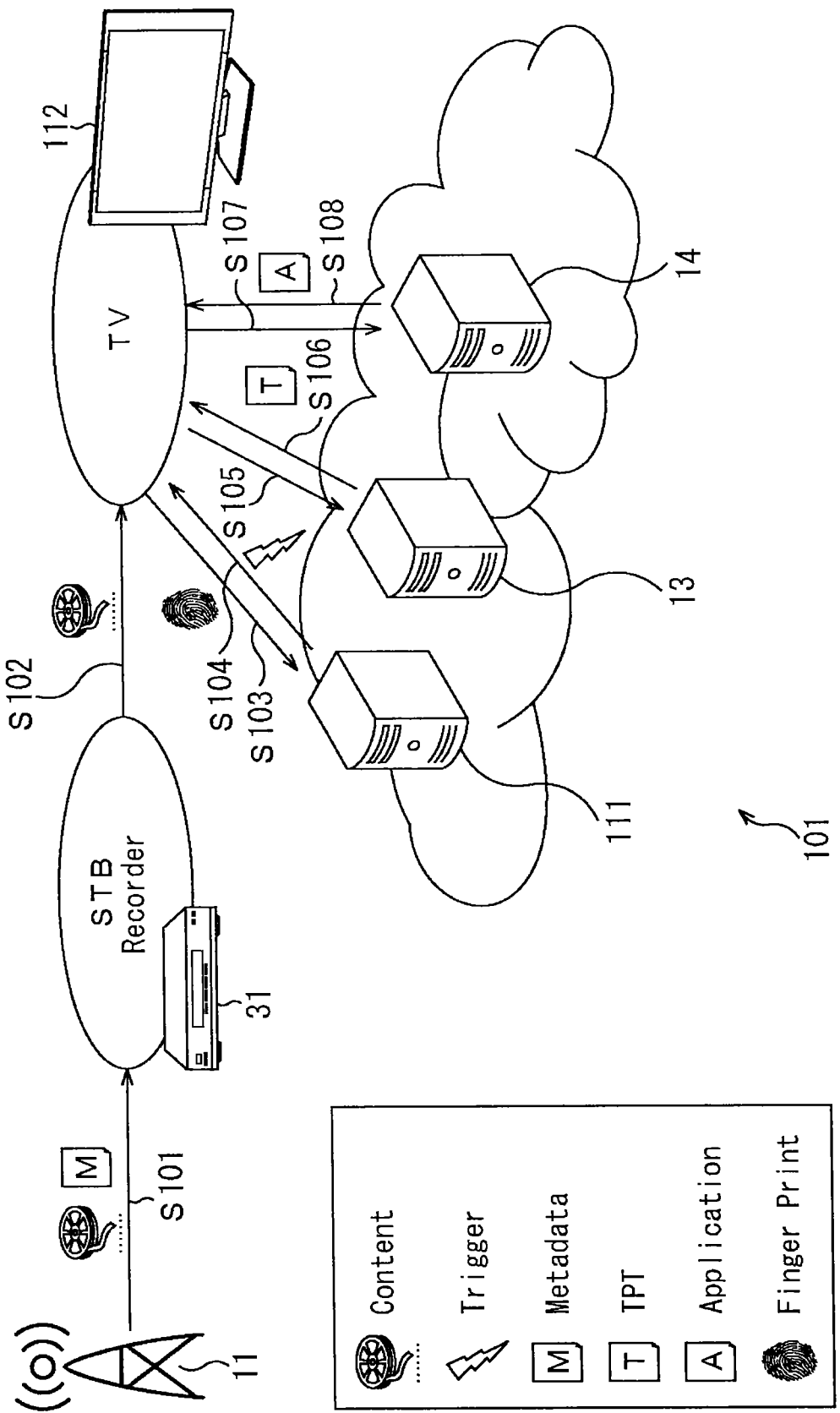
FIG. 30 is a view explanatory of the operations of apparatuses making up the broadcasting system.

In the broadcasting system 101 of FIG. 30, the broadcast apparatus 11 transmits the broadcast signal of a TV program (S101). The broadcast signal contains metadata about the TV program in question.

Upon receipt of the broadcast signal from the broadcast apparatus 11 via a CATV network, a satellite communication network or the like, the reception apparatus 112 has the broadcast signal converted using a dedicated terminal such as a set-top box 31 and receives the converted signal through an HDMI (S102). In this case, the output from the set-top box 31 consists of the TV program only; the reception apparatus 112 cannot use the metadata.

When receiving the broadcast signal directly (S101) or by way of the set-top box (S102), the reception apparatus 112 transmits the feature quantity extracted from the video signal and audio signal of the TV program as the fingerprint information to the ACR server 111 so as to request trigger information therefrom (S103).

Figure 31:
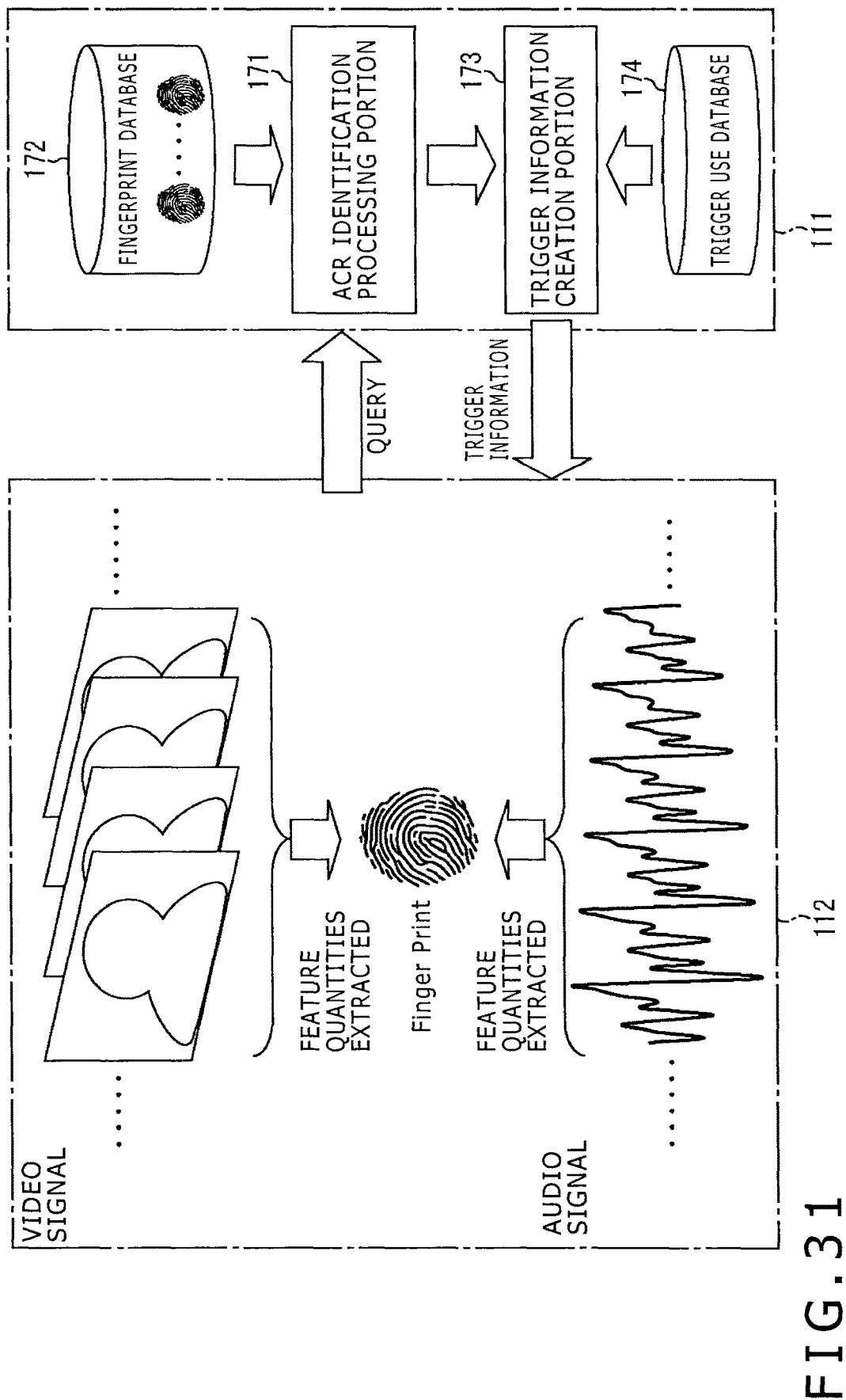
FIG. 31 is a view explanatory of the concept of ACR technology.

The ACR server 111 identifies the TV program currently selected by the reception apparatus 112 by matching the fingerprint information from the reception apparatus 112 against the database in an ACR identification process. Specifically, as shown in FIG. 31, the ACR server 111 receives a query with fingerprint information from the reception apparatus 112. In turn, an ACR identification processing portion 171 matches the fingerprint information against an FP database 172 prepared in advance so as to identify the TV program currently selected by the reception apparatus 112.

The fingerprint information (feature quantity) is unique information about given AV content in part or in its entirety, for example. The FP database 172 has unique information about numerous pieces of AV content registered therein beforehand. The ACR identification process involves determining the degree of similarity or the degree of coincidence between such unique information. The method for determining the degree of similarity or of coincidence may be selected from suitable known techniques disclosed by diverse literature. By use of ACR technology, it is possible to identify AV content based on the feature quantities derived from the video and audio signals independent of such information as the resolution, embodiment ratio, bit rate, and format of the AV content.

The ACR identification process provides two kinds of information: information identifying the channel number of the TV program (called the channel identification information hereunder), and information indicative of the time position at which fingerprint information is extracted along the time axis from the start to end of the TV program (called the time position information hereunder). These results of ACR identification are output to a trigger information creation portion 173.

The trigger information creation portion 173 creates trigger information based on the results of identification from the ACR identification processing portion 171 and on diverse information registered in a trigger use database 174. Specifically, server specific information and content identification information corresponding to channel identification information are registered beforehand in the trigger use database 174.

By referencing the trigger use database 174, the trigger information creation portion 173 acquires the server specific information and content identification information corresponding to the channel identification information coming from the ACR identification processing portion 171. The trigger information creation portion 173 proceeds to create the trigger information by setting therein "domain_name" denoting the server specific information and "program_id" indicating the content identification information following their acquisition from the trigger use database 174, as well as "media_time" representing the time position information acquired from the ACR identification processing portion 171.

Returning to FIG. 30, the trigger information creation portion 173 transmits the created trigger information too the reception apparatus 112 that issued the query (S104). The reception apparatus 112 determines whether or not to acquire the TPT based on "domain_name" and "program_id" included in the trigger information from the ACR server 111. If it is determined that the TPT is to be acquired, the reception apparatus 112 accesses the TPT server 13 via the Internet 20 to request the TPT therefrom (S105).

In response to the query from the reception apparatus 112, the TPT server 13 specifies the TPT and transmits the specified TPT to the reception apparatus 112 over the Internet 20 (S106). The reception apparatus 112 receives the TPT from the TPT via the Internet 20 and retains the received TPT.

In accordance with the periodically extracted fingerprint information, the reception apparatus 112 acquires trigger information from the ACR server 111. Upon acquiring the trigger information, the reception apparatus 112 references the retained TPT to see if the time indicated by "media_time" included in the acquired trigger information falls within the valid period of a command. If there exists such a valid command for which the time indicated by "media_time" falls within the valid period, the reception apparatus 112 specifies the valid command. In accordance with the specified command, the reception apparatus 112 accesses the application server 14 via the Internet 20 to request the data broadcast application to be executed in interlocked relation to the currently selected TV program (S107).

In response to the query from the reception apparatus 112, the application server 14 transmits the data broadcast application to the reception apparatus 112 via the Internet (S108). The reception apparatus 112 acquires the data broadcast application from the application server 14 over the Internet and executes the acquired data broadcast application.

Also, upon acquiring trigger information during execution of the data broadcast application, the reception apparatus 112 specifies the command corresponding to "media_time" included in the acquired trigger information on the basis of the TPT. In accordance with the specified command, the data broadcast application performs operations such as the injection, suspension, or termination of an event.

In the broadcasting system 101, as described above, the reception apparatus 112 periodically transmits fingerprint information to the ACR server 111 to receive trigger information. In accordance with the received trigger information, the reception apparatus 112 operates in concert with the TPT server 13 and application server 14. This allows the reception apparatus 112 to acquire and execute the data broadcast application in interlocked relation to the currently selected TV program. The trigger information from the ACR server 111 is communicated to the reception apparatus 112 regardless of the set-top box 31 or similar dedicated terminals. For these reasons, the broadcasting system 101 can offer data broadcasting applications without refurbishing the broadcast channel equipment such as CATV networks and dedicated terminals and without getting permission from broadcast business operators relaying TV programs.

[Relations of Correspondence Between Trigger Information and Commands]

Figure 32:
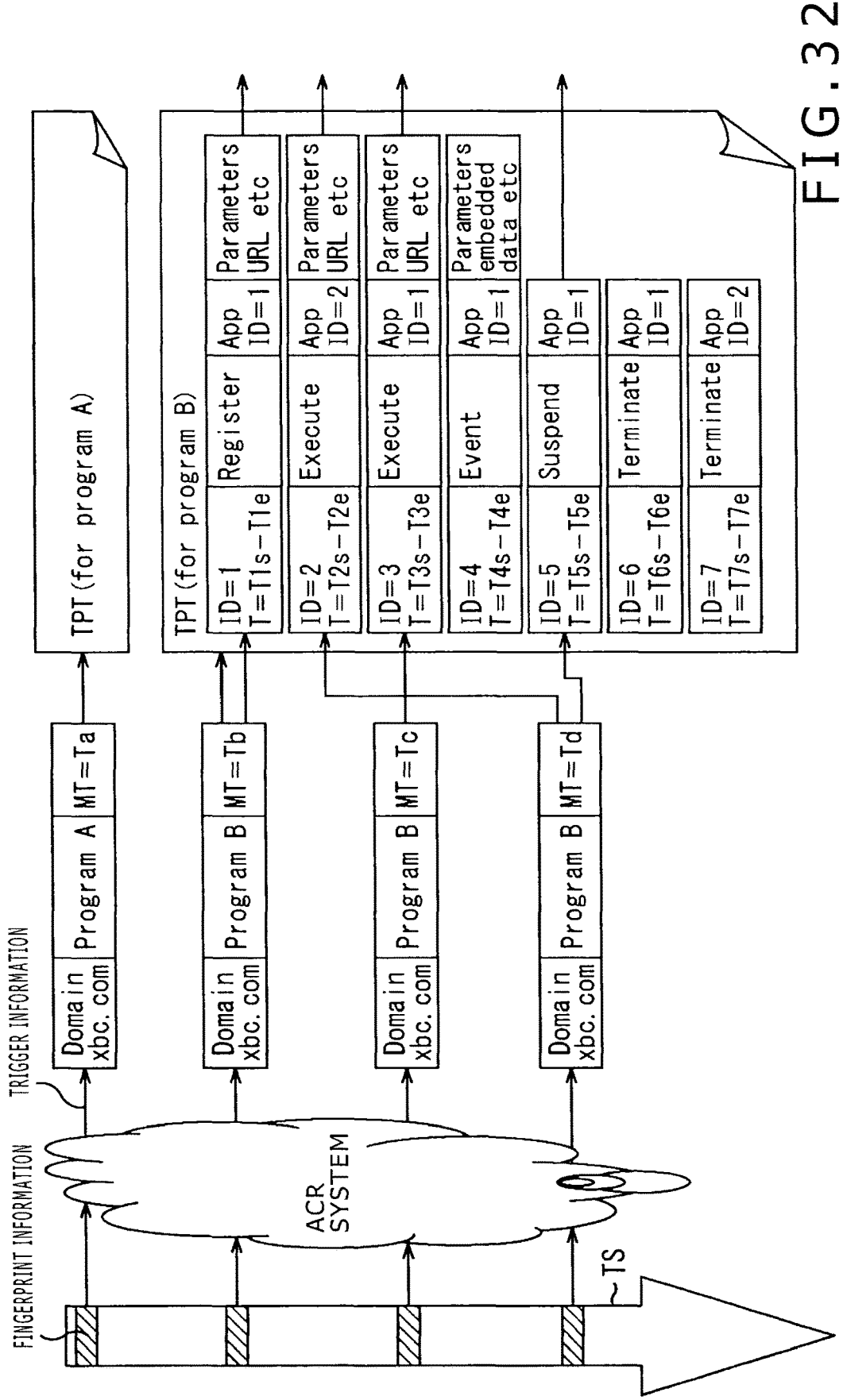
FIG. 32 is a view showing typical relations of correspondence between trigger information and commands in effect when ACR recognition results are used.

Explained below is a processing example in which the command associated with the trigger information acquired in accordance with fingerprint information is specified on the basis of the TPT. FIG. 32 is a view showing typical relations of correspondence between trigger information and commands.

As shown in FIG. 32, the reception apparatus 112 extracts fingerprint information periodically from the TS and transmits the extracted fingerprint information to the ACR server 111 (indicated as the ACR system in the figure). Based on the fingerprint information from the reception apparatus 112, the ACR server 111 creates trigger information and transmits the created information to the reception apparatus 112.

Upon acquiring trigger information in accordance with the periodically extracted fingerprint information, the reception apparatus 112 determines whether or not to acquire the TPT from the TPT server 13 based on either or both of "domain_name" and "program_id" included in the trigger information. For example, if the value of "program_id" included in the acquired trigger information is changed while the TPT for program A is being retained, the reception apparatus 112 accesses the TPT server 13 to acquire the TPT therefrom. This allows the reception apparatus 112 to retain the TPT for program B as shown in the figure.

Of the processes for specifying the command corresponding to "media_time" included in the trigger information acquired in response to fingerprint information, those carried out after the acquisition of the trigger information are the same as the processes explained above in reference to FIG. 11. That is, it is determined whether "media_time" included in the trigger information acquired periodically in response to the extracted fingerprint information falls within the valid period of any one of the commands found in the TPT (for program B), whereby the valid command is specified. For example, if the register command is valid, the reception apparatus 112 acquires and registers the data broadcast application in accordance with the register command. If the execute command is valid, the reception apparatus 112 executes the previously acquired data broadcast application in accordance with the execute command.

As described, when "media_time" included in the trigger information acquired in keeping with periodically extracted fingerprint information falls within the valid period of a command, the reception apparatus 112 controls the operation of the data broadcast application in accordance with that valid command.

[Trigger Information Handling Process]

Where the trigger information acquired in keeping with fingerprint information is utilized, the operation scenarios according to methods 1 and 2 (FIGS. 13, 14, etc.) can also be implemented as in the above-described cases of extracting trigger information from the TS. Explained below in reference to the flowcharts of FIGS. 33 and 34 is the trigger information handling process carried out when the reception apparatus 112 receives such trigger information.

(Trigger Information Handling Process Reflecting the Results of ACR Identification According to Method 1)

Figure 33:
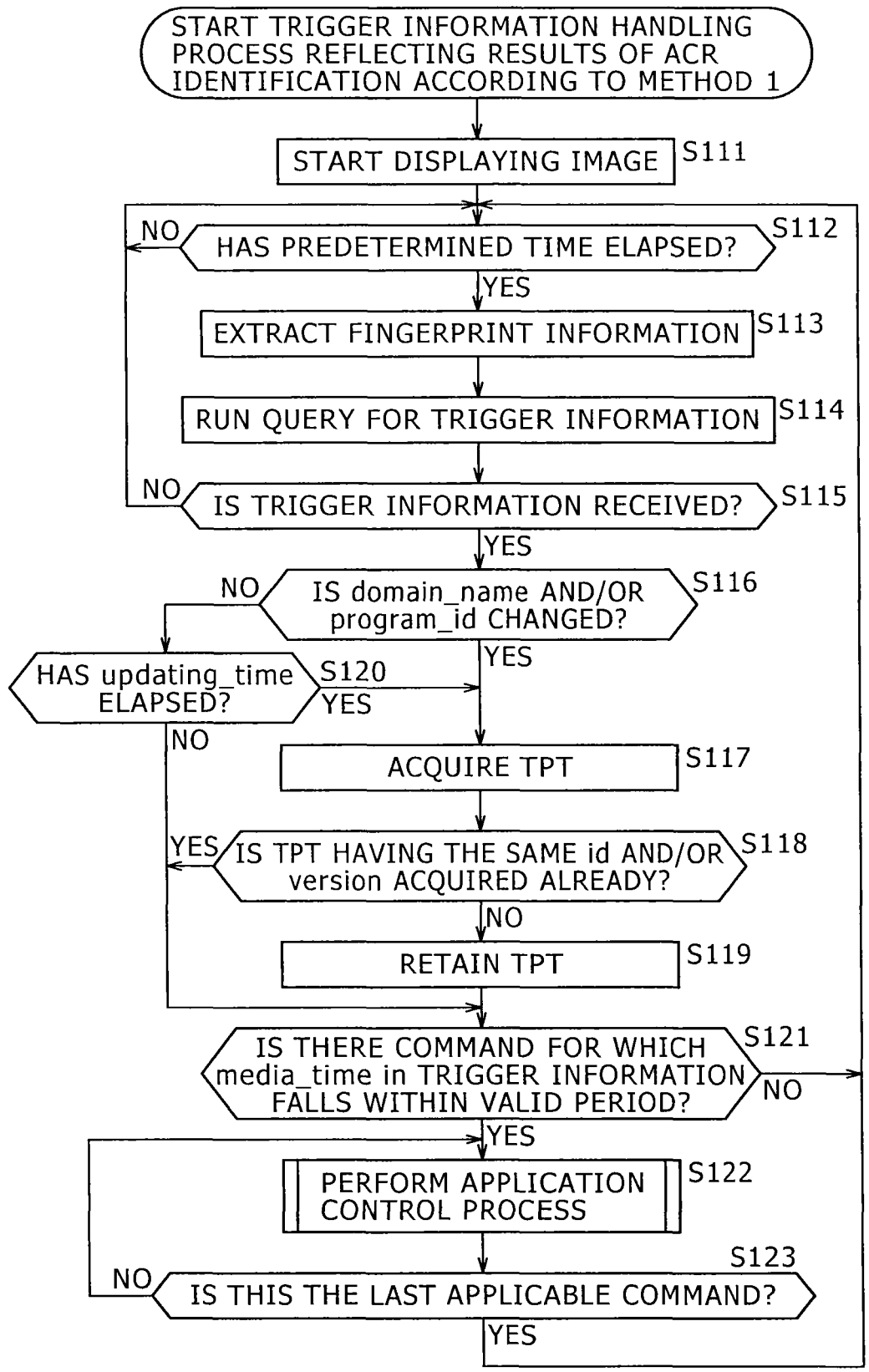
FIG. 33 is a flowchart explanatory of a trigger information handling process reflecting ACR recognition results according to method 1.
Figure 34:
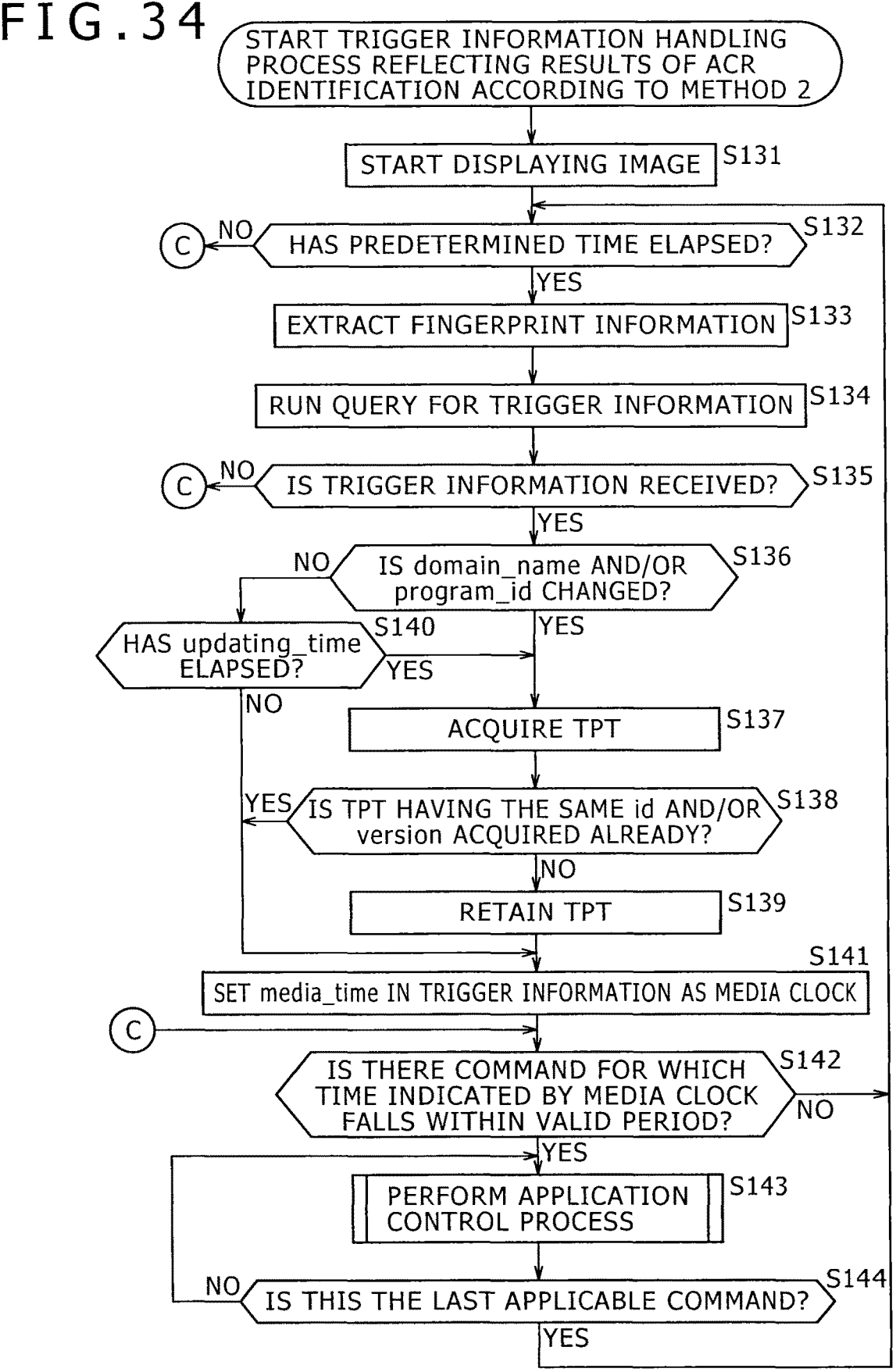
FIG. 34 is a flowchart explanatory of a trigger information handling process reflecting ACR recognition results according to method 2.

Explained first in reference to the flowchart of FIG. 33 is the trigger information handling process reflecting the results of ACR identification according to method 1.

When a given channel is selected by the user's operations, the reception apparatus 112 starts displaying the image of the TV program on the selected channel (step S111).

In step S112, the fingerprint extraction portion 151 waits to let a predetermined time period elapse. Upon elapse of the predetermined time period, control is passed to step S113.

In step S113, the fingerprint extraction portion 151 extracts the feature quantity (fingerprint information) from either or both of the audio signal and video signal.

In step S114, the fingerprint extraction portion 151 controls the communication interface 58 to transmit the fingerprint information to the ACR server 111 via the Internet 20, thus making a query for trigger information.

In step S115, the control portion 60 controls the communication interface 58 to determine whether the trigger information is received from the ACR server 111. If it is determined in step S115 that the trigger information has yet to be received, control is returned to step S112 and the subsequent processing is repeated. If it is determined in step S115 that the trigger information is received, control is passed to step S116.

In steps S116 through S123, as in steps S13 through S20 of FIG. 24, it is determined whether "domain_name" and/or "program_id" included in the trigger information received from the ACR server 111 is changed, for example. If "domain_name" and/or "program_id" is changed, the TPT analysis portion 59 acquires the TPT and retains it if it is one not acquired previously. If the control portion 60 determines that "media_time" included in the received trigger information falls within the valid period of a command, the control portion 60 controls the operation of the data broadcast application in accordance with that valid command.

This terminates the trigger information handling process reflecting the results of ACR identification according to method 1.

(Trigger Information Handling Process Reflecting the Results of ACR Identification According to Method 2)

Explained next in reference to the flowchart of FIG. 34 is the trigger information handling process reflecting the results of ACR identification according to method 2.

In steps S131 through S140, as in steps S111 through S120 of FIG. 33, it is determined whether "domain_name" and/or "program_id" included in the trigger information received from the ACR server 111 is changed. If "domain_name" and/or "program_id" is changed, the TPT analysis portion 59 acquires the TPT and retains it if it is one not acquired previously.

In steps S141 through S144, as in steps S58 through S61 of FIG. 26, the control portion 60 establishes "media_time" included in the trigger information as the media clock. If it is determined that the time indicated by the media clock either falls within the valid period of a command or has run past the valid start time thereof, the control portion 60 controls the operation of the data broadcast application in accordance with that valid command.

This terminates the trigger information handling process reflecting the results of ACR identification according to method 2.

The preceding paragraph completes the explanation of the second embodiment of the present technology.

Figure 35:
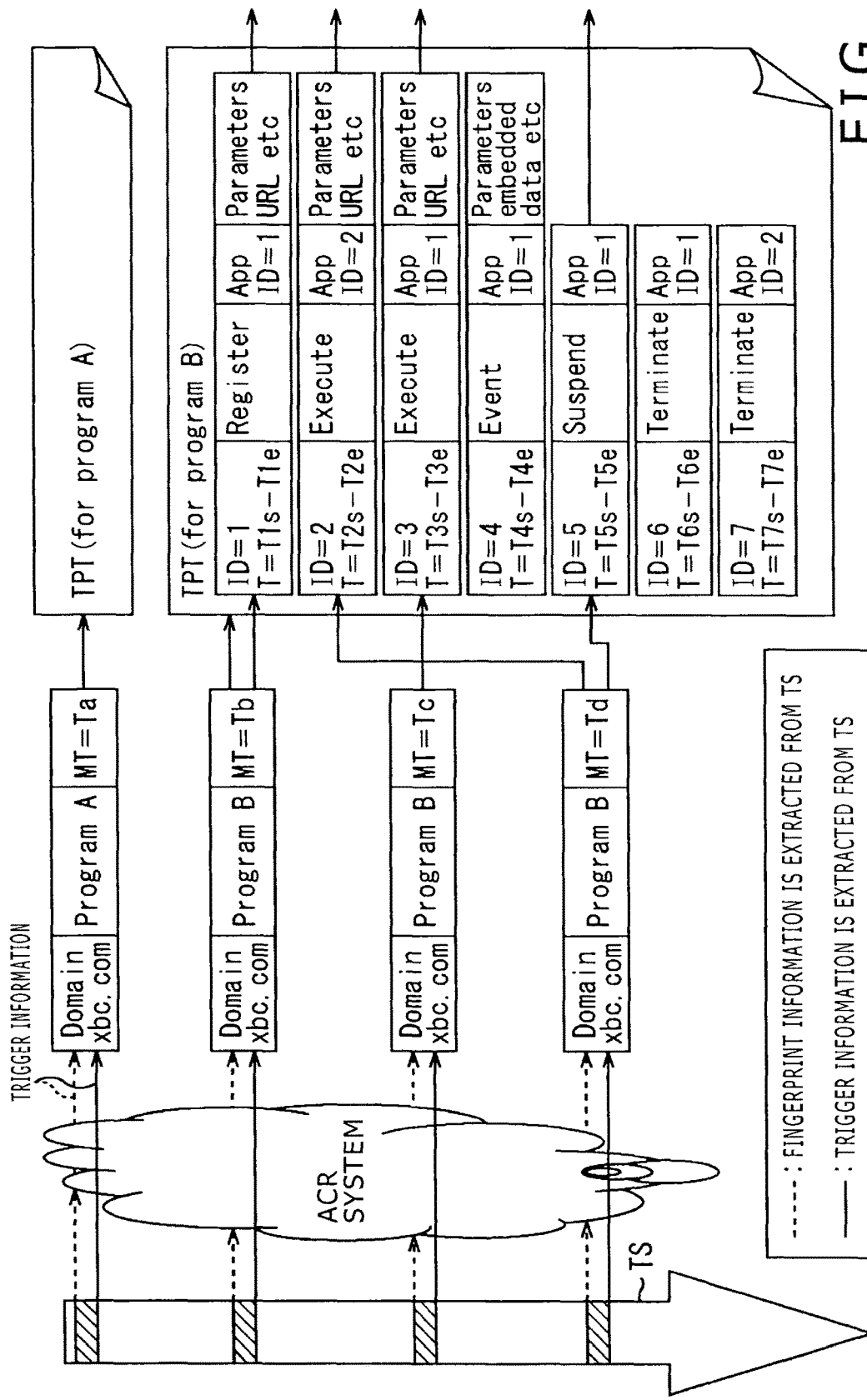
FIG. 35 is a view showing typical relations of correspondence between trigger information and commands.

It should be noted that for the first and the second embodiments, the paths through which trigger information is acquired are different but the manner and format in which trigger information and TPT's are acquired by the reception apparatus 12 are the same. For this reason, these embodiments may be operated simultaneously as shown in FIG. 35.

Third Embodiment

[Typical Configuration of the Distribution System]

In the foregoing description, the reception apparatus 12 or 112 was shown to receive the broadcast signal of AV content such as TV programs transmitted from the broadcast apparatus 11. Alternatively, AV content may be distributed on a VOD (video on demand) basis over the Internet 20.

Figure 36:
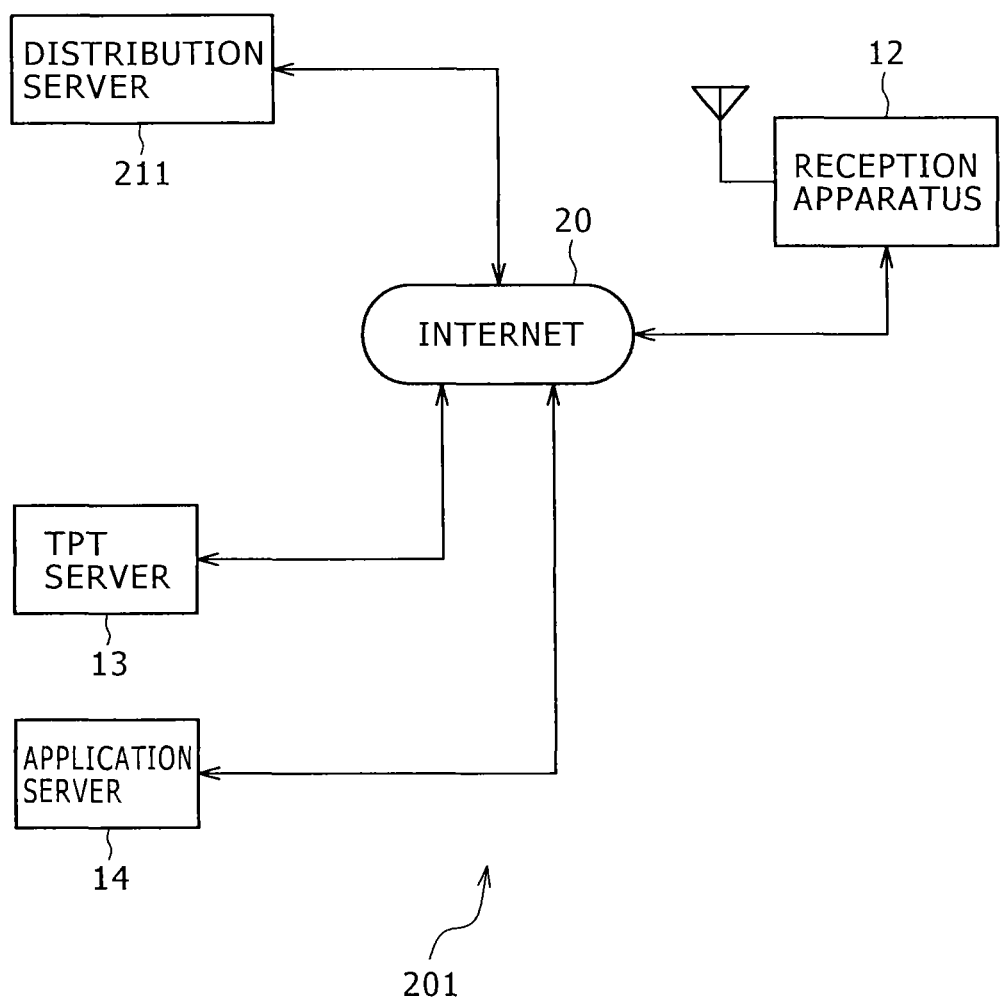
FIG. 36 is a view showing a typical configuration of a distribution system.

FIG. 36 shows a distribution system 201 as the third embodiment of the present technology. In FIG. 36, the same components as those shown in FIG. 1 are given the same reference characters, and their descriptions will be omitted hereunder where redundant.

That is, compared with FIG. 1, FIG. 36 shows a distribution server 211 connected to the Internet 20 and replacing the broadcast apparatus 11. In response to requests from the reception apparatus 12, the distribution server 211 distributes AV content such as VOD content to the reception apparatus 12 over the Internet 20. Also, the distribution server 211 transmits trigger information along with the VOD content to the reception apparatus 12.

The reception apparatus 12 receives the trigger information transmitted together with the VOD content from the distribution server 211, and acquires from the TPT server 13 the TPT corresponding to "domain_name" and "program_id" included in the extracted trigger information. Based on the TPT from the TPT server 13, the reception apparatus 12 specifies the command corresponding to the "media_time" included in the trigger information from the distribution server 211. In accordance with the command thus specified, the reception apparatus 12 controls the data broadcast application to be executed in interlocked relation to the VOD content.

As described, the reception apparatus 12 can receive AV content not only over broadcast networks but also over communication networks. Whether the AV content is received over the broadcast network or the communication network, the reception apparatus 12 can acquire the TPT corresponding to "domain_name" and "program_id" included in the trigger information transmitted along with the AV content in question. As a result, the reception apparatus 12 can specify the command corresponding to "media_time" included in the trigger information on the basis of the acquired TPT.

The distribution system 201 in FIG. 36 is configured in a manner corresponding to the broadcasting system in FIG. 1. In another example, in the broadcast system 101 configured as shown in FIG. 28 where the ACR server 111 is provided, the broadcast apparatus 11 may be replaced with the distribution server 211.

The preceding paragraph completes the explanation of the third embodiment of the present technology.

In the foregoing description, the offered functions were shown implemented by a plurality of servers such as the TPT server 13, application server 14, ACR server 111, and distribution server 211. Alternatively, part or all of these functions may be offered by one or by a plurality of servers.

[Explanation of the Computer to which this Technology is Applied]

The series of processes described above may be executed either by hardware or by software. Where the software-based series of processing is to be carried out, the programs constituting the software are installed into computers for execution. The computers may include those with the software incorporated in their dedicated hardware beforehand, and those such as general-purpose personal computers and the like capable of executing diverse functions based on diverse programs installed therein.

FIG. 37 is a block diagram showing a typical hardware structure of a computer that executes the above-described series of processes using programs.

In the computer 300, a CPU (central processing unit) 301, a ROM (read only memory) 302, and a RAM (random access memory) 303 are interconnected by a bus 304.

An input/output interface 305 is also connected to the bus 304. The input/output interface 305 is connected with an input portion 306, an output portion 307, a recording portion 308, a communication portion 309, and a drive 310.

The input portion 306 is made up of a keyboard, a mouse, a microphone, etc. The output portion 307 is composed of a display device, speakers, etc. The recording portion 308 is formed by a hard disk, a nonvolatile memory, etc. The communication portion 309 is constituted by a network interface or the like. The drive 310 drives removable media 311 such as a magnetic disk, an optical disk, a magneto-optical disk, and a semiconductor memory.

In the computer 300 structured as outlined above, the CPU 301 may load relevant programs from, say, the recording portion 308 where they are stored into the RAM 303 for execution by way of the input/output interface 305 and bus 304, whereby the above-mentioned series of processes can be performed.

The programs to be executed by the computer 300 (i.e., CPU 301) may be offered recorded on the removable media 311 constituting package media or the like. The programs may also be offered transmitted through wired or wireless transmission media such as local area networks, the Internet, or digital satellite broadcasts.

When a suitable piece of the removable media 311 carrying the programs is attached to the drive 310, the programs can be installed from the attached medium into the recording portion 308 through the input/output interface

305. Alternatively, the programs may be received by the communication portion 309 through wired or wireless transmission media before getting installed into the recording portion 308. As another alternative, the programs may be preinstalled in the ROM 302 or in the recording portion 308.

Also, the programs for execution by the computer 300 may be processed in the depicted sequence of this specification (i.e., on a time series basis), in parallel, or in otherwise appropriately timed fashion such as when they are invoked.

In this specification, the processing steps describing the programs for causing the computer 300 to perform diverse processing may not be carried out in the depicted sequence in the flowcharts (i.e., chronologically); the steps may also include processes that are conducted parallelly or individually (e.g., in parallel or object-oriented fashion).

The programs may be processed by a single computer or by a plurality of computers on a distributed basis. The programs may also be transferred to a remote computer or computers for execution.

Also in this specification, the term "system" refers to a set of a plurality of components (devices, modules (parts), etc.). All the components may or may not be housed in a single enclosure. Thus a plurality of devices housed in separated enclosures and connected by a network constitute a system, and so does one device housing a plurality of modules in a single enclosure.

It should be understood that the disclosed technology when embodied is not limited to the above-described embodiments and that various modifications, variations and alternatives may be made of this technology so far as they are within the spirit and scope thereof.

For example, this technology may be implemented in the form of a setup of cloud computing wherein one function is handled on a sharing basis by a plurality of devices connected by a network.

Also, each of the steps explained above in reference to the flowcharts may be carried out either by one device or by a plurality devices on a sharing basis.

Furthermore, if one step includes a plurality of processes, these processes may be performed either by one device or by a plurality of devices on a sharing basis.

The disclosed technology may also be structured as follows:

(1)

A reception apparatus including:

a reception portion configured to receive AV content;

a trigger acquisition portion configured to acquire trigger information for operating an application program to be executed in interlocked relation to the AV content;

a table acquisition portion configured to acquire a correspondence table associating a command for controlling the operation of the application program with a valid time of the command; and a control portion configured such that when the time acquired from the trigger information as indicative of the progress of the AV content satisfies a predetermined condition of validity in reference to the valid time of the command on the basis of the acquired correspondence table, the control portion controls the operation of the application program in accordance with the command being valid.

(2)

The reception apparatus described in (1) above, wherein the trigger information is transmitted together with the AV content, and wherein the trigger acquisition portion extracts the trigger information from the received AV content.

(3)

The reception apparatus described in (1) or (2) above, further including a feature quantity extraction portion configured to extract a feature quantity from data of the received AV content;

wherein the trigger acquisition portion acquires the trigger information corresponding to a result from identifying the AV content by use of the extracted feature quantity.

(4)

The reception apparatus described in (1), (2) or (3) above, wherein the trigger information includes time information indicative of the progress of the AV content, and wherein, when the time indicated by the time information included in the trigger information falls within a valid period defined by a valid start time and a valid end time of the command, the control portion controls the operation of the application program in accordance with the command being valid.

(5)

The reception apparatus described in (1), (2) or (3) above, wherein the trigger information includes time information indicative of the progress of the AV content, and wherein, when the time counted on the basis of said time information included in said trigger information and indicative of the progress of said first AV content either falls within a valid period defined by a valid start time and a valid end time of the command or has run past the valid start time of the command, the control portion controls the operation of the application program in accordance with the command being valid.

(6)

The reception apparatus described in (1), (2) or (3) above, wherein the trigger information includes specific information specifying an information processing apparatus offering the correspondence table and identification information identifying the AV content, and wherein, when either or both of the specific information and the identification information included in the trigger information are changed, the table acquisition portion acquires the correspondence table from the information processing apparatus in accordance with the specific information and the identification information.

(7)

The reception apparatus described in (6) above, wherein the table acquisition portion acquires beforehand the correspondence table of the AV content having the changed identification information, and wherein, upon receipt of the AV content having the changed identification information, the control portion controls the operation of the application program based on the correspondence table acquired beforehand.

(8)

The reception apparatus described in (7) above, wherein the table acquisition portion retains the correspondence table acquired beforehand for only a period designated beforehand.

(9)

The reception apparatus described in (6) above, wherein, when currently received first AV content is to be switched to second AV content having the changed identification information, the table acquisition portion acquires beforehand both the correspondence table of the first AV content and the correspondence table of the second AV content and retains the acquired correspondence tables, and wherein, when the first AV content is switched to the second AV content, the control portion controls the operation of the application program based on the correspondence table of the second AV content acquired beforehand.

(10)

The reception apparatus described in (9) above, wherein the trigger information includes time information indicative of the progress of the AV content;

wherein the correspondence table describes the time at which the AV content is to be terminated;

wherein, when the time counted on the basis of the time information included in the trigger information and indicative of the progress of the first AV content coincides with the time indicative of the termination of the first AV content described in the correspondence table of the first AV content, the control portion starts counting the time indicative of the progress of the second AV content, and wherein, when the time indicative of the progress of the second AV content and counted on the basis of the correspondence table of the second AV content acquired beforehand either falls within a valid period defined by the valid start time and valid end time of the command or has run past the valid start time of the command, the control portion controls the operation of the application program in accordance with the command being valid.

(11)

The reception apparatus described in (1), (2) or (3) above, wherein the correspondence table describes an updating duration thereof, and wherein the table acquisition portion updates the correspondence table in accordance with the updating duration.

(12)

The reception apparatus described in (1), (2) or (3) above, wherein the correspondence table describes information indicative of a probability that the command becomes valid, and wherein, when the command becomes valid, the control portion controls the operation of the application program in accordance with the command.

(13)

The reception apparatus described in any one of (1) through (12) above, wherein the command designates registration, acquisition, or execution of the application program; or injection, suspension, or termination of an event, and wherein, in response to the command, the control portion controls the acquisition, registration, or execution of the application program; or the injection, suspension, or termination of an event in the currently executing application program.

(14)

A reception method for use with a reception apparatus, the reception method including:

causing the reception apparatus to receive AV content;

causing the reception apparatus to acquire trigger information for operating an application program to be executed in interlocked relation to the AV content;

causing the reception apparatus to acquire a correspondence table associating a command for controlling the operation of the application program with a valid time of the command, and when the time acquired from the trigger information as indicative of the progress of the AV content satisfies a predetermined condition of validity in reference to the valid time of the command on the basis of the acquired correspondence table, causing the reception apparatus to control the operation of the application program in accordance with the command being valid.

(15)

A program for causing a computer to function as an apparatus including:

a reception portion configured to receive AV content;

a trigger acquisition portion configured to acquire trigger information for operating an application program to be executed in interlocked relation to the AV content;

a table acquisition portion configured to acquire a correspondence table associating a command for controlling the operation of the application program with a valid time of the command; and a control portion configured such that when the time acquired from the trigger information as indicative of the progress of the AV content satisfies a predetermined condition of validity in reference to the valid time of the command on the basis of the acquired correspondence table, the control portion controls the operation of the application program in accordance with the command being valid.

(16)

An information processing system including a reception apparatus, a first information processing apparatus, and a second information processing apparatus, the reception apparatus including:

a reception portion configured to receive AV content;

a trigger extraction portion configured to extract trigger information transmitted together with the AV content for operating an application program to be executed in interlocked relation to the received AV content;

a table acquisition portion configured to acquire from the first information processing apparatus a correspondence table associating a command for controlling the operation of the application program with a valid time of the command; and a control portion configured such that when the time acquired from the extracted trigger information as indicative of the progress of the AV content satisfies a predetermined condition of validity in reference to the valid time of the command on the basis of the acquired correspondence table, the control portion controls the operation of the application program acquired from the second information processing apparatus in accordance with the command being valid;

wherein the first information processing apparatus includes a first offering portion configured to offer the correspondence table in response to a query from the reception apparatus, and wherein the second information processing apparatus includes a second offering portion configured to offer the application program in response to a query from the reception apparatus.

(17)

An information processing system including a reception apparatus, a first information processing apparatus, a second information processing apparatus, and a third information processing apparatus, the reception apparatus including:

a reception portion configured to receive AV content;

a feature quantity extraction portion configured to extract a feature quantity from data of the received AV content;

a trigger acquisition portion configured to acquire trigger information for operating an application program to be executed in interlocked relation to the received AV content, the trigger information corresponding to a result of identification of the AV content by the first information processing apparatus using the feature quantity;

a table acquisition portion configured to acquire from the second information processing apparatus a correspondence table associating a command for controlling the operation of the application program with a valid time of the command; and a control portion configured such that when the time acquired from the acquired trigger information as indicative of the progress of the AV content satisfies a predetermined condition of validity in reference to the valid time of the command on the basis of the acquired correspondence table, the control portion controls the operation of the application program acquired from the third information processing apparatus in accordance with the command being valid;

wherein the first information processing apparatus includes a first offering portion configured to offer the trigger information corresponding to the result of the identification of the AV content using the feature quantity from the reception apparatus;

wherein the second information processing apparatus includes a second offering portion configured to offer the correspondence table in response to a query from the reception apparatus; and wherein the third information processing apparatus includes a third offering portion configured to offer the application program in response to a query from the reception apparatus.

It should be understood by those skilled in the art that various modifications, combinations, sub-combinations and alterations may occur depending on design requirements and other factors in so far as they are within the scope of the appended claims or the equivalents thereof.

What is claimed is:

1. A reception apparatus, comprising:
    circuitry configured to:
        receive audio/video content,
        acquire trigger information including a media time in the trigger information,
        acquire a correspondence table that defines an event and a start time associated with the event,
        acquire or operate an application associated with the event,
        determine a current time based on the media time included in the acquired trigger information, and
        execute a command associated with the event based on the determined current time and the start time associated with the event,
    wherein the circuitry is configured to display video signal images of the audio/video content in which the acquired trigger information is in a form of an image code embedded in the displayed video signal images, the image code comprising a single bar element comprising multiple lines superimposed across an entire edge of the displayed video signal images in which the single bar element superimposed across the entire edge is in a viewable portion of a display screen of the reception apparatus, the image code being masked using the same pixels as those surrounding the trigger information before being displayed; and
    wherein the acquired trigger information includes a location information of the correspondence table and is transmitted multiple times in a row.

2. The reception apparatus according to claim 1, wherein the acquired trigger information is transmitted together with the audio/video content, and the circuitry is configured to extract the acquired trigger information from the received audio/video content.

3. The reception apparatus according to claim 1, wherein the circuitry is configured to extract a feature quantity from the received audio/video content; and acquire the trigger information using the extracted feature quantity.

4. The reception apparatus according to claim 3, wherein the feature quantity is unique information about the audio/video content.

5. The reception apparatus according to claim 1, wherein when the determined current time is within a valid period defined by the start time and an end time associated with the event, the circuitry executes the command associated with the event.

6. The reception apparatus according to claim 1, wherein when the determined current time is after the start time associated with the event, the circuitry executes the command associated with the event.

7. The reception apparatus according to claim 1, further configured to transmit fingerprint information to query a server about the acquired trigger information.

8. The reception apparatus according to claim 7, wherein the audio/video content is received by broadcast.

9. A method of a reception apparatus for executing commands, the method comprising:
    receiving audio/video content comprising trigger information that includes a media time in the trigger information;
    displaying video signal images of the audio/video content in which the trigger information is in a form of an image code embedded in the displayed video signal images, the image code comprising a single bar element comprising multiple lines superimposed across an entire edge of the displayed video signal images in which the single bar element superimposed across the entire edge is in a viewable portion of a display screen of the reception apparatus, the image code being masked using the same pixels as those surrounding the trigger information before being displayed; and
    extracting a feature quantity from the trigger information, wherein the feature quantity is unique information about the audio/video content.

10. The method of claim 9, further comprising acquiring a correspondence table that defines an event, a start time associated with the event, and an application associated with the event.

11. The method of claim 10, further comprising determining a current time based on the media time included in the trigger information.

12. The method of claim 11, further comprising executing a command associated with the event based on the determined current time and the start time associated with the event.

13. The method of claim 10, wherein the trigger information identifies a location of the correspondence table.

14. The method of claim 9, acquiring a correspondence table that defines an event and a start time associated with the event.

15. The method of claim 14, wherein the correspondence table defines an application associated with the event.

16. The method of claim 9, wherein the receiving the trigger information initiates an operation of an application program.

17. The method of claim 9, further transmitting fingerprint information to query a server about the acquired trigger information.

18. The method of claim 17, wherein the audio/video content is received by broadcast.

* * * * *